United States Patent [19]

Takeda et al.

[11] Patent Number: 5,228,100

[45] Date of Patent: Jul. 13, 1993

[54] METHOD AND SYSTEM FOR PRODUCING FROM DOCUMENT IMAGE A FORM DISPLAY WITH BLANK FIELDS AND A PROGRAM TO INPUT DATA TO THE BLANK FIELDS

[75] Inventors: Haruo Takeda, Kawasaki; Masayuki Tsuchiya, Hiratsuka; Hitoshi Suzuki, Owariasahi; Syozi Yamada, Fujisawa; Toshihiko Matsuda, Owariasahi; Hiroshi Fujise; Yoshiaki Kuno, both of Yokohama; Ichitaro Koai, Chigasaki, all of Japan

[73] Assignees: Hitachi, Ltd., Tokyo; Hitachi Software Engineering Co., Ltd., Yokohama, both of Japan

[21] Appl. No.: 550,521

[22] Filed: Jul. 10, 1990

[30] Foreign Application Priority Data

Jul. 10, 1989 [JP] Japan ................................. 1-175469
Aug. 7, 1989 [JP] Japan ................................. 1-202794
Sep. 25, 1989 [JP] Japan ................................. 1-246290

[51] Int. Cl.[5] .............................................. G06K 9/20
[52] U.S. Cl. ......................................... 382/61; 382/48
[58] Field of Search ..................... 382/14, 15, 22, 25, 382/48, 57, 61; 364/513, 514, 518, 523

[56] References Cited

U.S. PATENT DOCUMENTS

| | | | |
|---|---|---|---|
| 4,811,416 | 3/1989 | Nakamura | 382/61 |
| 4,907,285 | 3/1990 | Nakano et al. | 382/48 |
| 4,933,979 | 6/1990 | Suzuki et al. | 382/61 |
| 4,933,984 | 6/1990 | Nakano et al. | 382/48 |
| 5,001,769 | 3/1991 | Reid-Green et al. | 382/48 |
| 5,003,613 | 3/1991 | Lovelady et al. | 382/61 |

Primary Examiner—Jose L. Couso
Attorney, Agent, or Firm—Antonelli, Terry, Stout & Kraus

[57] ABSTRACT

A data processing system for inputting data to a form display includes a scanner for inputting an image of a form document to the system, a processor for recognizing character and line patterns from the form document image supplied from the scanner to produce physical structure data of the document and logical structure data related to data input/output fields in the form document depending on the physical structure data so as to automatically produce based on the logical structure data a program to input data to the form display, a display screen for presenting thereon a form display defined by the physical structure data or normalized data obtained by correcting the physical structure data to be adaptive to a cursor pitch, a data input key apparatus, and a printer for producing a printout document based on the form display filled with the data.

30 Claims, 81 Drawing Sheets

FIG. 3

| | 品 名 | 数 量 | 単 価 | 金 額 |
|---|---|---|---|---|
| 1 | | | | |
| 2 | | | | |
| 3 | | | | |
| 4 | | | | |
| | | | 合 計 | |

| | 品 名 | 数 量 | 単 価 | 金 額 |
|---|---|---|---|---|
| 1 | ノート | 20 | 50 | 1100 |
| 2 | 鉛筆 | 10 | 145 | 1450 |
| 3 | | | | |
| 4 | | | | |
| | | | 合 計 | 2450 |

納 品 書　　　63年10月1日

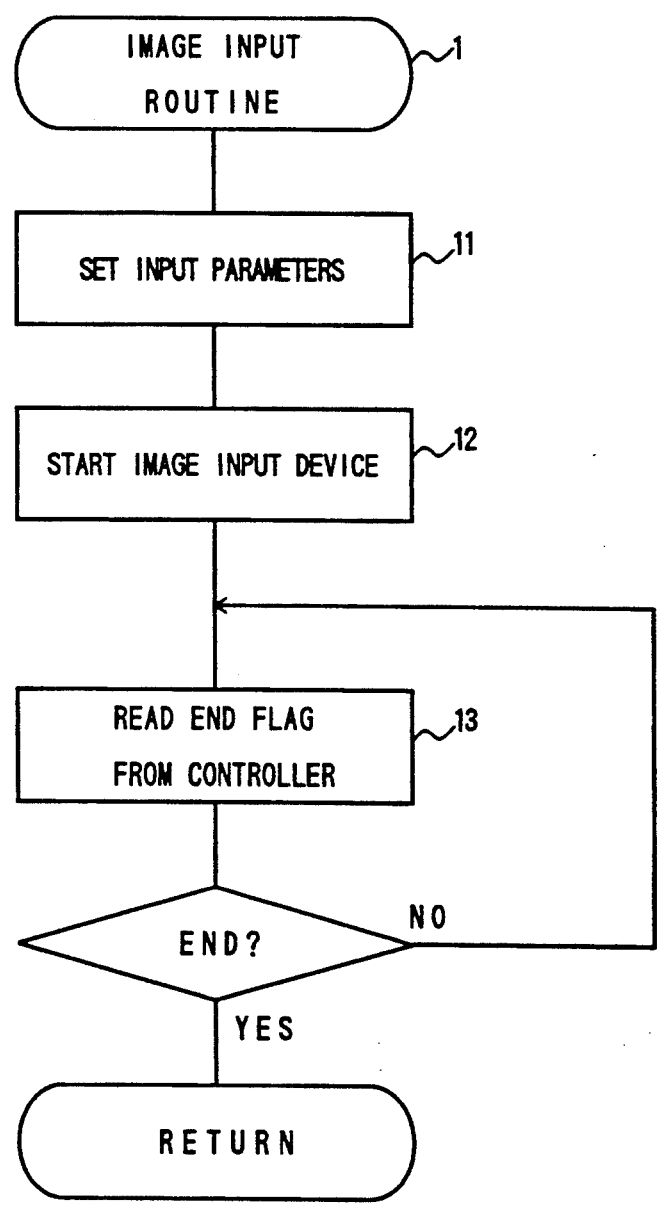

FIG. 7A
FIG. 7B
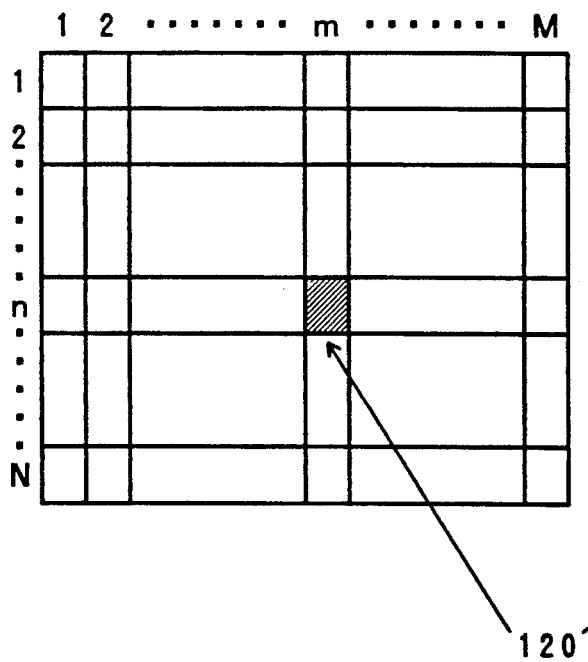
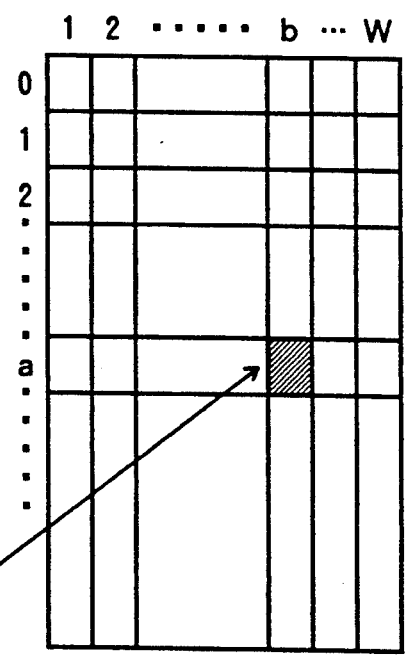
120
$a = \downarrow \{M \cdot (n-1) + m\} / W \downarrow$
$b = M \cdot (n-1) + m - a \cdot W$ FIG. 9−a
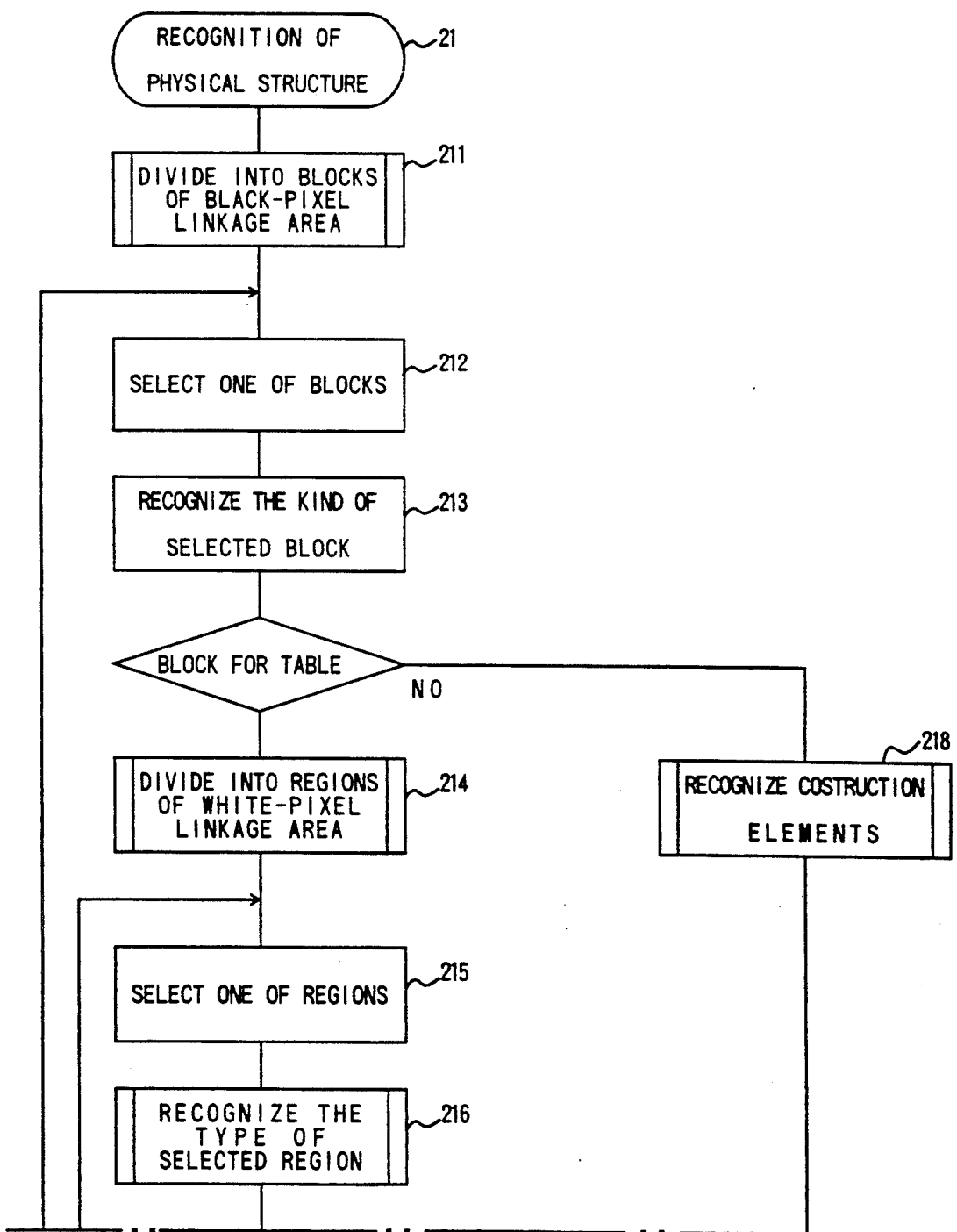

FIG. 9-b
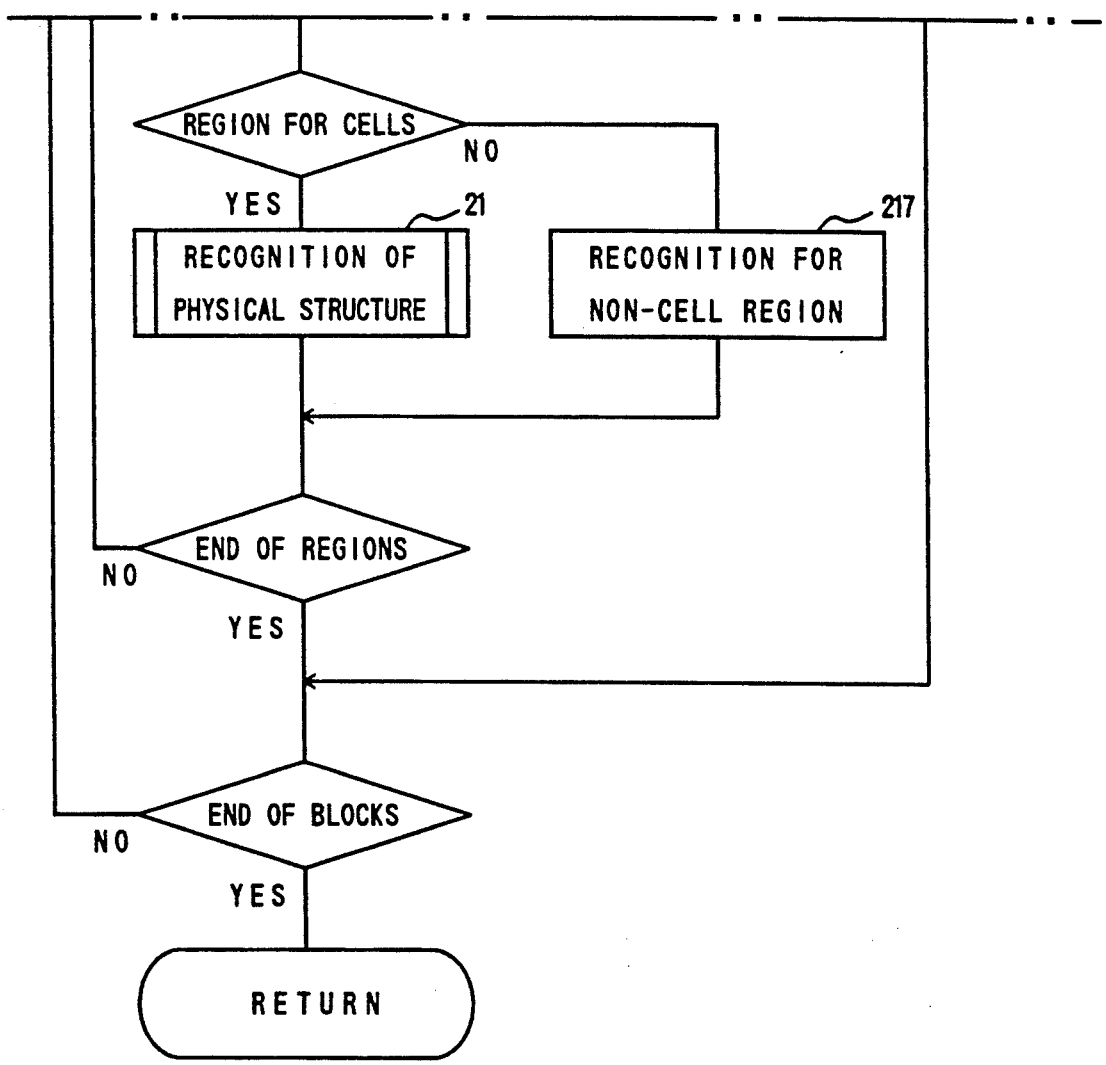

FIG. 1 1 A

| i | ℓ | r | n₀ |
|---|---|---|---|
| 1 | | | |
| 2 | | | |
| ⋮ | | | |
| I | | | |

| j | x₀ | x₁ | y₀ | y₁ |
|---|---|---|---|---|
| 1 | | | | |
| 2 | | | | |
| ⋮ | | | | |
| J | | | | |

T2

FIG. 1 6 — a
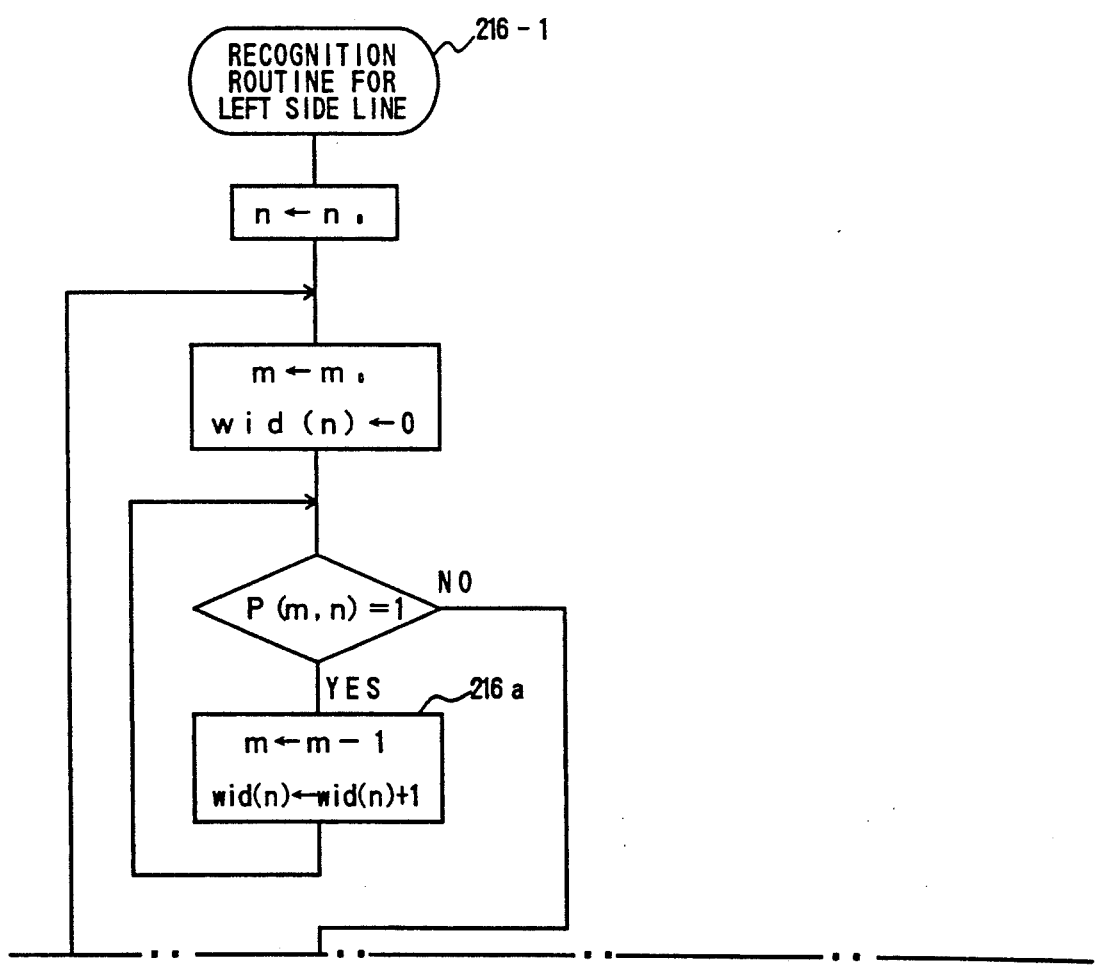

FIG. 16-b
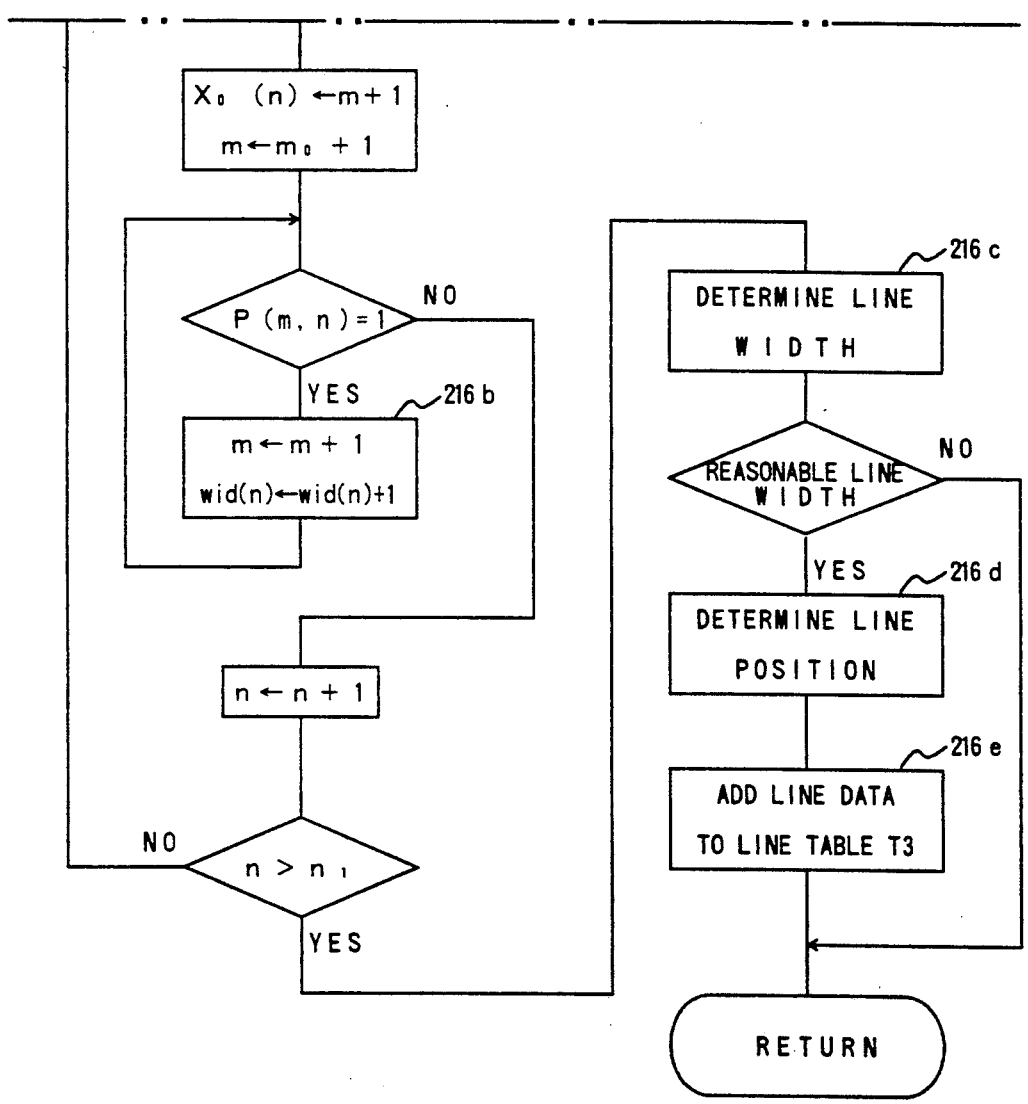

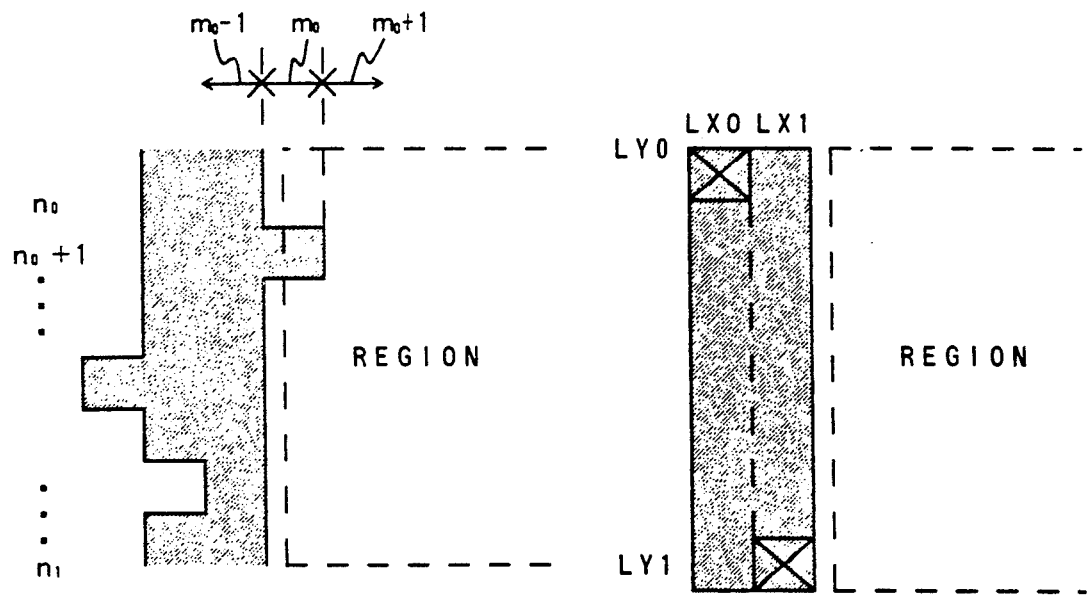

FIG. 2 2

| | $SX_0$ | $SY_0$ | $SX_1$ | $SY_1$ | SW |
|---|---|---|---|---|---|
| 1 | | | | | |
| 2 | | | | | |
| ⋮ | | | | | |
| SLA | | | | | |

TBL2

FIG. 2 3

| | AX | AY | AR | $AA_0$ | $AA_1$ | AW |
|---|---|---|---|---|---|---|
| 1 | | | | | | |
| 2 | | | | | | |
| ⋮ | | | | | | |
| ARC | | | | | | |

TBL3

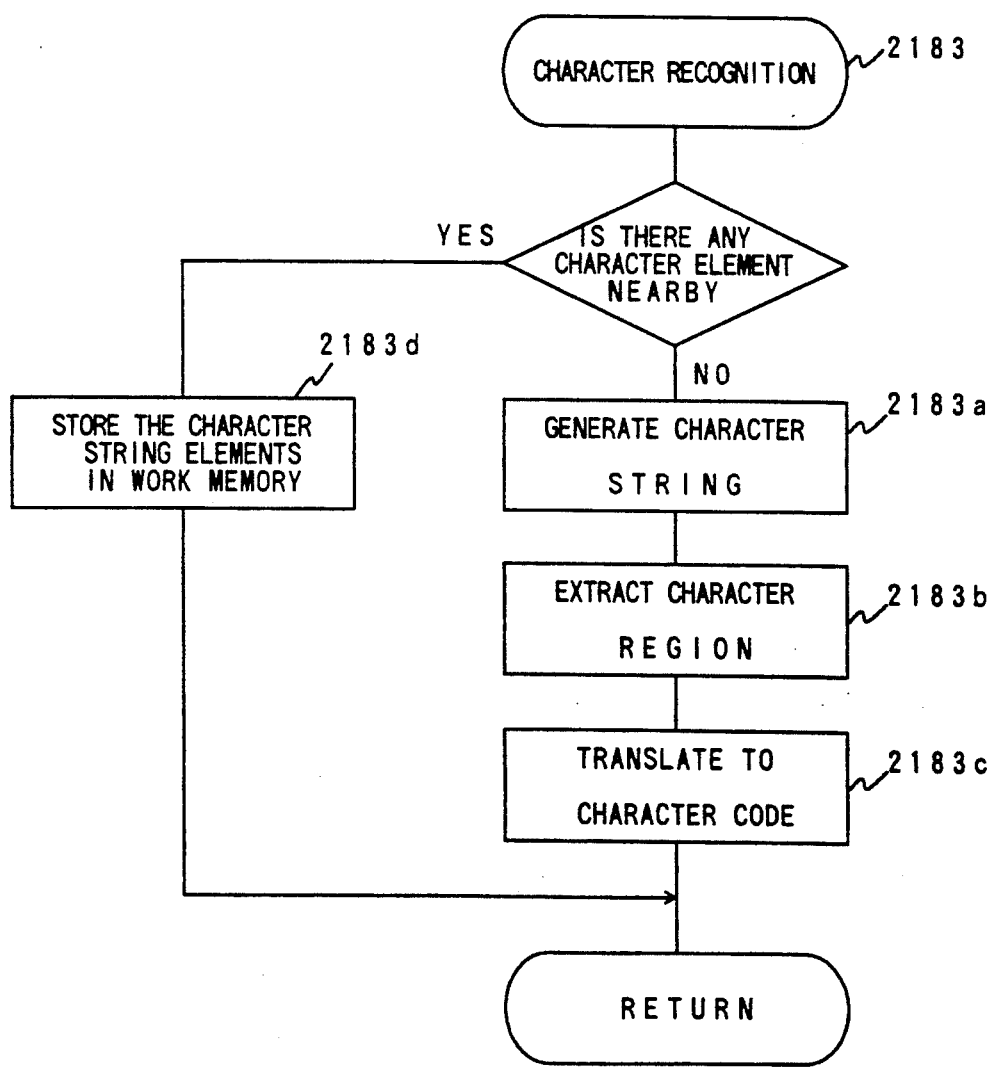

| | $CX_0$ | $CY_0$ | $CX_1$ | $CY_1$ | $CC$ |
|---|---|---|---|---|---|
| 1 | | | | | |
| 2 | | | | | |
| ⋮ | | | | | |
| CHAR | | | | | |

TBL5

| WN | WC₁ | WC₂ | ..... | WCₚ | TBL6 |
|---|---|---|---|---|---|
| 1 | | | | | |
| 2 | | | | | |
| ⋮ | | | | | |
| WORD | | | | | |

FIG. 4 6 A
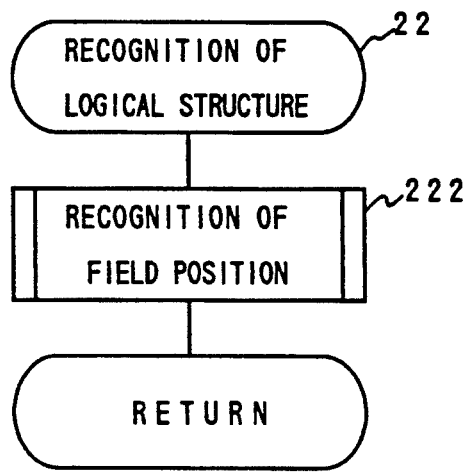
FIG. 4 6 B
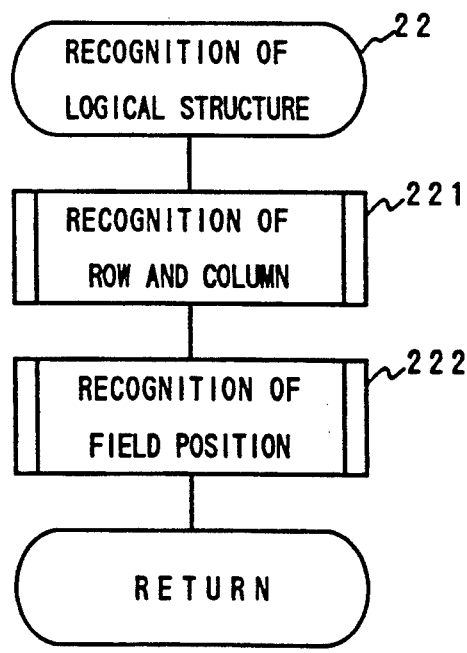

FIG. 47-a
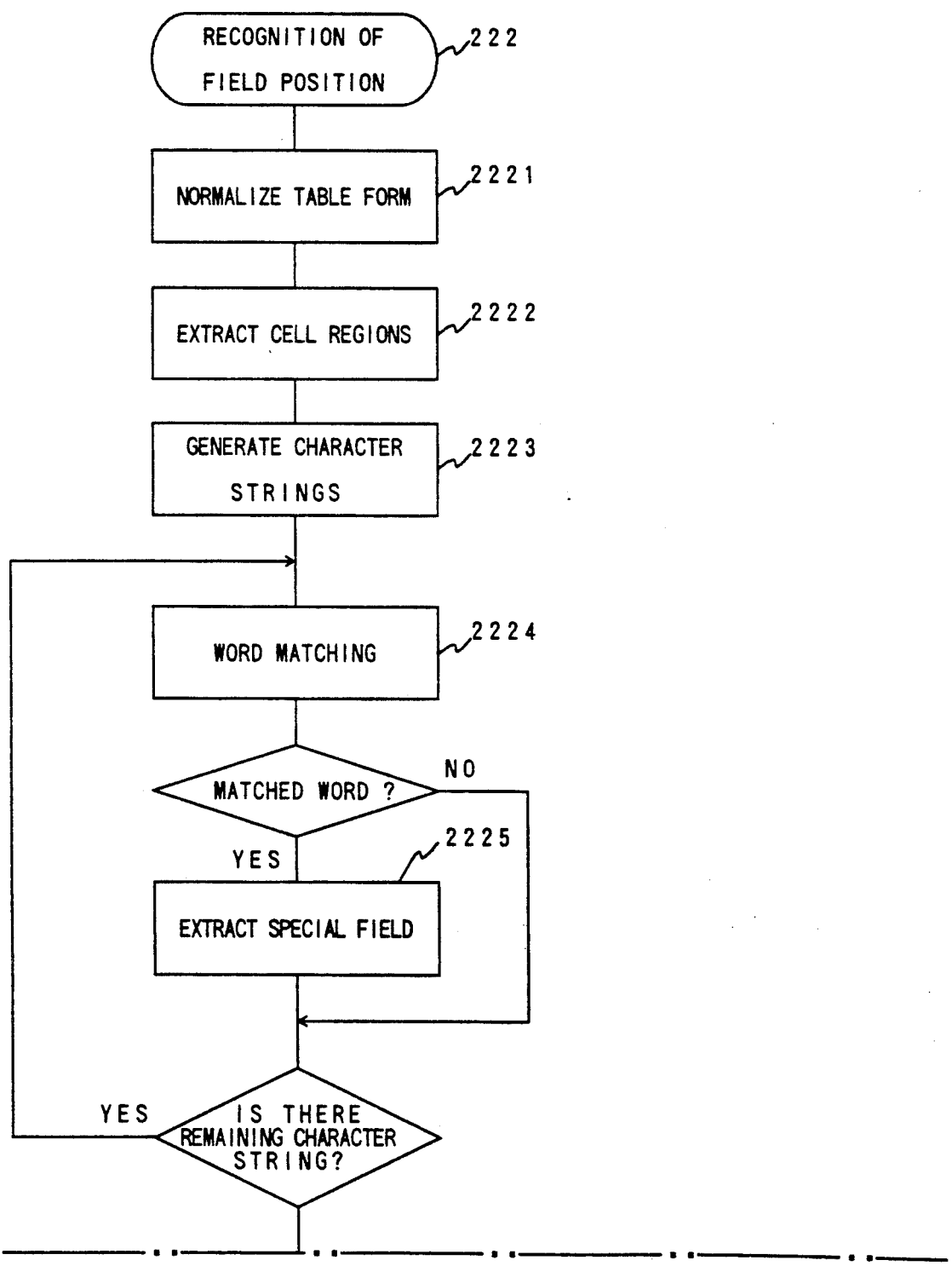

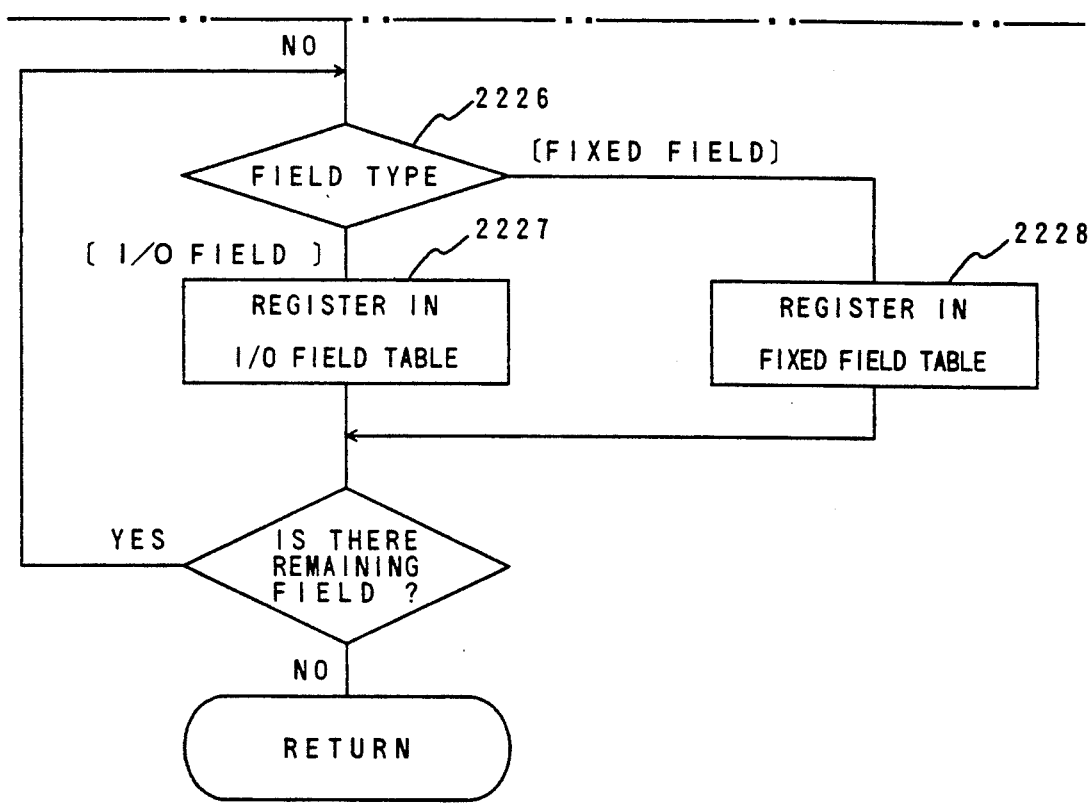
FIG. 47-b

FIG. 48A
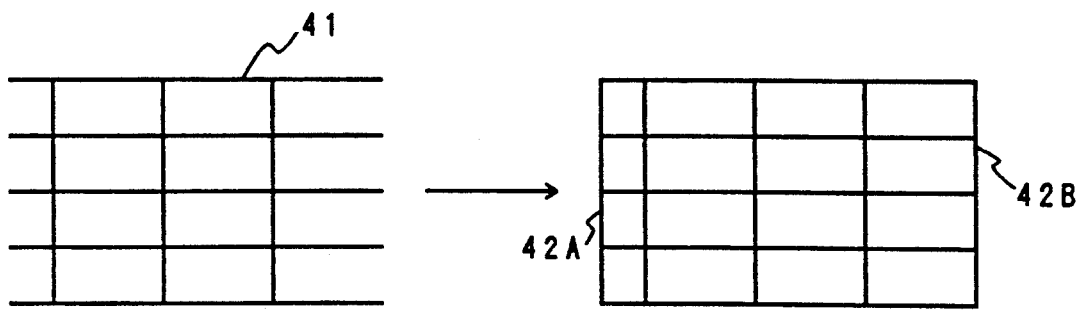
FIG. 48B
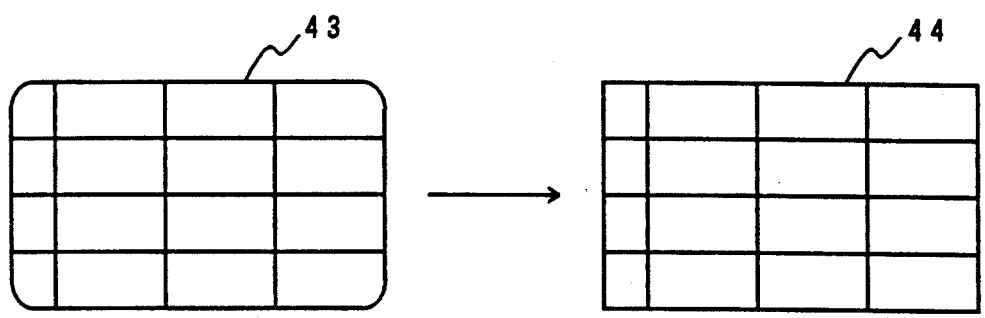
FIG. 49
|   | FX0 | FY0 | FX1 | FY1 | FN |
|---|---|---|---|---|---|
| 1 | | | | | |
| 2 | | | | | |
| ⋮ | | | | | |
| FLD | | | | | |
TBL8

FIG. 55-a
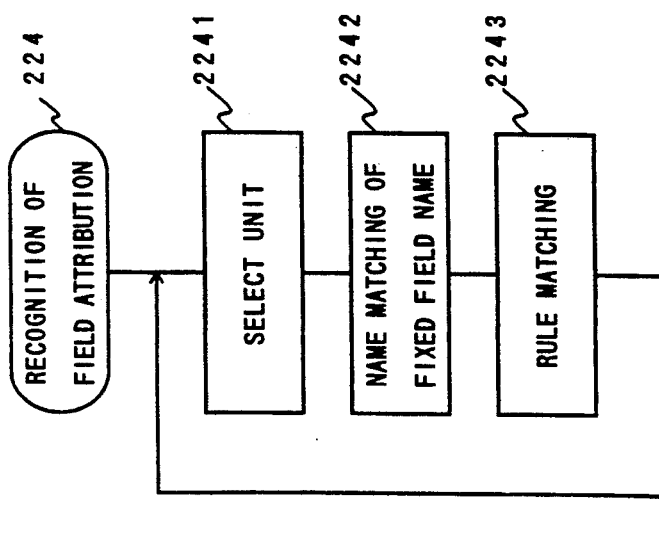

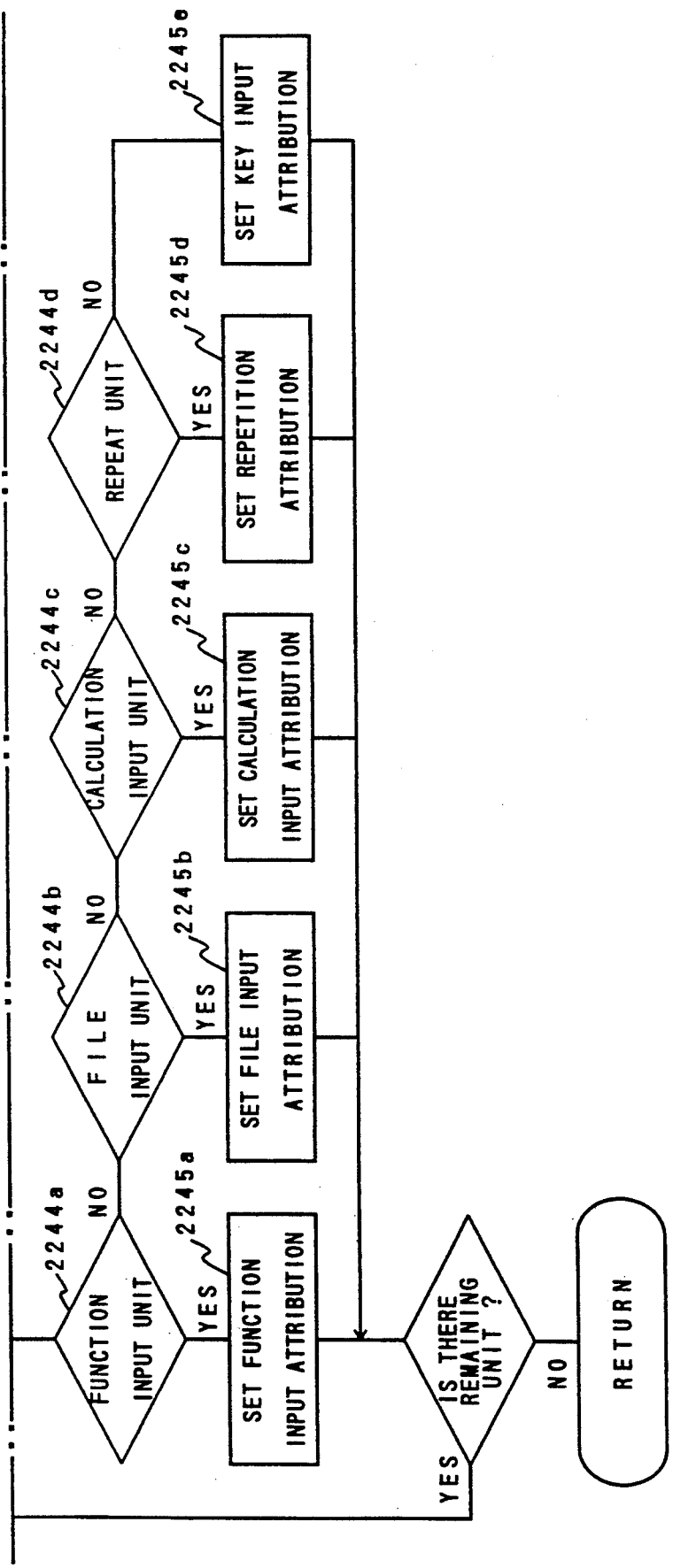
FIG. 55-b

FIG. 56

KNW1

| U N | F U N |
|---|---|
| 1 | 年(NEN) | Y E A R |
| 2 | 月(GATU) | M O N T H |
| ⋮ | | |
| KP | | |

FIG. 57

KNW2

| 品名 "ACTIVE NAME" | 単価 "UNIT PRICE" |
|---|---|
| 1 | ノート(NOTE) | 5 0 |
| 2 | 鉛筆(PENCIL) | 1 4 5 |
| ⋮ | | |
| KB | | |

FIG. 58

KNW3

| U N | O P | OP1 | OP2 | ······ | OPN |
|---|---|---|---|---|---|
| 1 | 金額 "SUM" | PRODUCT | UNIT PRICE | QUANTITY | | |
| 2 | 合計 "TOTAL" | SUM TOTAL | S U M | | | |
| ⋮ | | | | | | |
| KO | | | | | | |

FIG. 59

KNW4

| U N | A N |
|---|---|
| 1 | 品名 "ARTICLE NAME" | |
| 2 | 数量 "QUANTITY" | |
| ⋮ | | |
| KD | | |

FIG. 60

| | FF | PN | PF1 | PF2 | ..... | PFN | UA | UAP |
|---|---|---|---|---|---|---|---|---|
| 1 | | | | | | | | |
| 2 | | | | | | | | |
| ... | | | | | | | | |
| UNT | | | | | | | | |

TBL9

FIG. 61

| | FUNN | RN | PAR1 | PAR2 | ..... | PARN |
|---|---|---|---|---|---|---|
| 1 | | | | | | |
| 2 | | | | | | |
| ... | | | | | | |
| FUN | | | | | | |

TBL10

FIG. 62

| | DBN | DN | TM1 | TM2 | ..... | TMN |
|---|---|---|---|---|---|---|
| 1 | | | | | | |
| 2 | | | | | | |
| ... | | | | | | |
| DB | | | | | | |

TBL11

FIG. 63

TBL12

| | CALN | CLN | OP1 | OP2 | ..... | OPC |
|---|---|---|---|---|---|---|
| 1 | | | | | | |
| 2 | | | | | | |
| ... | | | | | | |
| CAL | | | | | | |

FIG. 64

TBL13

| | N | RFF1 | RFF2 | ..... | RFFN | M | RU1 | RU2 | ..... | RUM |
|---|---|---|---|---|---|---|---|---|---|---|
| 1 | | | | | | | | | | |
| 2 | | | | | | | | | | |
| ... | | | | | | | | | | |
| REP | | | | | | | | | | |

FIG. 65

TBL14

| | DA | DW | DH | DD | DJ |
|---|---|---|---|---|---|
| 1 | | | | | |
| 2 | | | | | |
| ... | | | | | |
| DAT | | | | | |

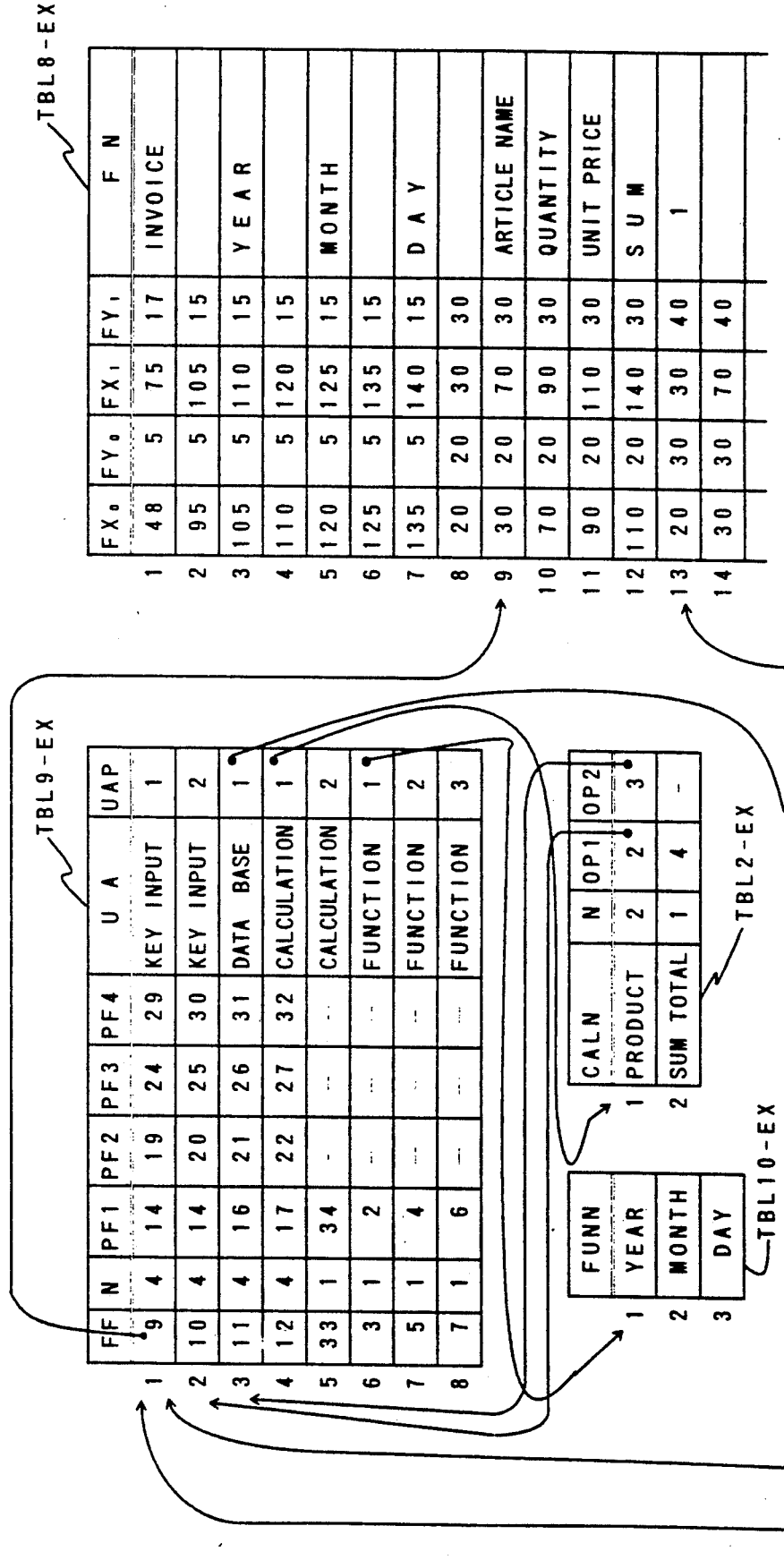
FIG. 66-a

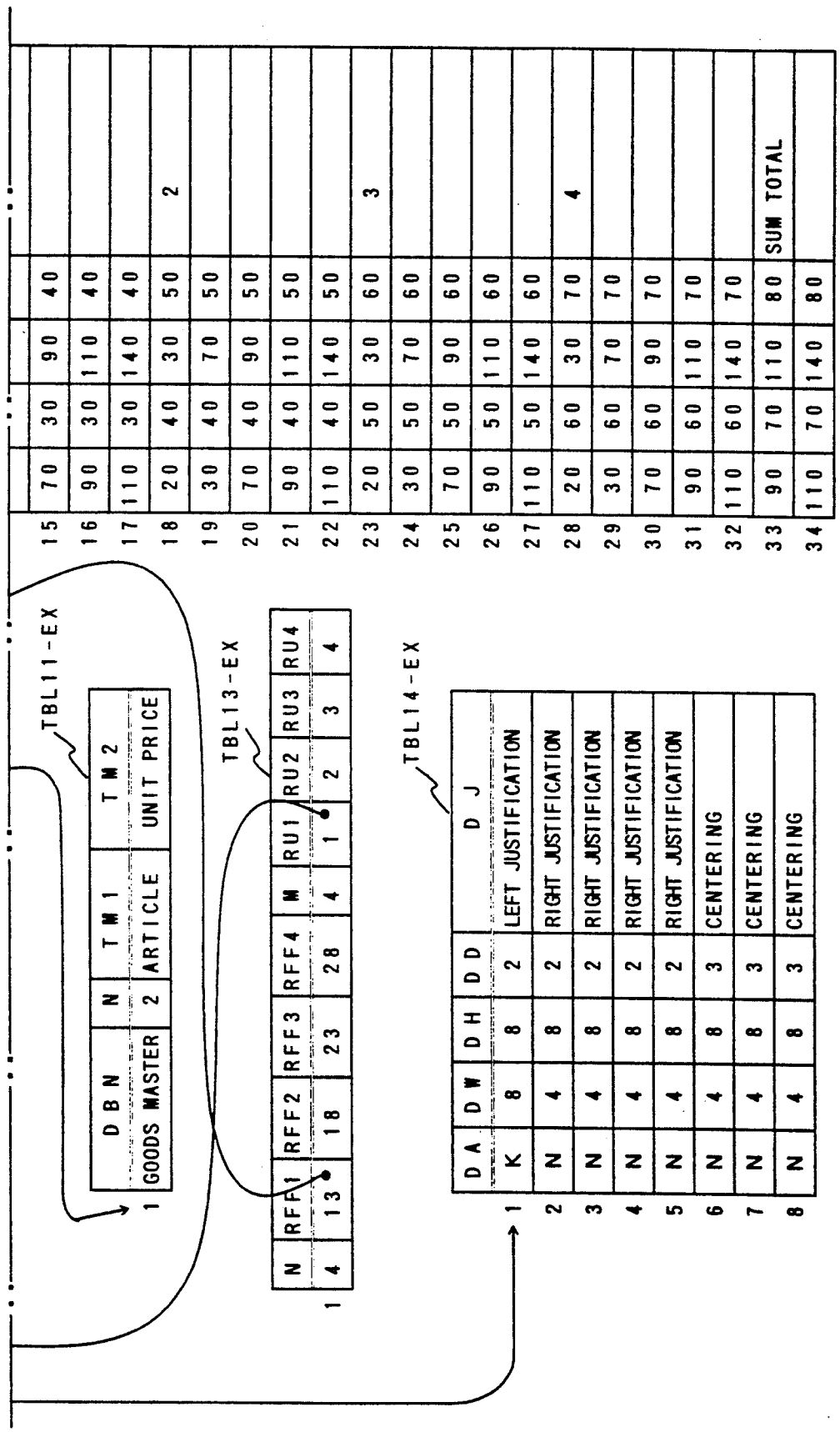

FIG. 69

```
ℓ 1      PROGRAM CYOHYO ;
ℓ 2         TYPE STRING=PACKED ARRAY [1..10] OF CHAR ;
ℓ 3         VAR f1, f2, f3, f4 : ARRAY [1..4] OF STRING ;
ℓ 4             f5, f6, f7, f8 : INTEGER ;
ℓ 5             i : INTEGER ;
ℓ 6         FUNCTION INPUT : STRING ;
ℓ 7             {INPUT OF CHARACTER STRINGS FROM CONSOLE }
ℓ 8         FUNCTION DB (DBNAME, KEY, OBJECT) : STRING ;
ℓ 9             {RETRIEVAL OF DATA BASE}
ℓ10         FUNCTION YEAR : INTEGER ;
ℓ11             {CALCULATION OF "YEAR" }
ℓ12         FUNCTION MONTH : INTEGER ;
ℓ13             {CALCULATION OF "MONTH"}
ℓ14         FUNCTION DAY : INTEGER ;
ℓ15             {CALCULATION OF "DAY"}
ℓ16         BEGIN
ℓ17            i : = 1 ;
ℓ18            REPEAT
ℓ19               f1[i]:=INPUT;
ℓ20               f2[i]:=INPUT;
ℓ21               f3[i]:=db('GOODS MASTER', 'ARTICLE NAME', 'UNIT PRICE');
ℓ22               f4[i]:=f2[i]×f3[i];
ℓ23               i : i + 1
ℓ24            UNTIL (i>4) OR (INPUT='END');
ℓ25            f5 := 0 ;
ℓ26            FOR i : = 1 TO 4
ℓ27               f5:=f5+f4[i]
ℓ28            END ;
ℓ29            f6:=YEAR;
ℓ30            f7:=MONTH;
ℓ31            f8:=DAY;
ℓ32         END
```

EX9

FIG. 73 A
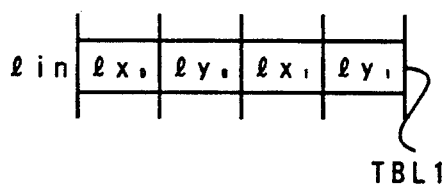
FIG. 73 B
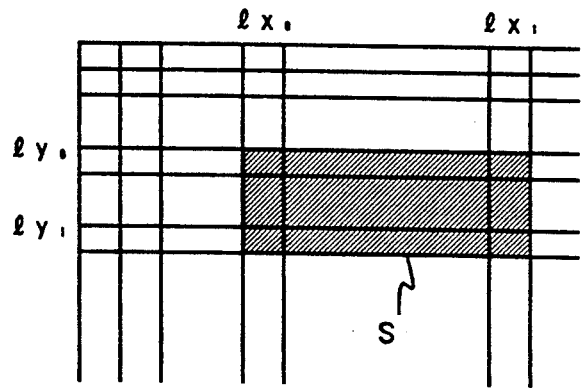
FIG. 74 A
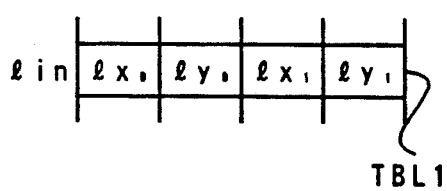
FIG. 74 B
ESC, line, $\ell x_0$, $\ell y_0$, $\ell x_1$, $\ell y_1$, END

| | 品 名 | 数 量 | 単 価 | 金 額 |
|---|---|---|---|---|
| 1 | | | | |
| 2 | | | | |
| 3 | | | | |
| | | | 合 計 | |

| | 品 名 | 数 量 | 単 価 | 金 額 |
|---|---|---|---|---|
| 1 | ノート | 20 | 50 | 1000 |
| 2 | 鉛筆 | 10 | 145 | 1450 |
| | | | | |
| | | | 合 計 | 2450 |

| TITLE | |
| --- | --- |
| NAME | |
| ABSTRACT | |

FIG. 81

```
                            ┌─ EX13
┌─────────────────────────┐
│                         │
│     ××学会講演申込書      │
│                         │
│  ┌─────┬───────────────┐│
│  │     │TECHNOLOGY OF DOCUMENT│
│  │TITLE│               ││
│  │     │    RECOGNITION││
│  ├─────┼───────────────┤│
│  │NAME │ HARUO  TAKEDA ││
│  ├─────┴───────────────┤│
│  │      ABSTRACT       ││
│  ├─────────────────────┤│
│  │xxxx················ ││
│  ├─────────────────────┤│
│  │···················· ││
│  ├─────────────────────┤│
│  │··········xxx.       ││
│  ├─────────────────────┤│
│  │                     ││
│  └─────────────────────┘│
└─────────────────────────┘
```

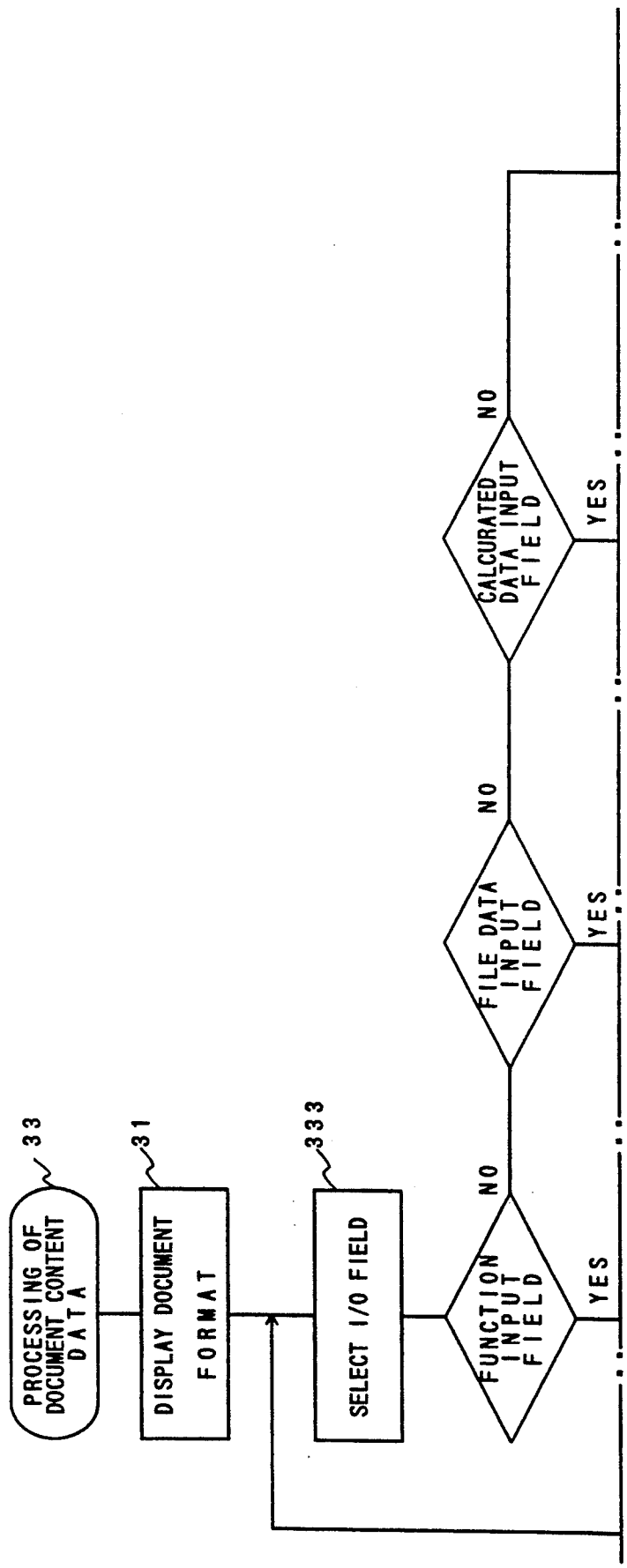
FIG. 84-a

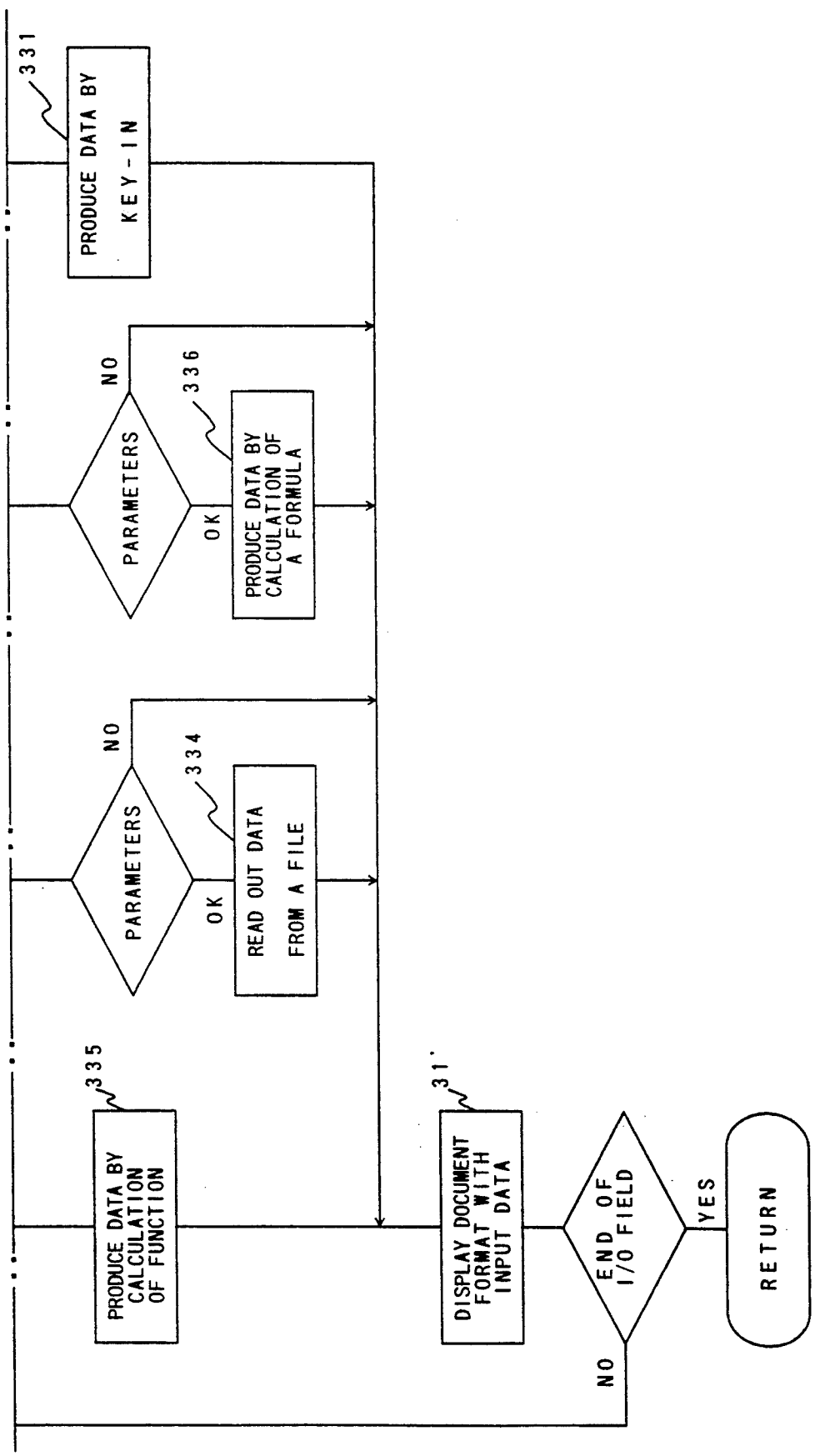
FIG. 84-b

FIG. 88
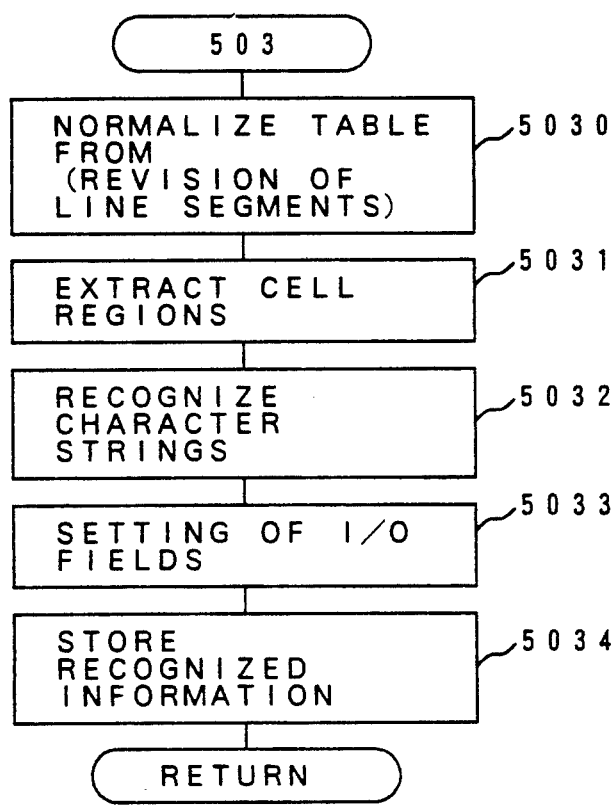
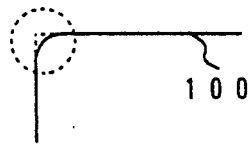
FIG. 89A
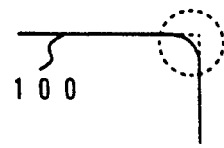
FIG. 89B
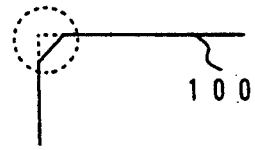
FIG. 89C
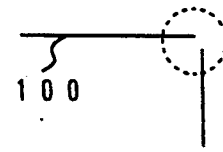
FIG. 89D
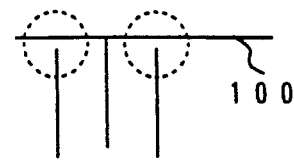
FIG. 89E
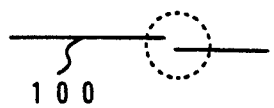
FIG. 89F

FIG. 98

| 551 | 552 | 553 | 554 | 555 | 556 |
|---|---|---|---|---|---|
| POSITION | LENGTH | WIDTH | NUMBER OF CHARACTERS | NAME OF FIELD | ATTRIBUTION OF FIELD |
|  |  |  |  |  |  |

TBL20

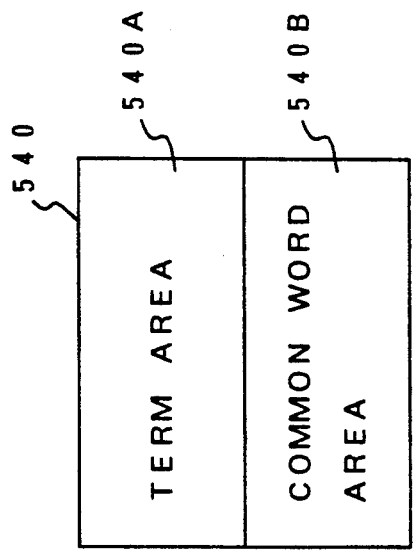

METHOD AND SYSTEM FOR PRODUCING FROM DOCUMENT IMAGE A FORM DISPLAY WITH BLANK FIELDS AND A PROGRAM TO INPUT DATA TO THE BLANK FIELDS

CROSS-REFERENCES TO RELATED APPLICATIONS

The present application relates to the Japanese patent application Ser. No. 59-180517 (Aug. 31, 1984) as the U.S. patent application Ser. No. 485986 (Feb. 27, 1990) which is continuation application of the U.S. patent application Ser. No. 399411 (Aug. 25, 1989) which is continuation application of the U.S. patent application Ser. No. 178768 (Mar. 29, 1988) which is continuation application of the U.S. patent application Ser. No. 766943 (Aug. 19, 1985) and the Japanese patent application Ser. No. 63-209975 (Aug. 24, 1988) as the U.S. patent application Ser. No. 397117 (Aug. 21, 1989).

BACKGROUND OF THE INVENTION

1. Field of the Invention

The present invention relates to a document data processing apparatus employing image data, and in particular, to an apparatus for and a method of processing data for producing, for example, in general business processing fields, a document of a predetermined format or form having blank or empty cells for character data input and/or output operations. Cells are provided, to input data from a keyboard to a data base or to output data from the data base or the keyboard.

2. Description of Related Art

There exists a case where a business processing apparatus used in an office such as a work station, an office processor, a personal computer, or a word processor is adopted to issue documents (forms) having predetermined formats, for example, application blanks (or forms), data input slips, chits, vounchers, and other forms for various items such as accounting, statistic, and detailed items and/or to input data to a data base in accordance with formats preset on the document forms displayed. In such a situation, document formats or forms having blank fields or cells are required to be defined on a display screen of the apparatus for the data input/output operations. In a typical format or form definition method of conventional technology described, for example, in Hitachi's Manual entitled "ETOILE/OP", a cursor or the like is moved on a display screen to define ruled lines and characters. Thereafter, a program which issues the defined items is produced and is edited by use of a program editor or other programming tools.

However, in accordance with the conventional technology, in order to issue a new document in which the format is unknown to the apparatus, a long period of time is required by an expert is necessary knowledge and with respect to the program. Such a new format of document appears not only at an initial installation of the business equipment in a company but also in a rather routine manner. For example, a firm related to the pertinent company may request a specified slip or form to be used. Consequently, it has been desired to simplify the format definition job or processing and to increase the speed of the processing.

In this regard, the applicant of the present invention has been proposed apparatus in the Japanese patent application Ser. No. 63-209975 (U.S. patent application Ser. No. 397117). In this reference, a document processing system is provided where a form document having blanks or blank fields in which data items are to be described is transformed into image data such that based on the document image, a structure of a table form included in the document is recognized to automatically create ruled line vector data items, which are employed to draw a table. Moreover, the applicant of the present invention has been proposed in the Japanese patent application Ser. No. 59-180517 (U.S. patent application Ser. No. 766943) where a document analysis system in which form data for a character recognition by means of an optical character recognition (OCR) equipment is automatically generated from document image data.

In the document analysis system, the document image data is processed to recognize a physical structure of a table form constituted with line patterns included in the document. Thereafter, the system analyzes kinds, attributes or attributions, and relations of dependence with respect to rectangular cell regions (which are called frames in the preceding application) constituting the table form, thereby recognizing a logical structure of the document. However, in the conventional technology, the logical structure is recognized to apply a recognition result to the OCR. Namely, the analysis is limited to the cell types (indicating a cell for setting therein an item name or a cell to be loaded with a data item), the cell attributions (kinds and allowance ranges of characters loaded in cells), and relations of dependence between cells.

SUMMARY OF THE INVENTION

It is therefore an object of the present invention to provide a method of and a system for processing form document data in which the operator references a form display presented on a screen to easily attain document form information suitably associated with data key-in operation to supply data to the data processing system.

Another object of the present invention is to provide a method of and a system for processing form document data suitable for an operation in which the data supplied from the operator and/or data obtained from a file are filled in predetermined blanks of a form of a document, thereby printing or displaying the document on a print form or a screen.

Still another object of the present invention is to provide a method of and a system for automatically generating a program associated with a form document processing suitable for creating a data processing program through a simple operation of the operator. The program is executed when the operator inputs data to a data processing system while referencing a form display of a predetermined format having blanks (data input-/output fields) for the data input/output operations.

In order to achieve the above objects, there is provided a document processing system or apparatus in accordance with the present invention comprising an image input means for inputting an image of a table form document having a table form or format with input/output field cells in which variable data items are to be written. Fixed field cells are provided in which fixed data or item names have been written. A key-in means (which may be replaced with a pointing device such as a mouse) for the operator to input commands and data items. Further a data processor is provided for executing the data processing operation according to the programs. In this system, the data processor recognizes, based on the image data of the table form document supplied via the image input means, a physical structure and a logical structure of the input document. In the physical structure recognition, the processor recognizes such items included in the document as line segments constituting the table form and characters in the inside and outside regions of the table, thereby converting the image data into code data. The logical structure recognition accomplishes a field identification for identifying an input/output field in which variable data is to be inputted and a fixed field loaded with fixed data or a item name; a field relation recognition for establishing a correspondence between an input/output field or a fixed field and a field name, and a field attribution recognition for referencing a knowledge base to recognize a data supply source containing data to be inputted to an input/output field. In accordance with the present invention, for each input/output field, a source from which data is supplied thereto is recognized through a logical structure of the input document. Consequently, when a form document image having blanks for items such as "Item code", "Item name", "Unit price", "Quantity", and "Amount" is processed and then the operator inputs only an item code and a quantity value, the other blanks can be automatically loaded with data items attained from a data file or calculation results, thereby implementing a data input and/or document output processing system. In addition, by using the results of the physical and logical structure recognition of the document, a program can be automatically generated for the data input and/or document output processing.

Another feature of the present invention resides in that as a logical structure recognition of a document, based on data items representing results of the physical structure recognition on the document, a size of a table form along a row direction and a column size of each input/output field are corrected to be adaptive to a basic pitch or a character pitch of a cursor on a display screen so as to develop a normalized form display. In addition to the document structure data, the normalized form display suitable for the data input on the screen is created. This facilitates the operator's key-in operation for a data input and a screen output of data items obtained from a keyboard or through a program processing.

In this connection, sizes of characters to be written in the respective input/output fields of the form document, numbers of the respective characters, and character pitches associated with the characters can be determined in association with a physical size of each input/output field and a type of data set to the input/output field (decided by a field name assigned to the input/output field). Information items respectively designating the character sizes, character counts, and character pitches are stored as a portion of field attributes or attributions. The normalization processing of the row and column above is achieved by referencing the field attributions.

Character data set to an input/output field in the form display is matched or aligned with a document format defined by physical structure recognition data of an input document in association with the character size and the character pitch defined as the field attributions. This in return allows printing of the data items on a print form or sheet by use of a printer. As a result, the data items are printed on a print form identical to the input document form, which is different in the character size and the form display presented on the screen at the data input operation, with the blanks filled with characters of sizes associated with the field sizes.

In accordance with the present invention, the document data items attained through the physical structure recognition are employed to produce on a display screen a form display in which ruled lines can be moved or deleted and/or characters altered, added, or deleted through key operations. Consequently, the operator can perform an operation to correct a portion of the form display on the display screen, thereby causing the logical structure recognition and the automatic program generation to be accomplished.

The foregoing and other objects, advantages, manner of operation and novel features of the present invention will be understood from the following detailed description when read in connection with the accompanying drawings.

BRIEF DESCRIPTION OF THE DRAWINGS

FIGS. 7A and 7B are diagrams each for explaining relationships between an input image and an input image memory;

FIGS. 9a-b are a flowchart showing details of a subroutine executed in a physical structure recognition step 21;

FIGS. 11A and 11B are diagrams respectively showing configurations of tables T1 and T2 employed in the block division step 211;

FIG. 12 is a schematic diagram showing an example of an image for specifically explaining the block division;

FIG. 13 is a flowchart showing details of a region division step 214;

FIGS. 16a-b are a flowchart showing details of a left side line recognition step 216-1 of FIG. 15;

FIG. 17 is a diagram schematically showing configuration of a table T3 used in the left side line recognition step 216-1;

FIGS. 18A and 18B are diagrams showing concrete examples respectively of an original image and a recognition result processed in the left side line recognition step 216-1;

FIG. 19 is a schematic diagram showing a table TBI1 to store therein recognition results of line segments;

FIG. 22 is a configuration diagram showing the constitution of a table TBL2 for storing therein oblique line information;

FIG. 23 is a configuration diagram showing the constitution of a table TBL3 for storing therein circular arc information;

FIG. 24 is a detailed flowchart showing the operation of a construction element recognition step 218 of FIG. 9;

FIG. 25 is a diagram for explaining a type judgement conducted on construction elements;

FIG. 29 is a diagram illustratively showing the constitution of a broken line table TBL4;

FIG. 30 is a flowchart showing details of a character recognition step 2183 of FIG. 24;

FIG. 35 is a flowchart showing details of a preprocessing step 20 of FIG. 34;

FIG. 42 is a flowchart showing a first embodiment of a logical structure recognition step 22 of FIG. 41;

FIG. 44 is a diagram showing the configuration of a table TBL7 employed in the row and column normalization step 221;

FIGS. 45A and 45B are diagrams useful to explain base points of patterns associated with characters and the like;

FIGS. 46A and 46B are flowcharts respectively showing alternative embodiments of the logical structure recognition step 22 of FIG. 41;

FIGS. 47a-b are a flowchart showing in detail a field position recognition step 222 of FIG. 46;

FIGS. 48A and 48B are diagrams for explaining a table format or form normalization processing 2221 executed to facilitate the field position recognition;

FIG. 49 is a diagram showing the construction of a field table TBL8;

FIGS. 50A and 50B are diagrams each useful to explain an example of an execution result of the field position recognition;

FIGS. 55a-b are a flowchart showing in detail of a field attribution recognition step 224 of FIG. 51;

FIGS. 56 to 59 are diagrams respectively showing various tables KNW1 to KNW4 referenced in a name matching step 2242 of FIG. 55;

FIGS. 60 to 65 are diagrams respectively showing various attribution information setting tables TBL9 to TBL14 referenced in the field attribution recognition step 224;

FIGS. 66a-b are a diagram showing a concrete example of contents of tables TBL9 to TBL14 generated through the logical structure recognition of the document;

FIG. 67 is a flowchart showing a third embodiment of the document form recognition step 2;

FIG. 69 is a diagram schematically showing an example of a program created in the generation step 23;

FIGS. 73A and 73B are diagrams showing details of the operation to generate print or output from data in the bit mat format;

FIGS. 74A and 74B are diagrams useful to explain the operation to generate print or output form data in the command sequence format;

FIGS. 76 and 77 are diagrams respectively showing examples of documents produced as printout results from the system;

FIG. 80 is a schematic diagram showing an example of a document as an original manuscript;

FIG. 81 is a diagram showing an example of a document issued with additional contents;

FIGS. 84a-b are a flowchart showing a third embodiment of the document content data generation step 33;

FIG. 88 is a flowchart showing another embodiment of a program for the logical structure recognition executed in a recognition step 503 of FIG. 87;

FIGS. 89A to 89F are diagrams for explaining a normalization of a table form or format;

FIG. 98 is diagram showing an example of a table structure for storing therein results of document structure recognition;

FIG. 99 is a diagram illustratively showing the configuration of a knowledge base;

FIG. 100 is a diagram showing an example of a layout of records stored in the knowledge base;

DESCRIPTION OF THE PREFERRED EMBODIMENTS

Figure 1:
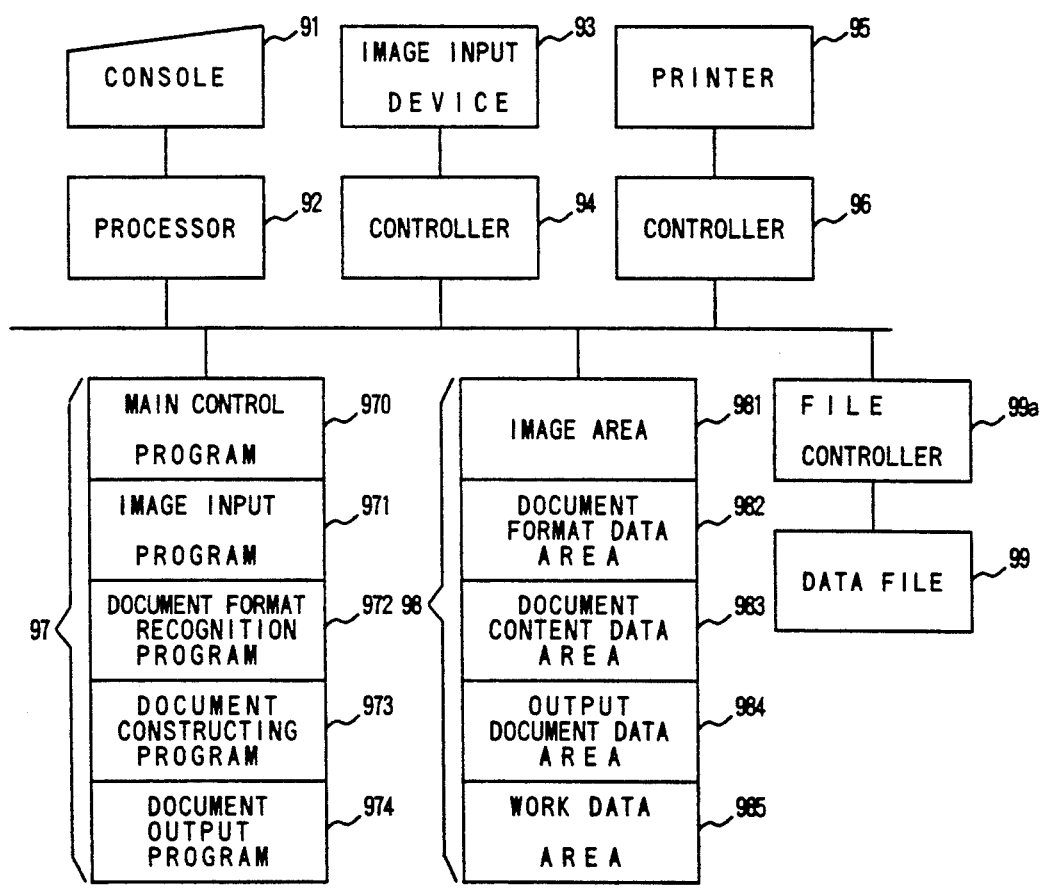
FIG. 1 is a system configuration diagram schematically showing an overall constitution of a document processing system in accordance with the present invention.

FIG. 1 shows an example of the configuration of a hardware system of a document processing apparatus in accordance with the present invention. This system includes a console (keyboard and display) 91 for the operator to supply commands to the system, a processor 92 for executing a document processing, an image input device 93 for storing image data in a memory, a controller 94 for controlling the image input device 93, a printer 95 for achieving a print operation of data from a memory, a controller 96 for controlling the printer 95, a memory 97 for storing therein programs to be executed by the processor 92, a memory 98 for storing therein various kinds of data items used by the processor 92, a memory (e.g. a disk unit) 99 for storing therein various types of numeric data items and document data items, a file controller 99a for controlling the data file 99 and a bus 90 for interconnecting the processor 92 and the other elements. The memory 97 comprises an area 970 for storing therein a main program which controls the overall operations of the document processing, an area 971 for storing therein subroutine programs for the input of images, an area 972 for storing therein subroutine programs to recognize document formats, an area 973 for storing therein subroutine programs to construct documents, and an area 974 for storing therein subroutine programs to output document data. The memory 98 includes an image area 981 to be loaded with image data, a document format data area 982 for storing therein document format data, a document content data area 983 to be loaded with document content data, an output document data area 984 for storing therein document data to be outputted, and a work data area 985 for the processor 92. The memory 97 includes a read-only memory (ROM), whereas the memory 98 may comprise a random access memory (RAM) or a combination of an RAM and an external storage such as a disk.

Figure 2:
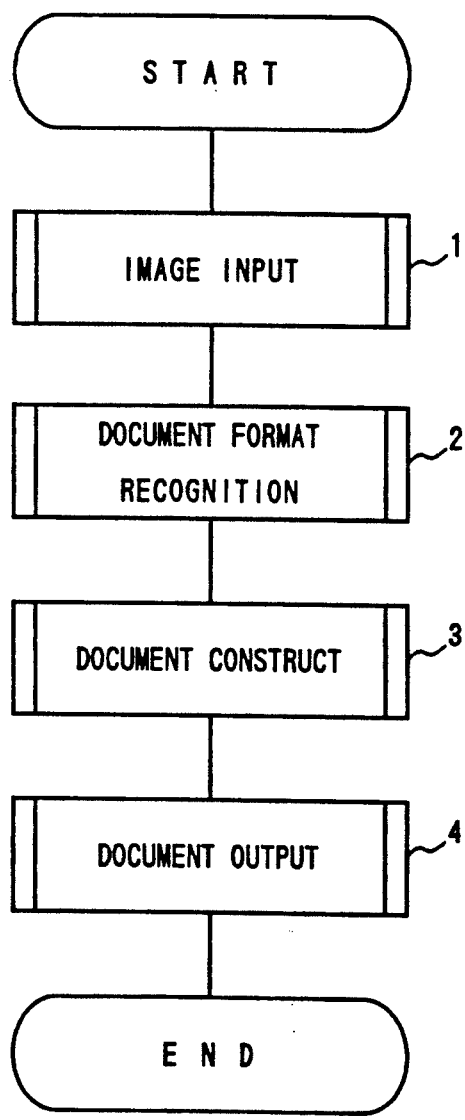
FIG. 2 is a flowchart showing the main operation steps of the document processing program executed in the document processing system.

FIG. 2 shows a general flowchart associated with an embodiment of a main control program of the document processing loaded in the memory area 970. Steps 1 to 4 respectively correspond to the subroutine programs stored in the areas 971 to 974, respectively. In an image input step 1, the image input device 93 reads a content of a form on which a document format is described and then loads the image area 981 with the obtained data as digital image information. A document format recognition step 2 recognizes an image of the document format to determine a format information item converted into code data so as to store the information in the document format data area 982. A document construction step 3 generates document content data associated with the document format to store the data in the document content data area 983; moreover, the system creates output data for the document data based on the resultant format and content data and then loads the output document data area 984 with the created data. In a special case of the document creation step 3 where the document content is missing, a document data item constituted only with a document format may be generated. In a document output step 4, the output document data is printed on a print form by means of the printer 95 or is stored in the data file 99.

Figure 3:
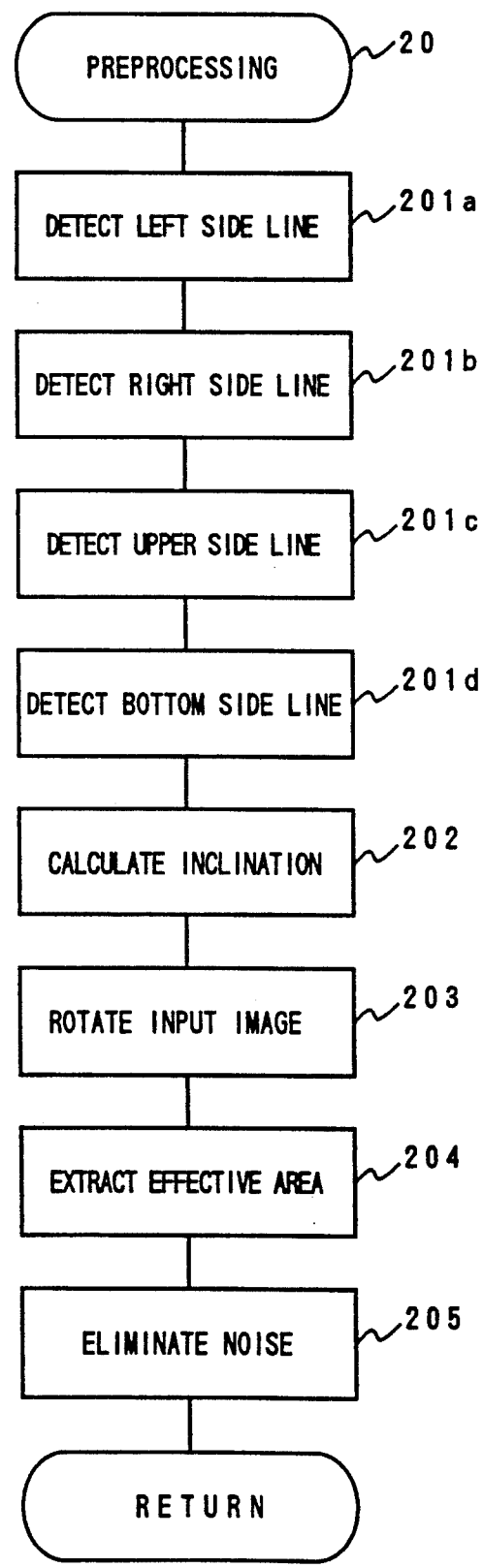
FIG. 3 is a schematic diagram showing an example of a document inputted as an image to the system.
Figure 4:
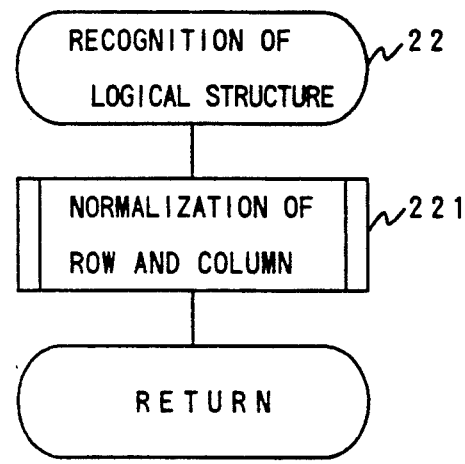
FIG. 4 is a diagram showing an example of a document produced from the system.

FIGS. 3 and 4 show document data examples useful to explain embodiments of the present invention in the following paragraphs. FIG. 3 includes an example of a document form EX1 to be supplied from the image input device 93 in the step 1. In FIG. 4, EX2 is a document example produced by the printer 95 in the step 4. The document processing apparatus here receives as an input thereto an image of a form on which a document format is described. The form includes, as in the case of EX1, a ruled line 100, a document title ("a statement of delivery" in this case) 101, a date item 102 including year, month, and day, and an item title row 103 (comprising an article name 103A, a quantity 103B, a unit price 103C, an amount 103D, and a total 103E). Thereafter, the document processing system produces a high-quality document like the EX2 including data contents 110 such as the various items and date items, for example, by use of a printer.

In this connection, in table of this embodiment defined by ruled lines 100, a rectangular zone arranged in a row or column direction is called a cell. Of these cells, those having item names 103 and those being left blank to be loaded with data later are respectively called item cells (or fixed field cells) and input/output (I/O) cells. Moreover, any areas or regions of which character and/or data entry items are outside the table are simply called fixed fields and/or input/output fields.

Figure 5:
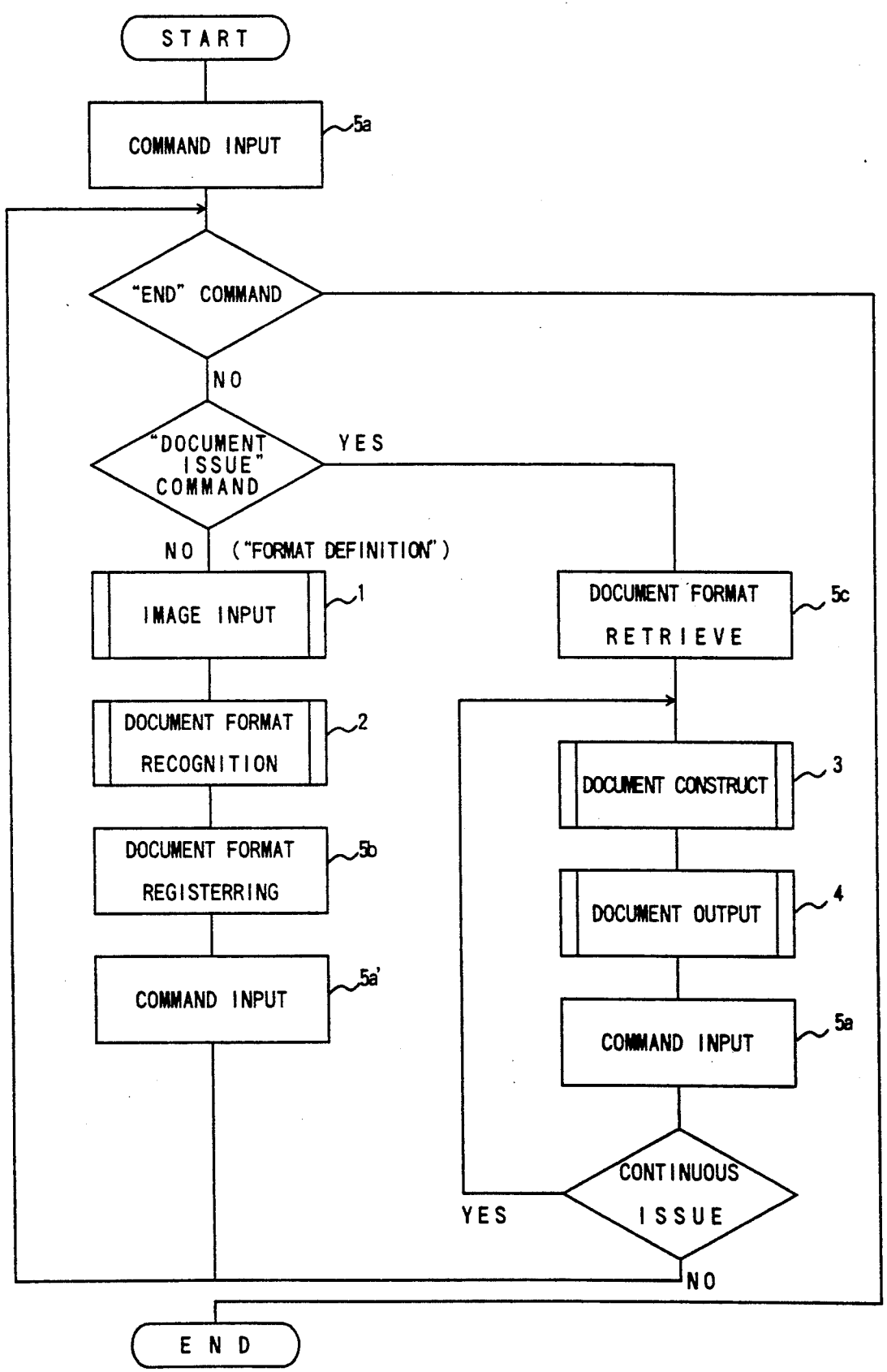
FIG. 5 is a flowchart showing a practical example of the document processing program.

FIG. 5 shows an example of a flowchart of another embodiment of the document processing program loaded in the memory area 970. In the program flowchart of FIG. 2, the operations ranging from an image input to a document print-out are accomplished through a sequence of operation steps. As contrasted with the flowchart of a program of FIG. 5, a document definition processing ranging from an image input to a document format registration and a document issuance processing from a document retrieval to a document output operation can be selectively achieved depending on an input command.

In the flowchart of FIG. 5, a command input step 5a is provided for the user to input a format definition command, a document issue command, or an end command. When the format definition command is supplied, the steps 1 and 2 described in conjunction with the flowchart of FIG. 2 are conducted and then step 5b is executed. Namely, document format data loaded in the document format data area 982 is obtained therefrom to be registered to a storage such as the disk device 99 in association with a document name supplied from the operator. Finally, a command input step 5a' is executed. For an input of the document issue command, the step 5c retrieves a desired document format from the registered document data. Next, the steps 3 and 4 of the flowchart of FIG. 2 are achieved and finally the command input step 5a is carried out. In this embodiment, in order for the operator to consecutively issue a plurality of documents by use of an identical document format, the final command input step is provided to allow the user to input a successive or continuous document issue command.

Subsequently, a detailed description will be given of the steps 1 to 4 as the primary portion in accordance with the present invention.

Figure 6:
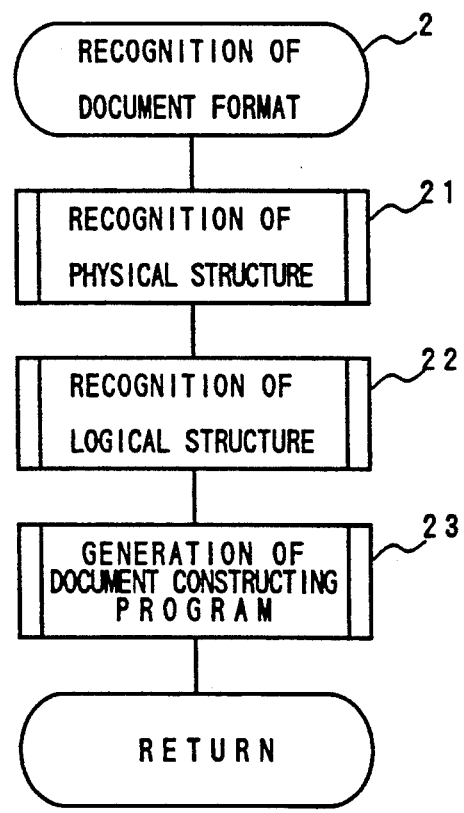
FIG. 6 is a flowchart of a subroutine executed in an image input step 1.

FIG. 6 is a detailed flowchart of a subroutine program for an image input executed in the step 1. In this program, step 11 is first executed to load the controller 94 with parameters including address information of the image data area 981, a range of an input image, a sampling density for digitalization, etc. A step 12 then indicates the controller 94, depending on the parameters, to input the image data and then initiates the image input device 93. In step 13, the system obtains from the controller 94 flag information denoting whether or not the image input processing has been finished. If this is not the case, the step 13 is again executed.

FIGS. 7A and 7B are diagrams for explaining a method of loading the memory 981 with an input image. FIG. 7A shows a state in which an image in a two-dimensional format is represented in a form of an array including small points called pixels (picture elements). It is assumed here that each point 120 takes a value associated with a state of white or black, which can be expressed with one bit in the memory 98. In this diagram, letters m, n, M, and N respectively stand for a pixel position in the horizontal direction, a pixel position in the vertical direction, a maximum value of the position m, and a maximum value of the position n. FIG. 7B shows a situation where the pixels above are stored in the image data area 981 of the memory 98. Assuming here that letters w, a, and b respectively denote the number of bits constituting a word, a memory address, and the bit number in a word; furthermore, that the letters m, n, and b each take an integer beginning from one and that the letter a is a relative address taking a value beginning from 0. Under the above condition, when the pixel 120 at the pixel address (m, n) is loaded in a position (a, b) in the memory 981 holding the following relationships, a one-to-one correspondence between the pixel and the position is established.

$$a = \downarrow \{M \cdot (n-1) + m\}/w \downarrow$$

$$b = M \cdot (n-1) + m - a \cdot w$$

In the expressions above, symbols $\downarrow$ and $\uparrow$ designate that in a result from an expression enclosed therebetween, a portion less than a unit or a fraction is to be truncated or omitted. In the following description, for simplification of the explanation, a position of a pixel as a reference is represented with a two-dimensional pixel position, not with a memory address.

Figure 8:
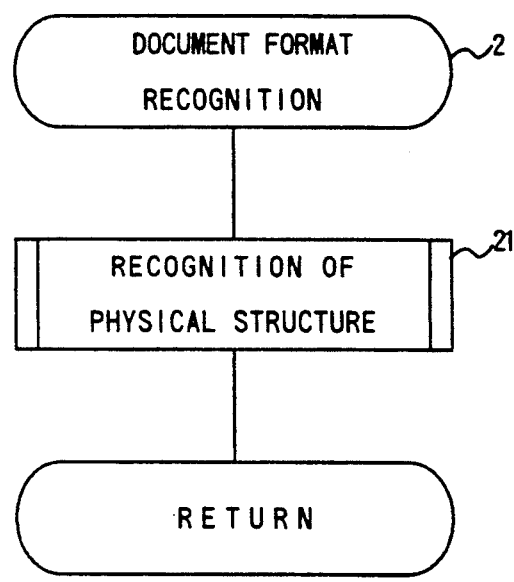
FIG. 8 is a flowchart showing a first embodiment of a subroutine executed in a document form or format recognition step 2.

FIG. 8 shows a processing flowchart associated with the first embodiment of the subroutine program for the document format recognition executed in step 2. In this embodiment, the document format recognition step 2 includes only a physical structure recognition step 21 for recognizing a physical structure as a format of the document. The physical structure of document employed here designates only a graphic structure such as the layout of line segments, letters, arcs, or the like. Namely, the structure does not explicitly designate any meaning of a document, which will be described later.

FIG. 9 is a flowchart of a subroutine called in the physical structure recognition step 21, which is stored in an area of the memory area 972, the area being different from an area alloated to the program 2.

In step 211, an assigned area is subdivided into a plurality of blocks based on a unit represented with a circumscribing rectangle of an area expressed by concatenating black pixels with each other. The assigned area includes the overall image when first obtained in the step 2. The area represents a portion of the image when recursively called in the step 21, which will be described later. A step 212 selects one of the blocks produced in the step 211. In step 213, the system judges to determine whether or not the selected block has a type representing a table. The judgement of the block type may be accomplished such that, for example, when the block has a horizontal width and a vertical height respectively exceeding predetermined threshold values, the block is determined to belong to a table. In other cases, the system decides that the block is not associated with a table. If the block type is determined to be other than a table, a step 218 is executed to recognize elements of the construction. Otherwise, a step 214 subdivides the block into subblocks or subregions in a unit of a circumscribing rectangle of an area obtained by linking white pixels. Next, step 215 selects one of the subblocks produced in the step 214. In step 216, the system recognizes whether or not the selected subblock or subregion has a type of an area constituting a cell. If this area is not associated with a cell or cells, a step 217 recognizes information about an area other than a cell. Otherwise, control returns to step 21 to recursively call the physical structure recognition subroutine program to further recognize the physical structure of the area. In this regard, a method of recursively calling the program for an execution thereof in an ordinary processor has been commonly known as an ordinary program language compilation technology. Since details thereabout are written in page 125 and subsequent pages of an article "Algorithm+Data Structure=Program" written by N. Wirth, 1976, pp. 125-143, published by PRENTICE-HALL, INC., a redundant description thereof will be avoided. The processing above is repeatedly executed for all blocks and all subblocks or regions.

Figure 10:
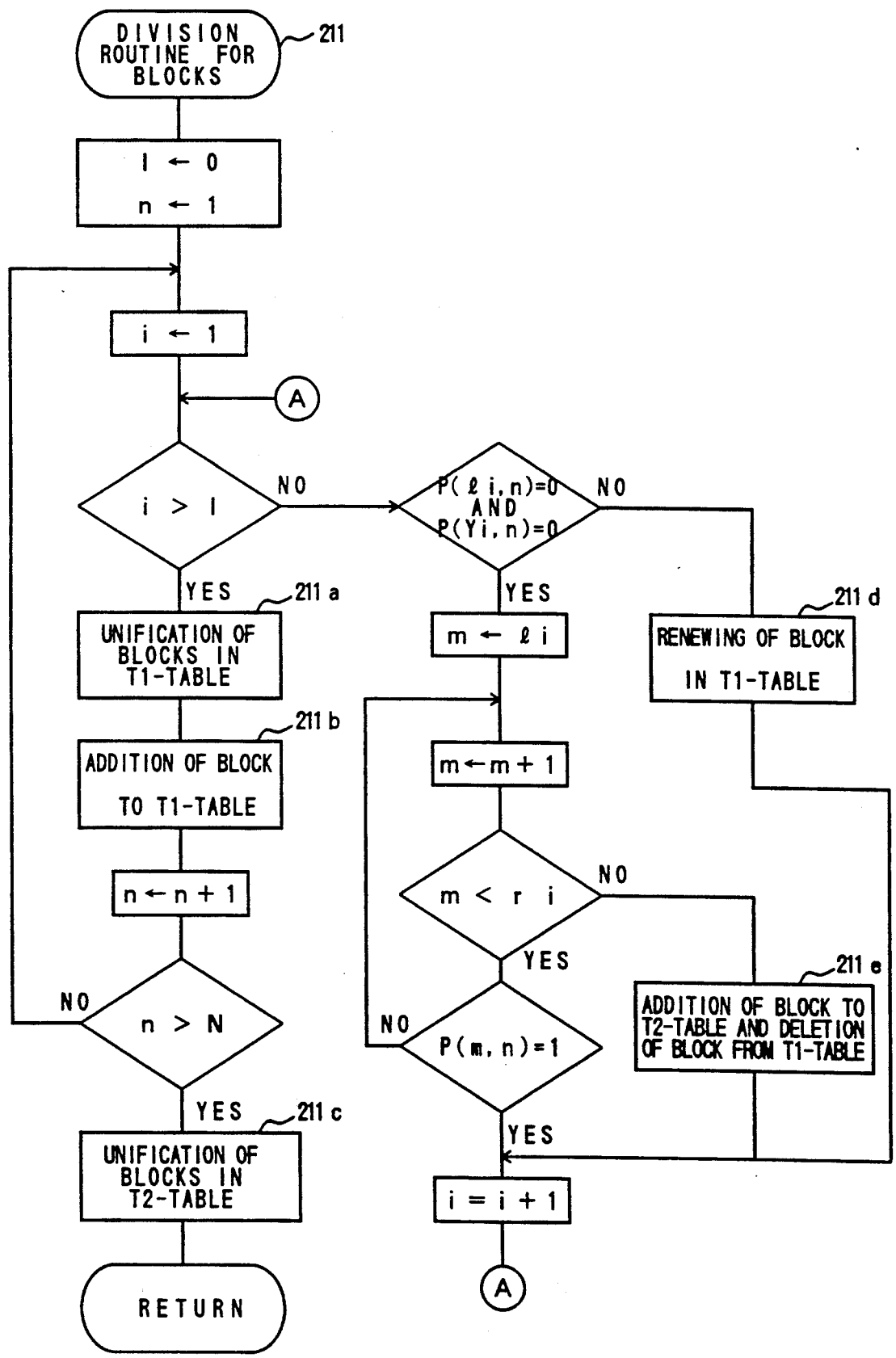
FIG. 10 is a flowchart showing in detail a block division step 211 of FIG. 9.
Figure 1:
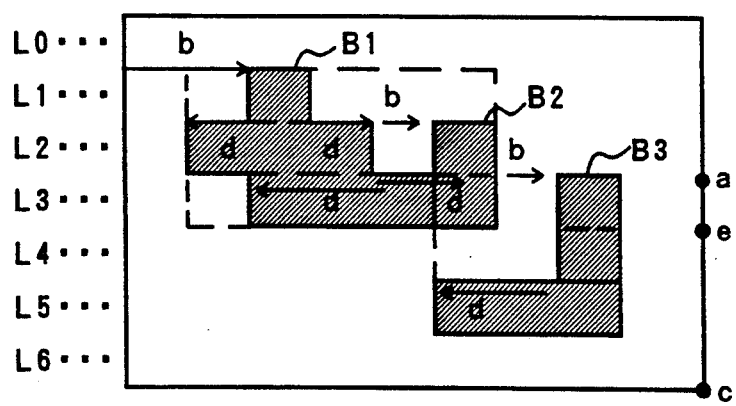
Figure 1:
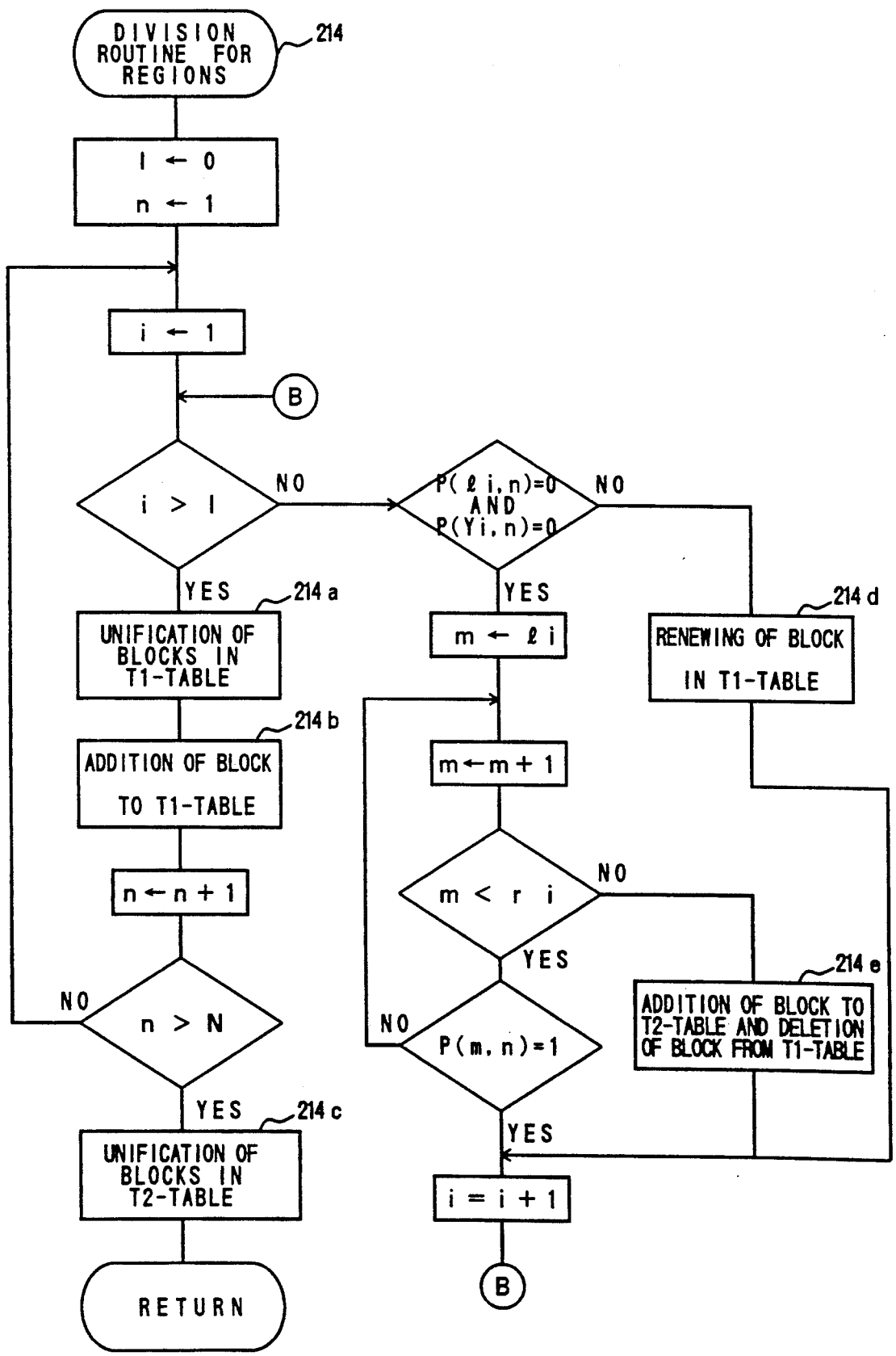

FIG. 10 is a detailed flowchart of the block division routine of step 211. In this flowchart, a variable I stands for the provisional number of blocks effective in the processing, a letter n indicates the vertical pixel position as described in conjunction with FIG. 7, i denotes the number assigned to a provisional block to be processed, N specifies the height of an objective image or area, p(x, y) designates the density of a pixel (x, y), m is a vertical pixel position, and li and ri indicate the left-most and right-most pixel positions of an i-th provisional block.

The subroutine above first sets the initial values to the respective variables. Each time pixels of a row or line are completely processed, steps 211a and 211b are repeatedly carried out. In the step 211a, when the processing of the pertinent row is finished, a table T1 of FIG. 11A is referenced to achieve a unification of provisional blocks for which an identical block is judged to be associated with a plurality of provisional blocks in the table T1. In the step 211b, new provisional blocks detected in the pertinent row are registered in the table T1. In association with the provisional block processing, the value of variable I is also updated. For each provisional block, it is determined whether the left-most or right-most end is to be checked. If this is the case, step 211d updates provisional block information; otherwise, whether or not the provisional block is terminated in the row is determined.

If the block is terminated therein, a step 211e registers the provisional block in table T2 of FIG. 11B as a resultant or regular block (addition of a block); moreover, the provisional block is deleted from the table T1. Finally, in step 211c, for the regular blocks of which the circumscribing rectangles overlap with each other, the system unifies the blocks in the table T2.

FIGS. 11A and 11B show the configurations of the tables T1 and T2 employed for registering thereto the provisional and regular block information. The table T1 of FIG. 11A stores therein provisional block information and includes such items as a pixel position at the left-most pixel of the provisional block, a right-most pixel position r thereof, and an upper-most pixel position n0. The table T2 of FIG. 11b is used to store therein information items of a regular block such as a left-most pixel position x0, a right-most pixel position x1, an upper-most pixel position y0, and a lower-most pixel position y1. By the way, a variable J denotes the number of blocks finally obtained.

FIG. 12 shows a concrete state of blocks associated with the block subdivision processing above. Letters a to e are respectively related to the steps 211a to 211e. Namely, the corresponding steps are executed at the denoted points. First, in a line or row L1, information designating a new provisional block B1 is registered the table T1 ... (b). In a subsequent line L2, based on detection of a black pixel in contact with the provisional block, the left-most and right-most pixel positions are updated ... (d), and then information of another provisional block B2 appearing in the same line is registered to the table T1 ... (b). Next, in a line L3, the left-most and right-most pixel positions are updated for the two provisional blocks B1 and B2. Moreover, information of another provisional block B3 is registered to the table T2. After this line is completely processed, the provisional blocks B1 and B2 are unified in a provisional block B1-2 ... (a). In a subsequent line L4, since there is missing a black pixel being in contact with the resultant provisional block B1-2, namely, since the provisional block is not continued, after the processing of this line is completed, information of regular blocks is created from the provisional block information so as to be stored in the table T2. Furthermore, the provisional information is deleted from the table T1 ... (e). In the processing above, when all lines are thus completely processed, for the blocks of which respective circumscribing rectangles overlap with each other (or have common areas), block information items are unified (c). In this case, two blocks B1-2 and B3 partially overlap with each other and are hence combined into a block.

FIG. 13 is a detailed flowchart of the area division routine executed in the step 214. In this flowchart, a variable I denotes the number of provisional areas effective in the processing, a letter n stands for the vertical pixel position described in conjunction with FIG. 7, a letter i designates a number assigned to a provisional area to be processed, N indicates a height of an objective area, p(x, y) denotes a density of a pixel (x, y), a letter m designates the horizontal pixel position, and li and ri respectively stand for the left-most and right-most pixel positions of an i-th provisional area.

Also in this processing, tables T1' and T2' similar to those of FIGS. 11A and 11B are used. First, the variables above are initialized. Each time the pixel processing is completely achieved for a line, steps 214a and 214b are repeatedly conducted. In the step 214a, for the areas for which an identical area is detected as a plurality of provisional areas at the completion of the processing of the line, the system unifies the provisional areas in the table T1'. In the step 214b, the new provisional areas detected in the partinent line are registered in the table T1'. In association with the processing, the value of the variable I is also updated.

For each provisional area, whether or not the left-most or right-most end thereof is updated is checked. If the update is to be executed, step 214d updates the provisional area information. Otherwise, whether or not the provisional area is terminated in the pertinent line is determined. If the area is terminated therein, step 214e registers the provisional area in the table T2' as a regular area and then deletes the provisional area data from the table T1'. Finally, a step 214c unifies regular areas of which circumscribing rectangles overlap with each other.

Figure 14A:
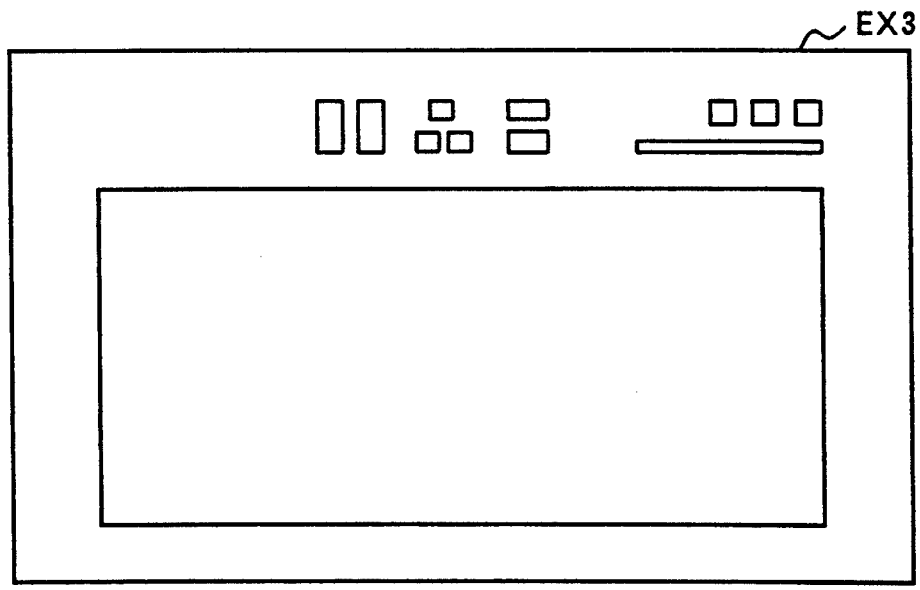
FIGS. 14A to 14C are explanatory diagrams useful for concretely explaining an execution process of the physical structure recognition step 21.
Figure 14B:
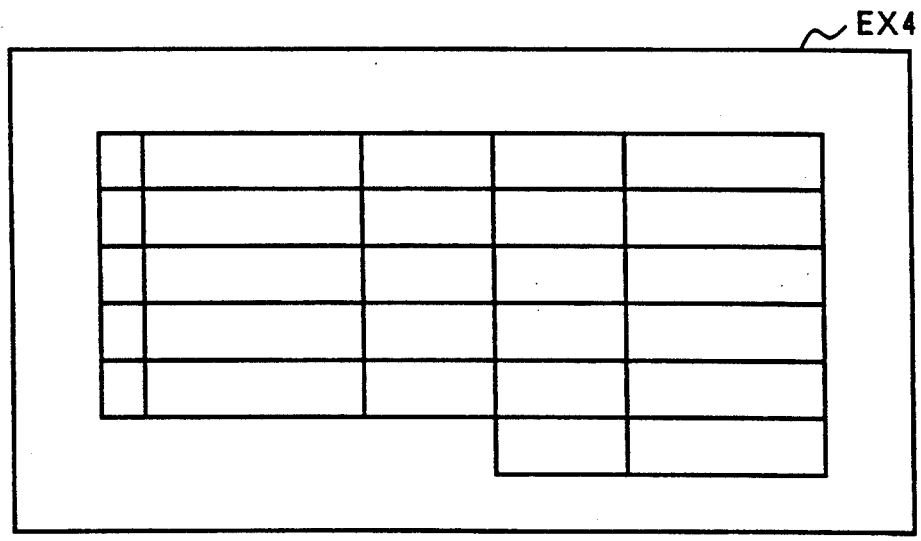
Figure 14C:
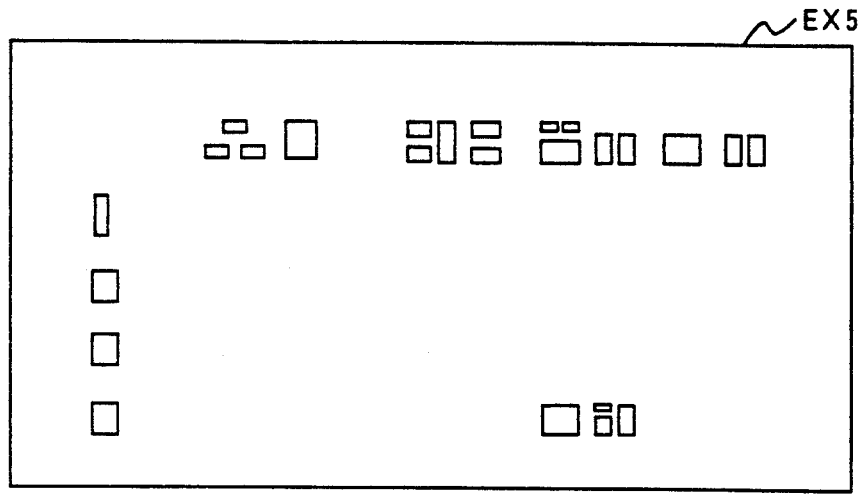

FIGS. 14A to 14C are diagrams for specifically explaining an operation process of the physical structure recognition step 21. FIG. 14A shows the structure EX3 of an area recognized when the first block division step 211 is conducted on the original image EX1. In this structure, each detected block is represented with a rectangle circumscribing the block. FIG. 14B shows the configuration EX4 of an area recognized when the area division step 214 is achieved on blocks judged to be associated with the table for EX3. Particularly, the detected areas are denoted with rectangles circumscribing the respective areas. FIG. 14C shows the constitution EX5 of an area recognized when the block division step 211 is accomplished for the areas judged to be cells in EX4.

Figure 15:
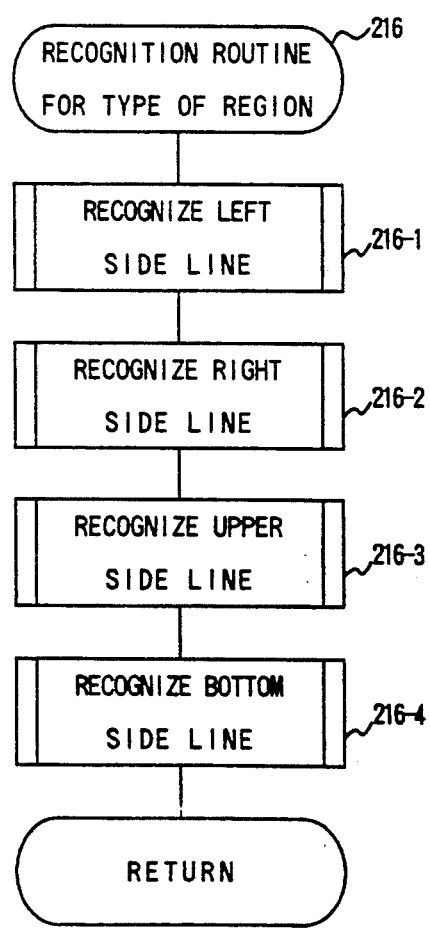
FIG. 15 is a flowchart showing in detail the region kind recognition step of FIG. 9.

FIG. 15 is a flowchart showing the operation of the area type recognition in the step 216 of FIG. 9. In this embodiment, the recognition routine includes four steps 216-1 to 216-4 for recognizing four side lines or edges, namely, the left, right, upper, and lower edges of each area. In the physical structure recognition routine (step 21), based on the recognition results, the system determines that an area having line segments of, for example, at least three side lines or edges is a cell.

Of the four side line recognition steps, a left edge recognition step 216-1 will be described in detail with reference to the flowchart of FIG. 16. In this flowchart, a letter n indicates a variable denoting a vertical-directional pixel position of an area, n0 and n1 respectively designate minimum and maximum values of the variable n, a letter m is a variable indicating a vertical-directional pixel position of the area, m0 denotes a value of the variable m at a boundary position of the area, and wid(n) is a variable designating the number of horizontally successive black pixels in the proximity of the boundary m0 in an image line at a vertical-directional position n.

The respective variables above are first initialized. A step 216a determines the value of wid(n) for the outside of the area. Subsequently, a step 216b obtains wid(n) for the inside of the area to add the result to the value obtained above. Based on the values of wid(n) determined for the respective n, a step 216c decides a line width of the left side line segment. The line width may be attained, for example, by use of a method in which the (n1−n0+1) values of wid(n) are used, and a most frequently appearing value is assumed as the line width. If the obtained line width is not zero, a subsequent step 216d identifies a location of the line segment and then step 216e adds data thereof to a line segment table TBL1.

FIG. 17 shows an example of the configuration of table T3 which is needed for the execution of the step recognizing the left side line or edge. The table T3 comprises for each value of n the left-most pixel position x0 of horizontally consecutive black pixels in the neighborhood of a boundary, the right-most pixel position x1 of the black pixels, and a length wid thereof. The following relationship holds for each value of n.

$$wid = x1 - x0 + 1$$

The table T3 is loaded in the work data area 985.

FIGS. 18A and 18B are diagrams for concretely explaining the left-edge recognition processing. FIG. 8A shows a state of the left edge in the original image. Namely, in the original image, due to image input errors and the like, a portion of black pixels may be missing and/or excessive black pixels are generated. In consequence, the edge portions of a direct or straight line naturally have depressed portions and projected portions. FIG. 18B shows a resultant image obtained by processing the input image through the left side recognition step 216-1. In this processing, based on data of a line segment most frequently appearing in the operation, the line width and the line position are determined so as to correct the depressed and projected portions to obtain line segment data. A straight line image is generated and is displayed by use of the obtained line segment data. Through the recognition, the straight line position information and the like can be obtained; moreover, the depressions and projections of the line image can be removed to generate a smooth straight line.

FIG. 19 shows a table TBL1 for storing therein recognition results of general line segments parallel to the coordinate axes including the left side above. The table TBL1 comprises, for each line segment which is assumed to be a rectangle area as shown in FIG. 18B, a upper-left corner coordinate (LX0, LY0) and a lower-right corner coordinate (LX1, LY1). The table TBL1 is prepared in the document format data area 982. Straight line data recognized in the construction element recognition step 218 is also loaded in the table TBL1.

Next, a description will be given of processing of the step 217 to recognize elements other than a cell.

Figure 20A:
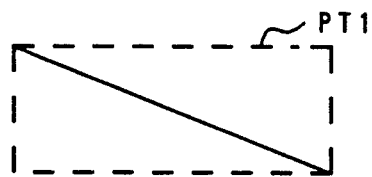
FIGS. 20A to 20F are diagrams respectively showing typical patterns of non-cell elements.
Figure 20B:
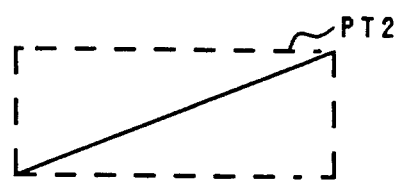
Figure 20C:
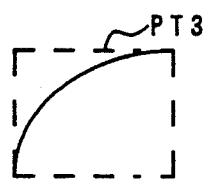
Figure 20D:
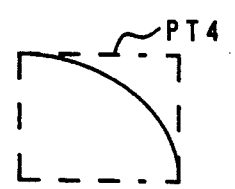
Figure 20E:
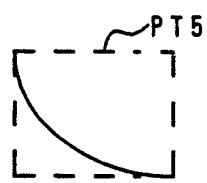
Figure 20F:
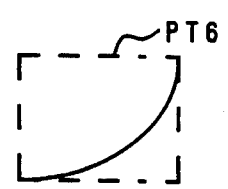

FIGS. 20A to 20F show representative patterns of non-cell elements as objects of the present embodiment. FIGS. 20A and 20B are patterns PT1 and PT2 associated with cells having respective diagonal lines. For these patterns, immediately before the step 214c of the area or region division step 214 described in conjunction with FIG. 13, portions enclosed with the broken lines are of substantially an identical size and are overlapped with each other. FIGS. 20C to 20F respectively show patterns PT3 to PT6 corresponding to corner portions in the table in which the corner portions are rounded to arcs. For these patterns, immediately before the step 214c of the area or region division step 214, portions enclosed with the broken lines become small areas or regions, which are overlapped with each other in a relatively large area. In either case of these patterns, the region type recognition step 216 cannot detect four edges or sides including the left, right, upper, and lower side lines. Consequently, these patterns are judged to be associated with regions other than a line.

Figure 21:
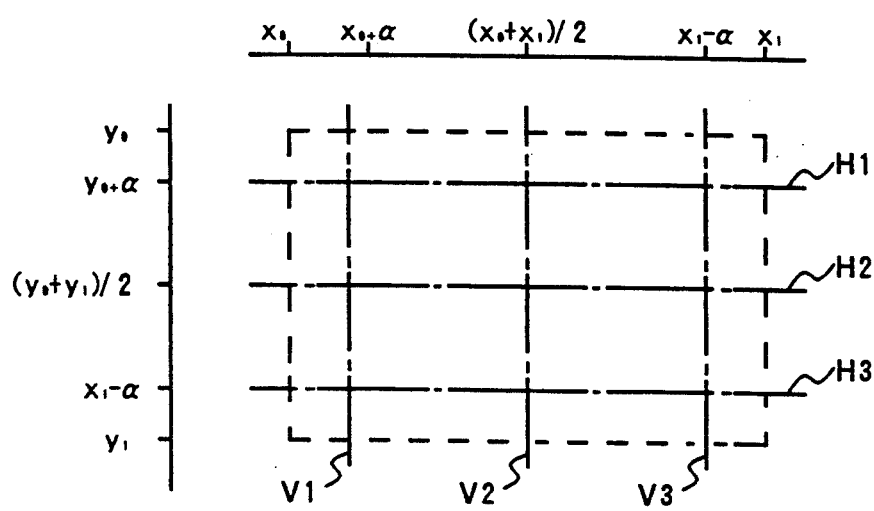
FIG. 21 is a schematic diagram useful to explain processing in which a circular arc pattern is detected from an input image.
Figure 2:
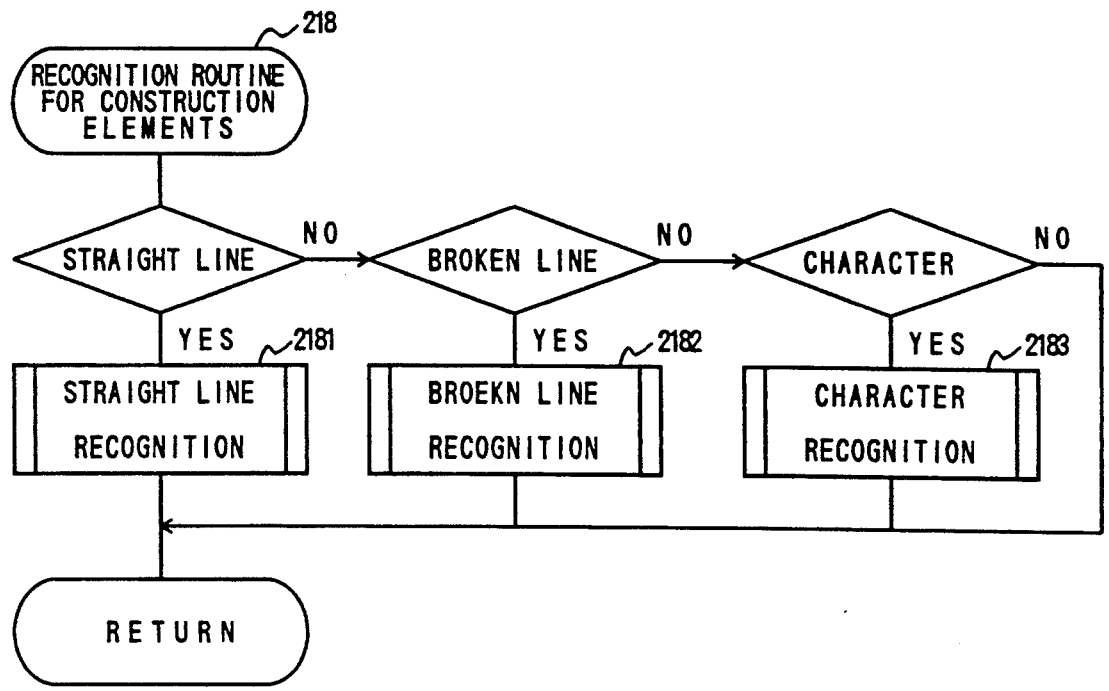
Figure 2:
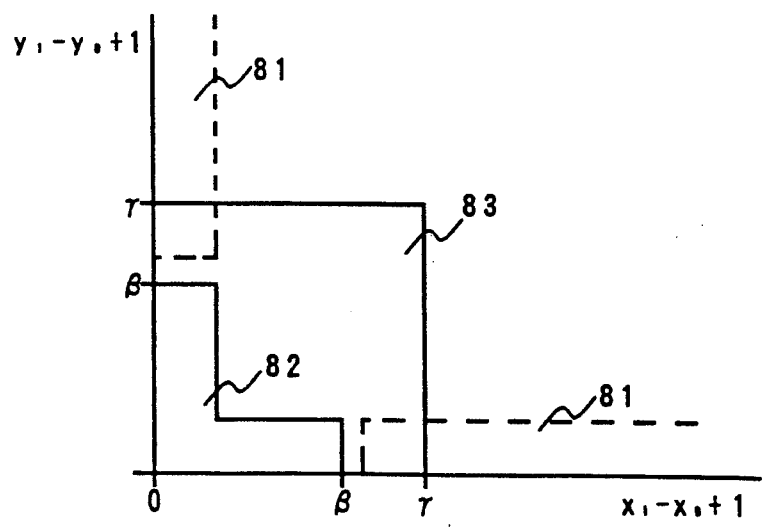

Referring now to FIG. 21, a description will be given of a processing example in which a circular arc pattern above is obtained from an input image. In FIG. 21, a portion enclosed by the broken lines is a region detected in the step 214. Either one of the patterns of FIGS. 20A to 20F exists in this area. First, the area is subdivided into 16 sub-regions by use of six dot-and-dash lines. Three vertical lines V1 to V3 are drawn as follows. Based on the area boundary values x0 and x1 and a constant $\alpha$ having a predetermined small value, the respective x coordinate values take the values $x0+\alpha$, $(x0+x1)/2$, and $x1-\alpha$. Similarly, three horizontal lines H1 to H3 are drawn such that based on the area boundary values y0 and y1 and the predetermined constant $\alpha$, the respectively coordinate values take the values $y0+\alpha$, $(y0+y1)/2$, and $y1-\alpha$. Subsequently, a density of black pixels is checked in the four central regions enclosed with the six dot-and-dash lines. The black pixel density is defined as a ratio of black pixels to all pixels existing in each partial area. Let us assume here that a region having a density exceeding a predetermined threshold value and a region with a density not exceeding the value are respectively called black and white areas. The patterns can be judged as follows under the condition above. Namely, a region including a black area in the upper-left and lower-right portions belongs to the pattern PT1, a region including a black area in the upper-right and lower-left portions belongs to the pattern PT2, a region including a black area in the upper-left, upper-right, and lower-left portions belongs to the pattern PT3, a region including a black area in the upper-left, upper-right, and lower-right portions belongs to the pattern PT4, a region including a black area in the upper-left, lower-left, and lower-right portions belongs to the pattern PT5, a region including a black area in the upper-right, lower-left, and lower-right portions belongs to the pattern PT6.

In the processing above, for a region judged to include the patterns PT1 or PT2, information items about the diagonal line are loaded in table TBL2 of FIG. 22. Table TBL2 comprises, for each entry row, left-most pixel coordinates (SX0, SY0) of the diagonal line, right-most pixel coordinates (SX1, SY1), and a line width SW. The left-most and right-most coordinate values can be easily attained by checking black pixels in the corner points of the objective area or in the vicinity of the corner point.

The line width SW, for example, is determined as follows. Based on the number of black pixels BP in the region and the length of line segment SLA, namely, $$SLA = \sqrt{(SX0 - SX1)^2 + (SY0 - SY1)^2}$$

the line width is reduced as follows.

$$SW = BP/SLA$$

Alternatively, the obtained value may be rounded to an integer by counting fractions of 5 and over as a unit and by disregarding the rest. The table TBL2 is prepared in the document format data area 982.

For the regions judged to be associated with the patterns PT3 to PT6 in the above processing, information items about arcs are stored in a table TBL3 of FIG. 23. This table TBL3 includes, for each entry column, coordinates (AX, AY) of a pixel at a center of an arc, a radius AR, a line width AW, a start angle AA0, and a termination angle AA1. The start and termination angles are respectively defined as (90, 180), (0, 90), (180, 270), and (270, 0) depending on the pattern types PT3 to PT6 obtained according to the method above. The radius AR and the line width AW can be computed, for example, by use of the number BP of black pixels in the region, a length AL of a longer side line of the region, and a length AS of a shorter side line thereof as follows.

$$AS - AW/2 = AR$$

$$AW \cdot (\pi \cdot AR/2 + AL - AS) = BP$$

The central pixel coordinates (AX, AY) are defined for the respective patterns PT3 to PT6 as follows. Namely, the central pixel point is apart from an end of the longer side line by the length of the shorter side line. The table TBL3 is also loaded in the document format data area 982.

FIG. 24 shows an embodiment of the construction element recognition routine executed in the step 218. In this processing, the system first judges to determine whether the element type of a construction element of the document is a straight or direct line, a broken line, or a character. Based on the judgement result, a straight line recognition step 2181, a broken line recognition step 2182, or a character recognition step 2183 is executed.

Referring next to FIG. 25, a description will be given of an example of a method of judging a construction element type. In this example, the type of construction element is decided depending on the sizes and contours or shapes of rectangles circumscribing the respective blocks attained in the block division step 211.

In FIG. 25, the abscissa and the ordinate respectively represent a width, X1−X0+1, in a horizontal direction of a rectangle subscribing an objective block and a height, Y1−Y0+1, in the vertical direction. In this example, it is assumed that preset constants $\beta$ and $\gamma$ are employed as boundary values to define ranges 81 to 83 such that the objective blocks respectively belonging to the ranges 81, 82, and 83 are judged to be a straight line, a broken line, and a character, respectively.

Figure 26:
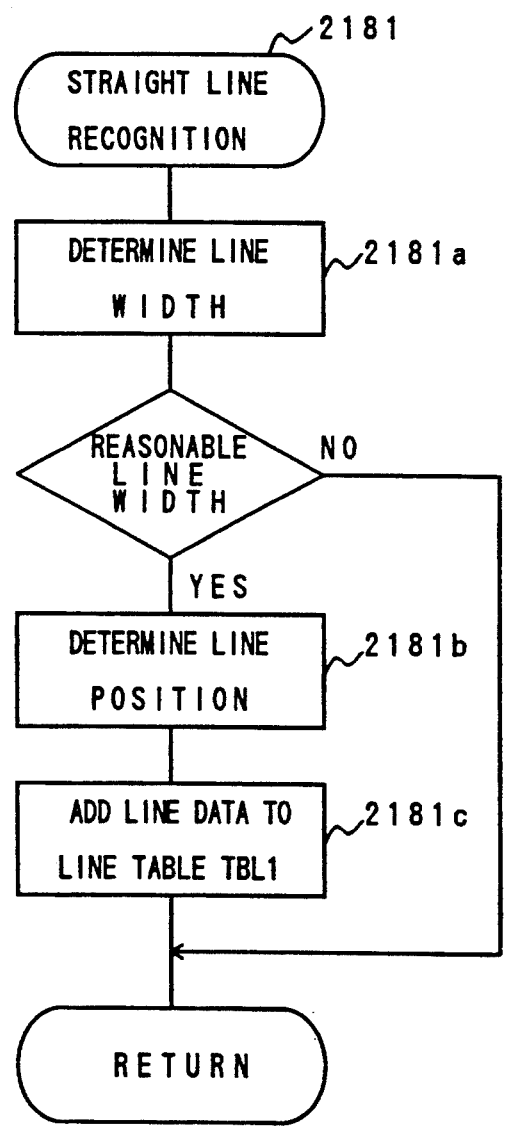
FIG. 26 is a detailed flowchart showing the operation of a straight line recognition step 2181 of FIG. 24.

FIG. 26 is a flowchart of the straight line recognition routine executed in the step 2181. The routine of the step 2181 obtains information about a straight line in a fashion completely similar to that employed in the step of recognizing the left side line described in conjunction with FIG. 16. In this flowchart, step 2181a determines a line width which corresponds to the steps 216a to 216c of FIG. 16. Similarly, a line position decision step 2181b is associated with the step 216d; furthermore, a step 2181c corresponds to step 216e of FIG. 16. Recognition results are registered, in a manner completely similarly to that used in the processing of FIG. 16, to a line segment table TBL1 loaded in the document format data area 982.

Figure 27:
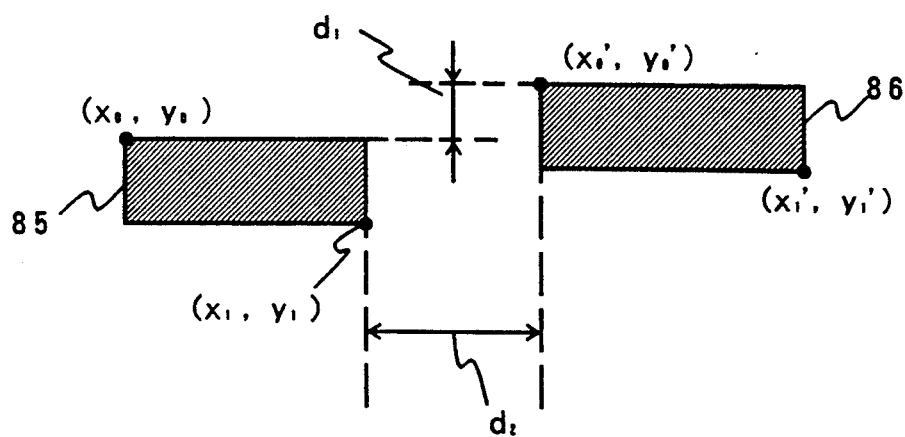
FIG. 27 is a schematic diagram for explaining conditions related to construction elements of a broken line.

Subsequently, a description will be given of the broken line recognition routine executed in the step 2182. This routine checks to determine whether or not the detected broken line element is an extension of a broken line already detected. Referring to FIG. 27, conditions under which two broken line elements constitute a broken line will be first described. In the configuration of FIG. 27, let us assume that pixel coordinates of the upper-left corners respectively of the two broken line elements 85 and 86 are respectively represented as (x0, y0) and (x0', y0') and that pixel coordinates of the lower-right corners respectively of the two broken line elements 85 and 86 are respectively represented as (x1, y1) and (x1', y1'). In this situation, a set of broken line elements satisfying the following inequalities with respect to predetermined constants d1 and d2 are assumed to constitute a broken line.

Min (|y0−y0'|, |y1−y1'|)<d1

Min (|x1−x0'|, |x0−x1'|)<d2

In these inequalities, a function Min takes a smaller value selected from the values of two expressions.

Figure 28:
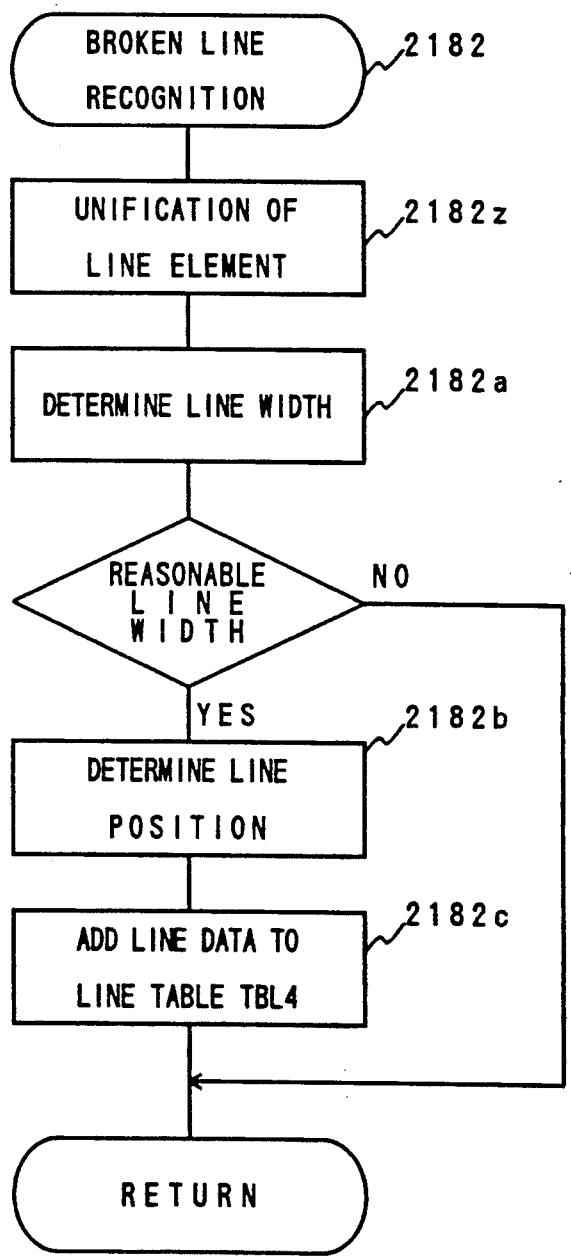
FIG. 28 is a flowchart showing in detail a broken line recognition step 2182 of FIG. 24.

FIG. 28 is a flowchart of the broken line recognition routine 2182. In step 2182z, the system checks to determine whether or not the pertinent broken line element is an extention of a broken line beforehand stored in a table TBL4, which will be described later. If this is the case, the broken line range is expanded to include all of these elements. In the range of broken line elements thus unified in a sequential manner, broken line information items can be obtained in the completely same manner as for the direct line recognition step described in conjunction with FIG. 26. In the flowchart of FIG. 28, a line width decision step 2182a corresponds to the step 2181a of FIG. 26. However, in the processing to determine the maximum frequency of the value WID (reference is to be made to the description of the step 216c above), the frequency having a value 0 is omitted in consideration of an interval between broken line elements in the case of a broken line. A line position determination step 2182b is associated with the step 2181b of FIG. 26;

moreover, a step 2182c corresponds to the step 2181c. Like in the case of the straight line recognition, the recognition results are loaded in a broken line table TBL4 prepared in the document format data area 982.

FIG. 29 shows an example of the configuration of the broken line table TBL4. Table TBL4 comprises based on the assumption that a set of a plurality of broken line elements constituting a broken line form a rectangular area are data items of upper-left corner coordinates (DX0, DY0) and lower-right corner coordinates (DX1, DY1) of the rectangular area. The table TBL4 is also loaded in the document format data area 982.

FIG. 30 is a flowchart of the character recognition routine executed in step 2183. First, in the vicinity of the pertinent block, the system checks for an existence of a block of which the block type has not been determined and which is possibly judged to be a character element. If such a block is found, step 2183d registers the block as a character string element to the work data area 985. Otherwise, step 2183a produces a character string including the pertinent block. In this processing, the character string elements registered in the step 2183d are checked so as to collect blocks satisfying character constructing conditions, which will be described later, thereby obtaining as a character string range a rectangular range including all of these blocks. In step 2183b, a specific character region is extracted from the character string range, which may be accomplished as follows, for example. In the rectangular range, projection data of black pixels is produced first along a shorter side or edge line thereof, then the rectangular range is subdivided into subareas at portions where the gap of the projection data appearing along a longer side line exceeds a predetermined threshold value. A step 2183c translates a character pattern included in the specific character region into character codes in accordance with a known character recognition method. As the character recognition method, it is possible to employ a method described on page 468 and subsequent pages of an article "Image Processing Handbook" written by M. Onoe (1987, Shokodo Ltd.).

Figure 31:
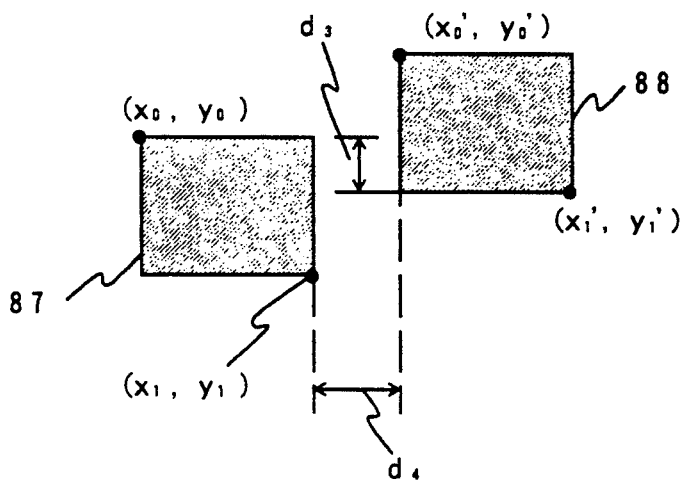
FIG. 31 is a schematic diagram for explaining conditions associated with constituent elements of a character string.

Whether or not adjacent blocks are elements constituting a character string may be determined as follows, for example. Let us assume in FIG. 31 that pixel coordinates at upper-left corners of two blocks (character elements) are respectively represented as (x0, y0) and (x0', y0') and that those at lower-right corners are expressed as (x1, y1) and (x1', y1'), respectively. In this situation, the character elements are assumed to constitute a character string when the character elements satisfy the four following inequalities with respect to predetermined constants D3 and D4.

$$y0-y1'<D3$$

$$y0'-y1<D3$$

$$x0-x1'<D4$$

$$x0'-x1<D4$$

Figure 32A:
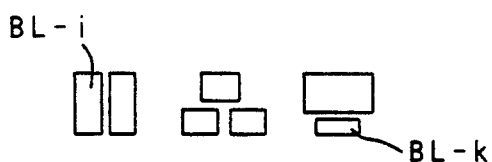
FIGS. 32A to 32C are diagrams for explaining processing steps of the character recognition step 2183.
Figure 32B:
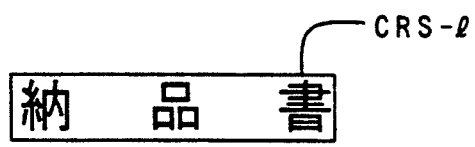
Figure 32C:
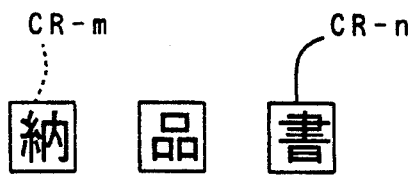

FIGS. 32A to 32C are diagrams showing an operation procedure actually adopted in the character recognition step 21 above. FIG. 32A shows a set of blocks BL-i to BL-k which have been judged to be unified with each other under the conditions above. FIG. 32B shows a state where a character string CRS-l is actually produced in the step 2183a. FIG. 32C shows results of the step 2183b in which the individual characters CR-m to CR-n are extracted from the character string.

Figures 33, 34:
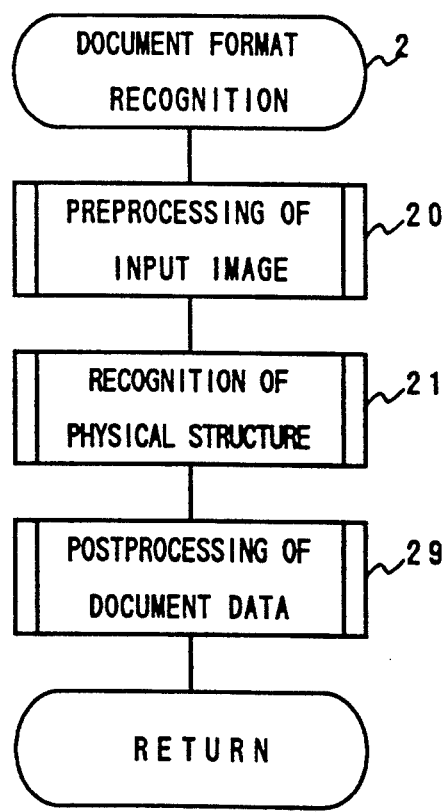
FIG. 33 is a configuration diagram of a table TBL5 for storing therein character recognition results.
FIG. 34 is a flowchart showing another embodiment of the document form or format recognition step 2.

The recognition results obtained from the character recognition step 2183 are loaded in a format of a table TBL5 of FIG. 33 in the document format data area 982. The table TBL5 includes, for each entry column, pixel coordinates (CX0, CY0) of the upper-left corner of a rectangle enclosing a character, pixel coordinates (CX1, CY1) of the lower-left corner thereof, and a character code CC. For the character code, there may be employed, for example, a character code system stipulated in accordance with the Japanese Industrial Standard.

The basic operation of the document format recognition step 2 of FIG. 8 has been described. However, by additionally disposing other processing functions in step 2 above, the document recognition precision may be further improved.

FIG. 34 shows another embodiment of the document format recognition step 2 thus functionally expanded. In this embodiment, prior to the physical structure recognition step 21, a preprocessing of an input image 20 is conducted; moreover, posterior to the physical structure recognition step 21, a postprocessing of document data 29 is achieved.

FIG. 35 shows an example of a flowchart of the postprocessing subroutine program used in the step 20. This program corrects an inclination of input image data. In steps 201a to 201d, the system detects the left, right, upper, and lower side lines, which will be described later. A step 202 is disposed to compute an inclination of the overall image based on inclination information items of the four side lines determined in the steps 201a to 201d. This computation may be accomplished, for example, based on a mean value of four values including (the inclination of the left side line+90°), (the inclination of the right side line+90°), the inclination of the upper side line, and the inclination of the lower side line. A step 203 rotates the image by an angle decided in the step 202. A step 204 then separates, when necessary, an area effective as a document image; whereas, a step 205 removes noise information from the image if necessary.

Figure 36A:
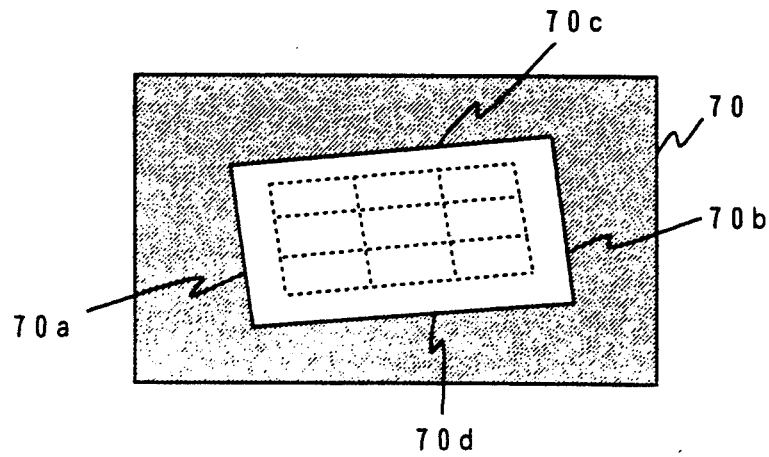
FIGS. 36A and 36B are schematic diagrams showing an example of an input image processed in the preprocessing step 20.
Figure 36B:
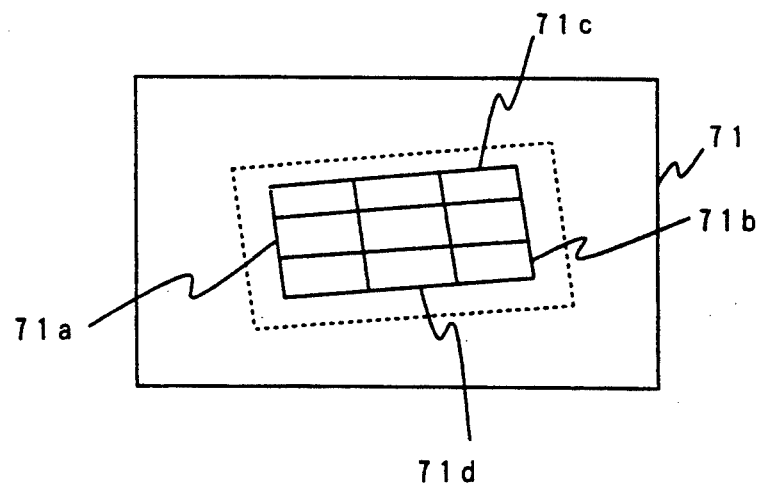

Referring now to FIGS. 36A and 36B, a description will be given of edge or side lines of an image detected in the processing step 20.

FIG. 36A shows a case where a boundary line of a form or a sheet of paper included in an input image 70 can be adopted as a reference or base line for the computation of the image inclination. Namely, in a case where the form has its own ground color (white, for example), the image input device 93 allows the operator to input an image by use of a background color different from the ground color. For example, in an image input apparatus in which a manuscript is statically placed such that a sensor receives a reflection light from the surface of the manuscript, the operation above can be implemented by selecting black as the color of the manuscript cover. In such a case, the four side lines including the upper, lower, left, and right side lines can be detected with reference to the respective boundary lines of the form as indicated with reference numerals 70a to 79d.

FIG. 36B is a case where although boundaries of the form cannot be detected in an input image 71, an outer frame of a table drawn in the document can be detected as a reference or base line for the inclination computation. In this case, the system detects as four side lines the boundaries 71a to 71d of the list as shown in FIG. 36B. More specifically, for each side line, an outer-most boundary where a state of consecutive white pixels changes to a state of a black pixel is determined such that straight lines of these boundary lines are obtained by establishing a correspondence therebetween.

Figure 37:
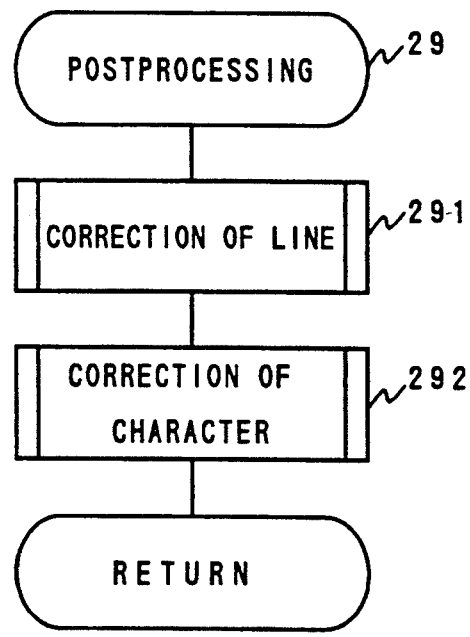
FIG. 37 is a detailed flowchart of a post-processing step 29 of FIG. 34.

FIG. 37 shows an example of a flowchart of the postprocessing subroutine program used in step 29. In the postprocessing example, a correction is achieved on image data stored in the document format data area 982 by the physical structure recognition processing 21. Step 291 corrects line data items stored in the tables TBL1 to TBL4 and then step 292 conducts a correction on character information loaded in a table TBL5. Incidentally, in the embodiment above, although the line and character correction steps 291 and 292 each are sequentially once executed, the line or character correction may be repeatedly carried out at an arbitrary point of time in response to an instruction from the operator, which has been commonly employed in an ordinary word processor and an ordinary computer aided design (CAD) system.

Figure 38:
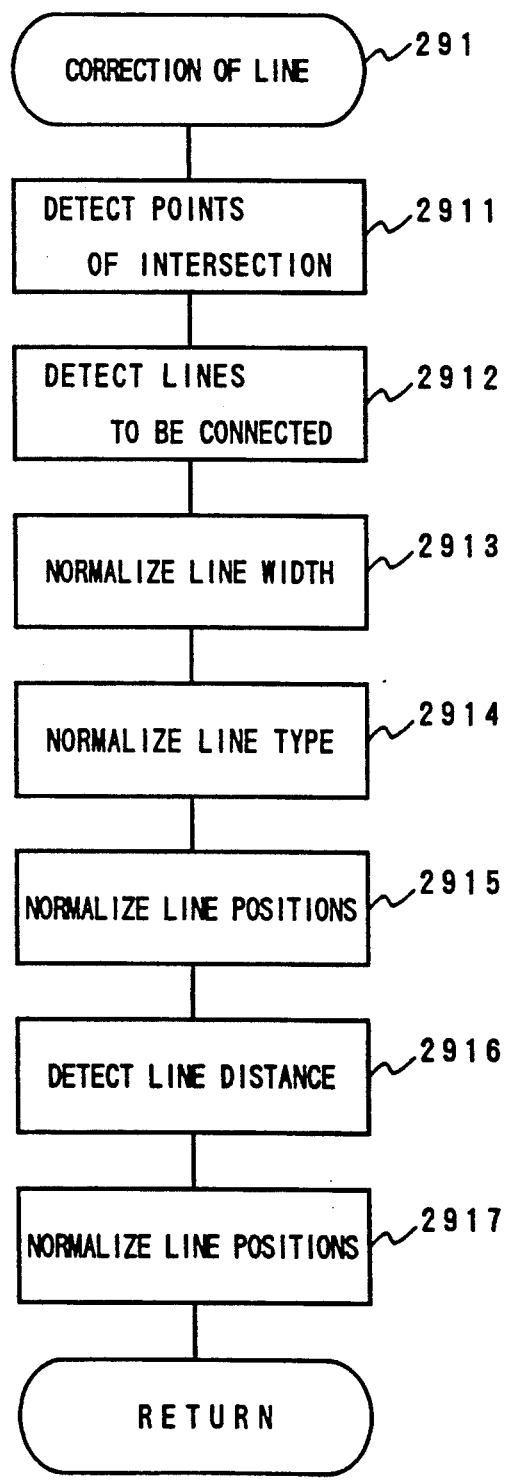
FIG. 38 is a detailed flowchart of a line correction processing step 291 of FIG. 37.

The line correction step 291 conducts, as in the case of the graphic or figure processing function of the word processor and CAD system, such operations as movement, deletion, expansion, compression, etc. of a line depending on an operator's request. Referring here to FIG. 38, as an example of a special function of the line correction step 291, an automatic correction of ruled line data in association with other lines will be described. A step 2911 obtains intersections of all lines stored in the document format data area 982. In this processing, for each line, distances between end or branch points thereof and other lines are also attained such that an end point of which the distance is less than a predetermined threshold value is also assumed to be an intersection. A step 2912 determines for each line distances between branch or end points thereof and the other lines to obtain a set of a plurality of lines each having a relationship therebetween that the distance is less than a predetermined threshold value. A step 2913 selects, from the set of lines, lines having a line width less than a predetermined threshold value. For the selected lines, line width data items thereof are replaced with either one line width data item or with a mean value thereof. In step 2914, for the set of lines above, line types thereof are replaced with a line type most frequently appearing therein. A step 2915 normalizes line positions in the set of the lines. For each horizontal line, in order to match the start and end points thereof with vertical lines of the outer frame, the x-axis coordinates thereof, for example, are replaced with mean values of the x coordinates of the respective horizontal lines. In addition, for the vertical lines, in order to match the start and end points thereof (y-axis coordinates) with horizontal lines of the outer frame, the y-axis coordinates are replaced with mean values of the associated coordinates of the respective vertical lines. A step 2916 detects, from a plurality of parallel lines, substantially parallel lines, namely, lines of which distances between associated points do not exceed a preset threshold error. Step 2917 moves or displaces the respective lines as necessary to set the distance therebetween to be equal to a mean value thereof.

Figure 39:
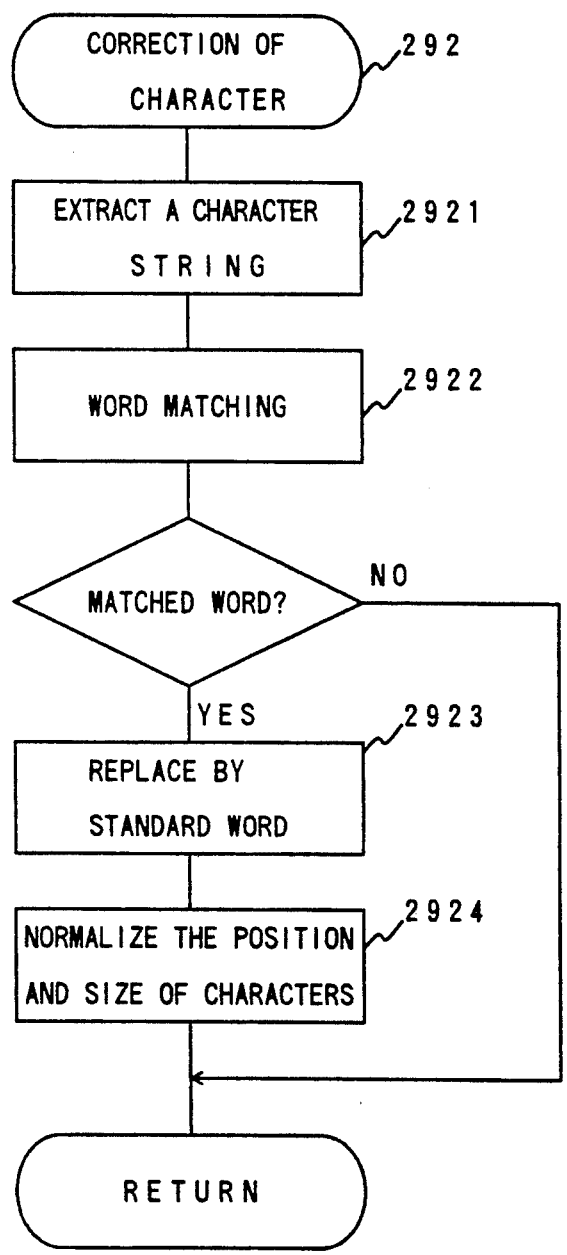
FIG. 39 is a detailed flowchart of a character correction processing step 292 of FIG. 37.

In the character correction step 292, as in the case of the character processing function of the word processor and the CAD system, the system executes processing steps such as movement, alteration, addition, size change, etc. on a character in response to an indication from the operator. Referring here to FIG. 39, a description will be given of a special processing in which a character is automatically corrected in association with other characters. A step 2921 extracts as a character string a set of a plurality of characters adjacent to each other. The adjacent characters can be detected, for example, by use of the method described in conjunction with FIG. 31. A step 2922 collates the detected character string with groups of standard words beforehand prepared in the document format recognition program 972. Each word is collated with the first character of the character string. The system then determines as a result, for example, a word having the highest ratio (matching ratio) with respect to the character string, the ratio being associated with the number of characters matching the word. If the collation result indicates that the matching ratio exceeds a preset threshold value, a step 2923 corrects character codes of unmatched characters with respect to the standard word, thereby matching the word in the character string with the standard word. A step 2924 corrects, in order to align character positions and sizes in an identical character string, values of rectangle information CX0, CY0, CX1 and CY1 registered to the table TBL5. For the correction of the values, there may be adopted various methods, for example, a method in which a mean value associated with the character string is simply used or a method in which based on the recognized character codes, a size of the character frame is determined from character contour information so as to correct the values depending on the character frame position and size. The steps 2921 to 2924 are repeated for respective character strings.

Figures 40, 41:
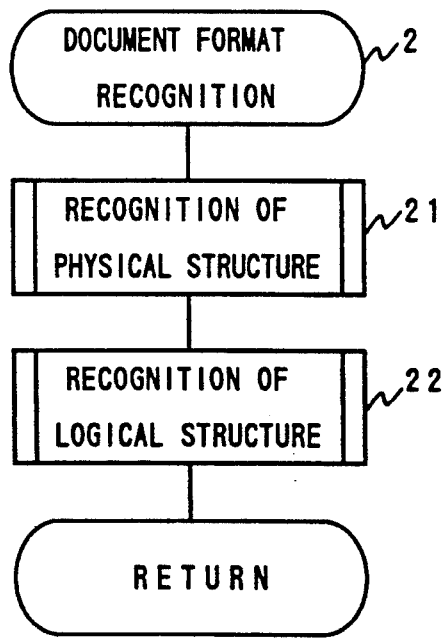
FIG. 40 is a diagram showing the construction of table TBL6 for storing therein word information.
FIG. 41 is a flowchart showing another embodiment of the document form recognition step 2.

The information of words thus obtained for the respective character strings is stored in table TBL6 of FIG. 40 in the document format data area 982. The table TBL6 comprises for each entry a number WN of characters constituting a word and information items related to each character, namely, information items of printer WC1 to WCp to the table TBL5, where a letter p denotes a maximum value of the character count WN per word. The table TBL6 is utilized in a second embodiment of the document format recognition program, which will be described later.

FIG. 41 is a flowchart of the second embodiment of the document format recognition subroutine program executed in the step 2. In this embodiment, the processing comprises the physical document structure recognition step 21 described above and step 22 for recognizing a logical structure of the document, which will be described in the following paragraphs. In this connection, "a logical structure of a document" denotes a structure associated with a document such as the structure of the row and column of each cell of a document, which will be described later, and information items related to the fields thereof.

FIG. 42 is a first embodiment of the subroutine program to be called or invoked in the logical structure recognition step 22. Program 22 is stored in an area different from the area of the program 2 in the document format recognition program region 972. The first embodiment of the subroutine 22 is constituted only with a step 221 for normalizing positions and sizes of characters, ruled lines, etc. written in the document to align these items with respect to the row and column.

Figure 43:
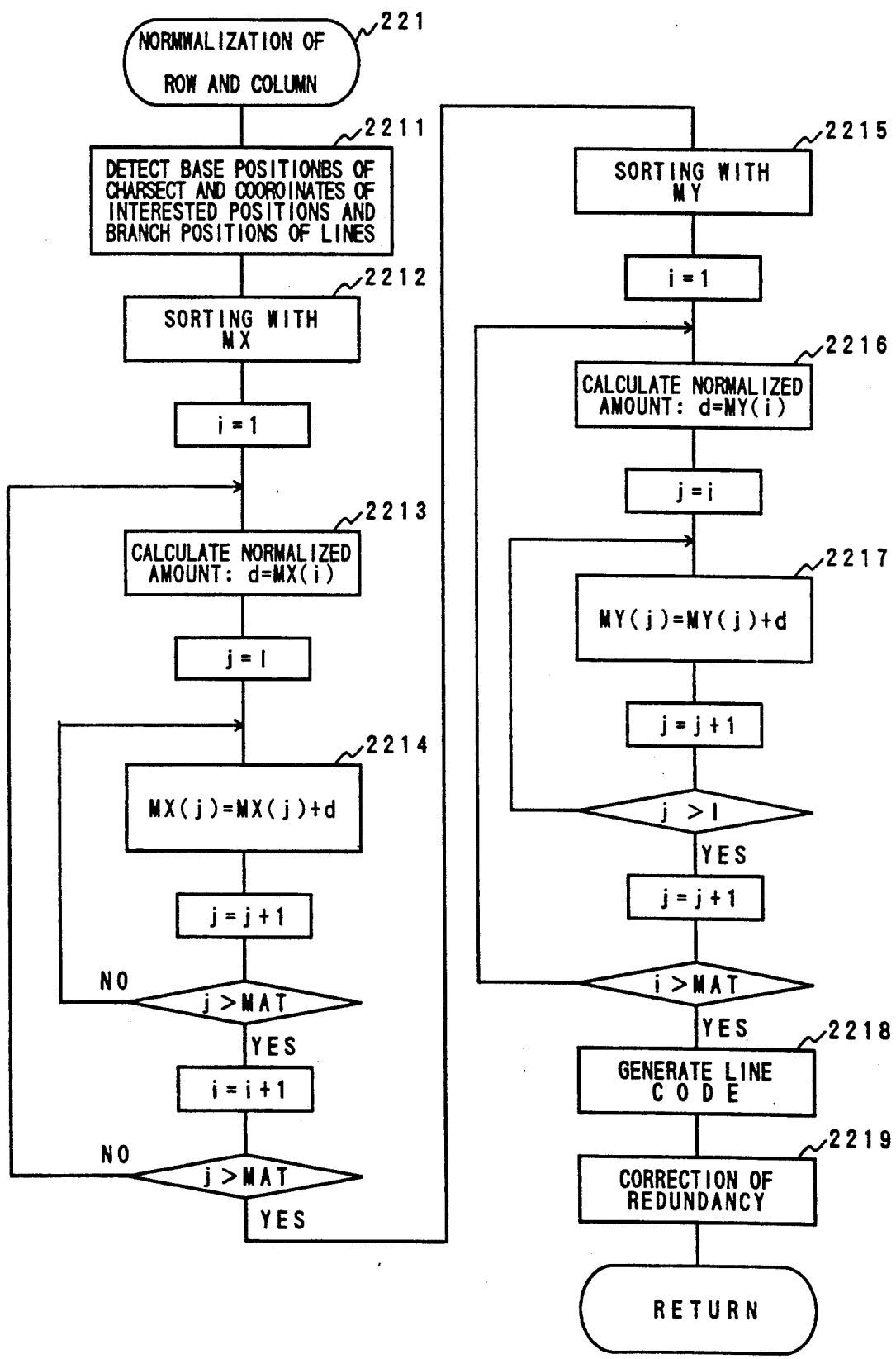
FIG. 43 is a detailed flowchart showing a row and column normalization step 221 of FIG. 42.
Figure 45A:
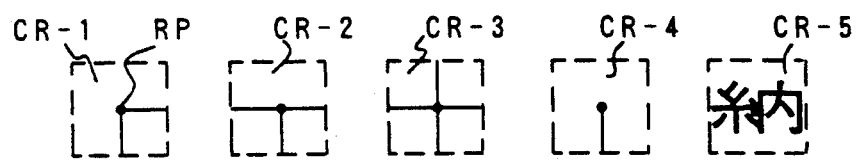
Figure 45B:
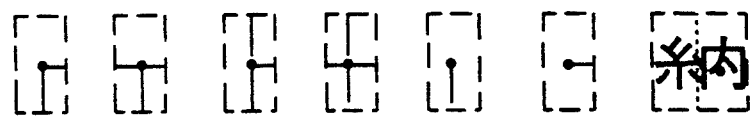

FIG. 43 is a detailed flowchart of the row and column normalization to be executed in the step 221. The step 2211 determines coordinates of reference or base positions of the respective characters stored in the table TBL5 and coordinates of all intersections and end or branch points of respective line segments loaded in the tables TBL1, TBL2, and TBL4, thereby loading the results in a table TBL7 of FIG. 44. The base position of a character pattern will be described later in detail. The table TBL7 comprises, for the character base position and the intersections and branch or end points of the line segments, entry items each including coordinates (MX, MY) and an information code MC. The information code MC is a character code designating a character pattern for character information and a pattern of an end point or an intersection as shown in FIGS. 45A and 45B, which will be described later. Step 2212 sorts the data items loaded in the table TBL7 in ascending order of values of the X-axis coordinate MX. the sorting algorithm has been commonly known and has been described in detail, for example, on page 62 and subsequent pages of the foregoing article by N. Wirth. Consequently, a redundant description thereof will be avoided. Step 2213 accesses the table TBL7 thus sorted to sequentially obtain the data items, thereby deciding a normalization quantity d of the data item. The normalization quantity d is selected as follows. Assuming the normalization objective row and column have a width of RC pixels, the system selects integral multiples of RC greater than the value of the pertinent MX so as to determine the normalization quantity d as a difference between the smallest value thereof and the pertinent MX value. A step 2214 adds the quantity value d to the MX value of each data item, and then step 2215 sorts the values of MY in the table TBL7 like in the case of the step 2212. Subsequently, in steps 2216 and 2217, the values of MY are sequentially normalized in the similar manner as for the steps 2213 and 2214. When all coordinate data items are completely normalized, step 2218 generates intersection points of lines or a character code indicating a line pattern between end or branch positions together with positional information thereof. Finally, step 2219 compresses the cell or the like thus correcting the redundancy while keeping the property of geometric structure. In the embodiment above, although the normalization quantity d associated with the coordinate values MX and MY is selected as a positive value, a negative value may also be employed simply by adopting a value nearest to a multiple of RC.

FIGS. 45A and 45B show base points RP (dots) of positions respectively of intersection patterns CR-1 to CR-3 and a branch point pattern CR-4 of a character pattern CR-5. FIGS. 45A and 45B are base point examples of full-size and half-size patterns, respectively.

FIG. 46 is a flowchart of a second embodiment of the logical structure recognition subroutine program to be invoked in the step 22. This embodiment includes step 222 for recognizing a filed position of a document. Furthermore, the logical structure recognition program 22 is constituted only with step 222 as shown in FIG. 46A or is configured as shown in FIG. 46B in which the row and column normalization step 221 above is executed before the program step 222.

FIG. 47 is a detailed flowchart of the field position recognition executed in the step 222. A step 2221 normalizes a table form or contour in order to simplify recognition of a cell position. FIGS. 48A and 48B respectively show actual examples of normalization of the table shape. FIG. 48A is a representative example of addition of ruled lines 42A and 42B to a table 41 in which ruled lines are missing. This processing may be easily accomplished as follows. For example, the existence and absence of a vertical line segment are checked for each branch or end point of each horizontal line. If such a vertical line is absent, a vertical line segment intersecting the pertinent horizontal line segment is copied along a horizontal direction, thereby producing a new line segment. Furthermore, the line segment may be more easily created as follows. The system selects, from the parallel horizontal lines, the parallel lines respectively at the highest and lowest vertical positions so as to draw two vertical lines between the respective start points and between the respective end points of the two horizontal lines. In addition, FIG. 48B is a typical processing example wherein a table 43 in which an outer frame has four round corners is transformed into a table 44 having an outer frame constituted with straight lines. The processing may be implemented, for example, by replacing respective ac data items with data items of two line segments including a vertical line and a horizontal line representing each corner of the table. More specifically, for each element stored in the table TBL3 (FIG. 23), under a condition, for example, of AA0=0, the system produces vertical line segments LX0=AX+AR, LY0=AY, LX1=LX0, and LY1=AY−AR and horizontal lines LX0=AX+AR, LY0=AY−AR, LX1=AX, and LY1=LY0R, thereby storing the results in the table TBL1. For cases of AA0=90, 180, and 270, the processing is achieved in a completely similar fashion.

A step 2222 of FIG. 47 sequentially extracts, from the table constituent elements included in the document, cells (standard fields), each cell being enclosed with four line segments and not containing therein any other rectangular area (excepting characters). The processing is achieved as follows, for example. First, the data items of the horizontal line segments are sorted in a vertical positional order thereof so as to select as a base horizontal line a first horizontal line thus obtained. Next, the system sequentially checks the vertical lines beginning from the left-most line to select a pair of two vertical lines which intersect the base horizontal line and which extend downward. Subsequently, a horizontal line which intersects these vertical lines and which is nearest to the base horizontal line is obtained. The detected horizontal line, the base horizontal line as the upper side line, and the two vertical lines define an objective area. The operation above is repeatedly achieved to detect all rectangular areas each having the base horizontal line as the upper side line. Subsequently, the next horizontal line is selected as the base horizontal line to perform the operation above, thereby sequentially detecting all rectangular areas formed with the ruled lines. For each rectangle thus determined, the system checks to decide whether or not the conditions above are satisfied, thereby extracting only the rectangular areas to be recognized as cells.

In step 2223, based on character information stored in the table TBL5, character string information is generated in the same fashion as for the step 2921 so as to repeatedly execute steps 2224 and 2225.

A step 2224 collates the extracted character string with a word for which special fields beforehand registered can be produced. The collation or matching of the word is accomplished in the similar fashion as for the step 2922. If the collation results in a detection of a word satisfying the predetermined conditions, step 2225 is effected to extract the special fields according to a preset procedure. In this connection, a special field designates a virtual field which is not necessarily enclosed with line segment information items and which represents a position where content data is printed at a document issuance. For example, as shown in actual examples EX6 of FIG. 50A and EX7 of FIG. 50B, which will be described later, for a letter "YY" (year), a circumscribing rectangle and a special field having an identical size are defined. The special field is set in a left-hand side of the rectangle with a preset distance therebetween. This processing can be implemented as follows. Namely, for each word for which a special word is possibly created, information items such as a condition for actually generating the special field, a generating position, and a field size are specified as contents of the step 2225. The condition above may include an item for discriminating the field from an ordinary fixed field, for example, a condition item stipulating that a ratio of each character to an interval between a letter "YY" (hear and a letter "MM" (month) is greater than a predetermined value.

A step 2226 checks each of the respective cells and special fields extracted by the step 2222 to determine whether the cell or field is an input/output field (cell) in which data may be loaded when a document is issued or a fixed field (cell) in which new data is not described at a document issuance. This judgement may be achieved in a simple manner, for example, by checking to determine whether or not the field (area range) includes a character string. Alternatively, the meaning of a word represented by the character string may be collated with a list of words which may possibly appear in the input/output field and which are beforehand stored in the program; furthermore, for example, by determining a position of the character string in the field, namely, whether the character string is shifted to the right or left side, thereby judging the cells and special fields.

A step 2227 registers, for the fields judged to be input/output fields, field definition information items in table TBL8, which will be described later. For the fields determined as fixed fields, a step 2228 registers field definition information to the table TBL8.

FIG. 49 shows the constitution of the field table TBL8. This table TBL8 comprises, for each entry column, coordinates (FX, FY) of the upper-left corner of the field, coordinates (FX1, FY1) of the lower-right corner thereof, and a field name FN. For a field name of a fixed field, a character string described in the area range may be directly employed. For an input/output field, a symbol denoting an input/output field is registered. The table TBL8 is loaded in the document format data area 982.

Figures 50A, 50B:
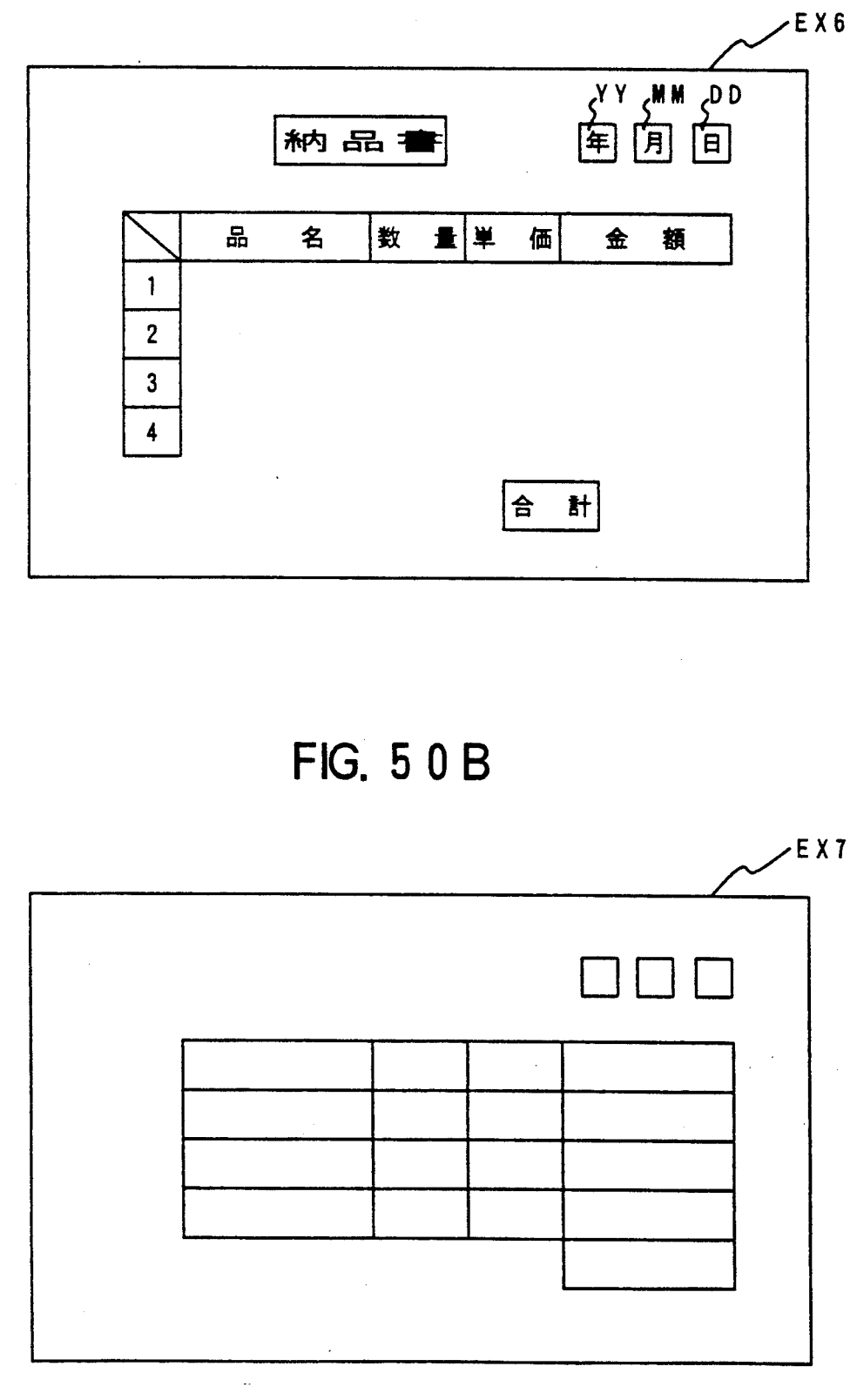

FIGS. 50A and 50B show actual examples of execution results of the field position recognition step 222. EX6 of FIG. 50A and EX7 of FIG. 50B respectively illustrate positions of fixed fields and input/output fields recognized from the original image EX1 of FIG. 3.

Figure 51A:
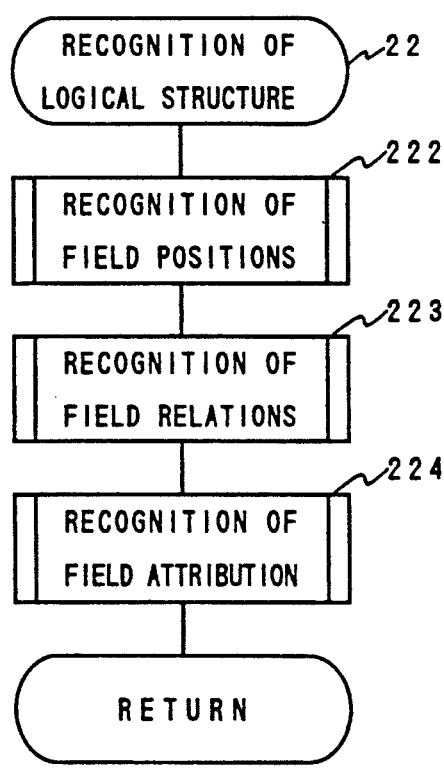
FIGS. 51A and 51B are flowcharts respectively showing alternative embodiments of the logical structure recognition step 22 of FIG. 41.
Figure 51B:
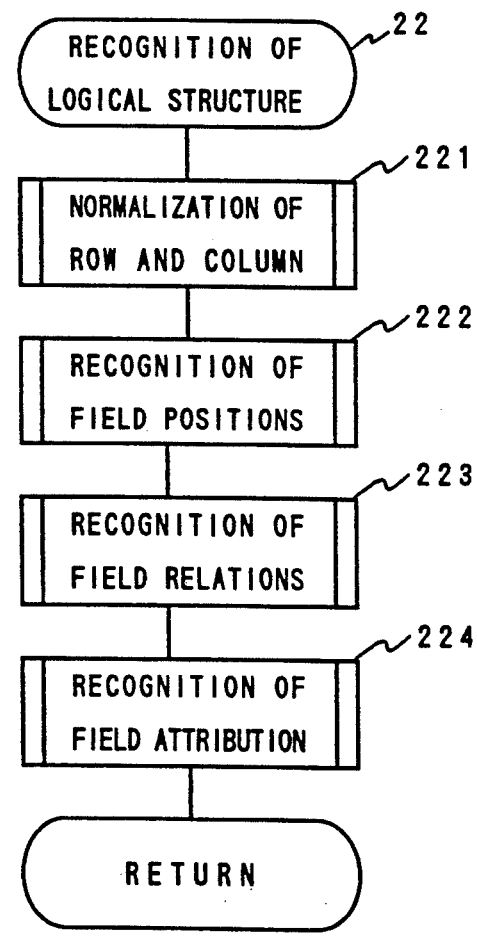

FIGS. 51A and 51B are flowcharts of a third embodiment of the logical structure recognition subroutine program called in step 22. The third embodiment includes the field position recognition step 222 above, step 223 for recognizing relations or relationships between a plurality of fields based on field position recognition results, and step 224 for logically recognizing an attribution or attribute of each field. In this embodiment, the program configurations respectively of FIGS. 51A and 51B are respectively prepared for a case where the field position recognition step 222 is directly executed and for a case where a row and column normalization step 221 is achieved before the step 222.

Figure 52:
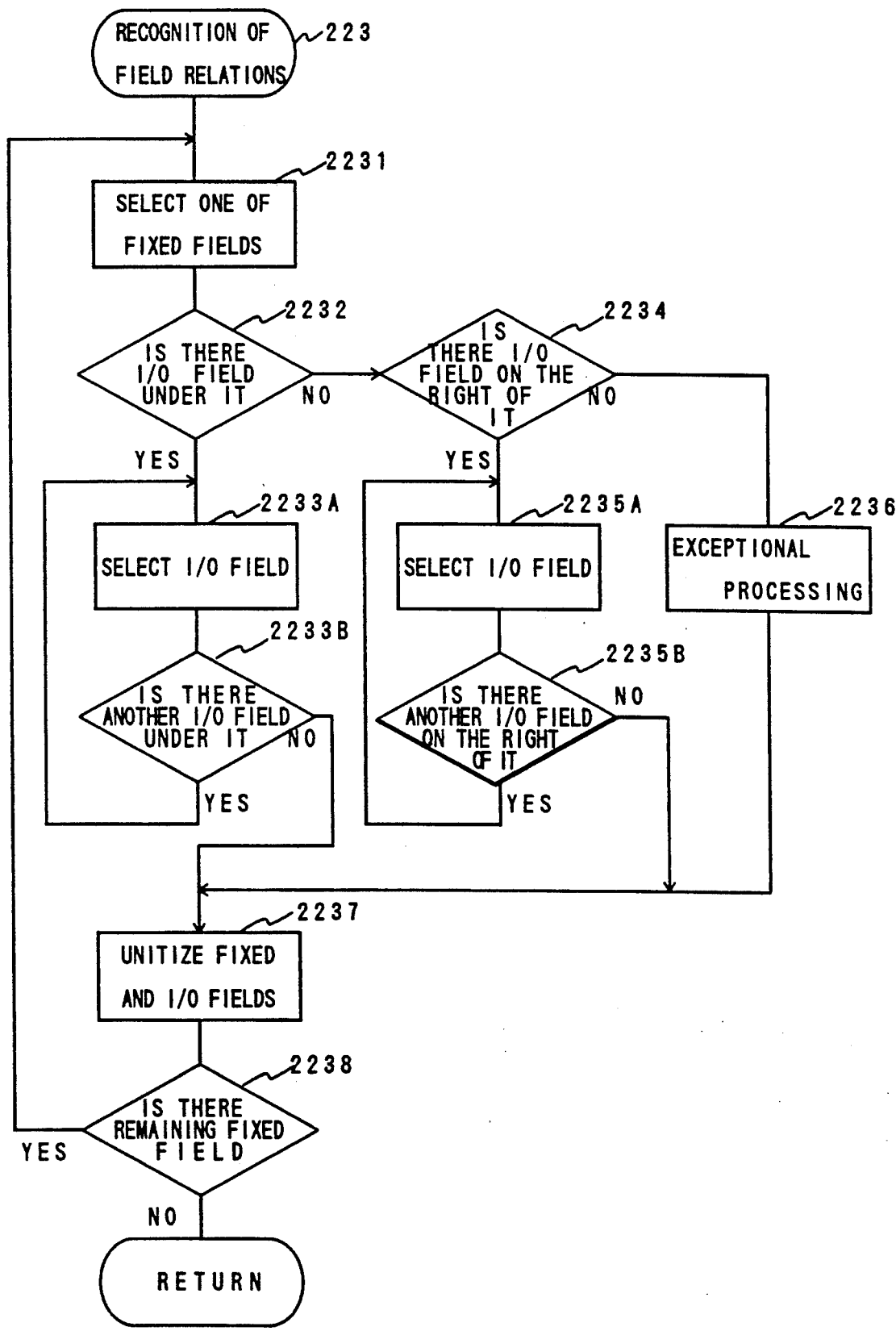
FIG. 52 is a flowchart showing details of a field relation recognition step 223 of FIG. 51.

FIG. 52 is a detailed flowchart of the field relation recognition step 223. A step 2231 selects a fixed field from the field table TBL8. In step 2232, the system checks to decide whether or not an input/output field exists just below the selected fixed field. If this is the case, the same check is accomplished to determine whether or not another input/output field is immediately beneath the input/output field. This processing is repeatedly achieved until there appears a state where the field is not followed by an input/output field immediately therebelow (steps 2233A and 2233B). In a case where the fixed field first selected does not have an input/output field just therebelow, the system checks to decide whether or not an input/output field exists in the left side thereof, the field being in contact with the fixed field (step 2234). The operation to select the input/output field immediately following the fixed field is repeatedly conducted until there is missing such an input/output field. When the input/output field is missing both in the lower and right locations of the fixed field, step 2236 is initiated to achieve an exceptional processing. The exceptional processing 2236 includes, for example, a processing step in which the input/output field extracted as a special field in the step 2225 cannot be related through a simple positional relationship and hence is paired with the fixed field including the character string employed as a key to extract the special field and a processing step in which a fixed character string not having any associated input/output fields is extracted. A step 2237 creates a unit including a fixed field first selected and input/output fields obtained as a result of the step 2233A or 2235A. When the exceptional processing 2236 is achieved, the system produces a unit for a special field, a unit including only a fixed field, or a unit having a field not enclosed with ruled lines. The processing above is repeatedly accomplished for all fixed fields loaded in the table TBL8.

Figure 53:
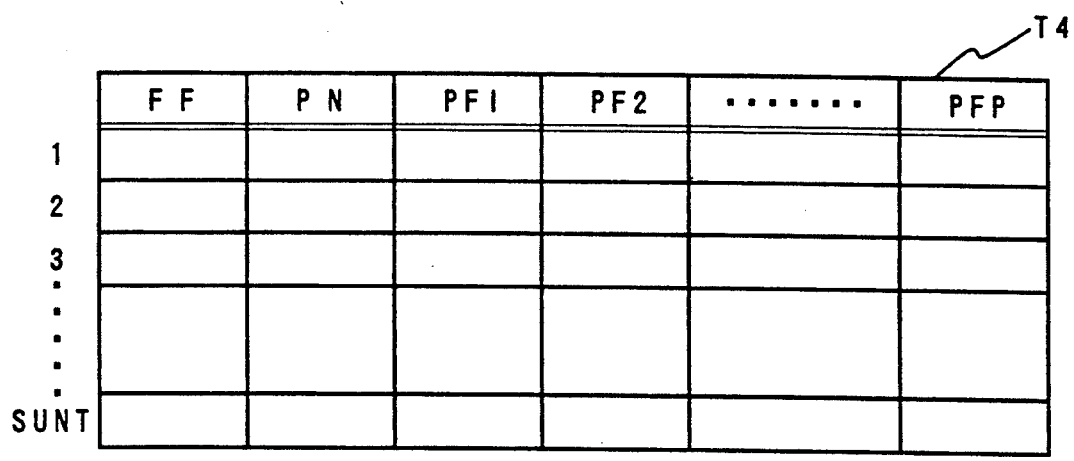
FIG. 53 is a diagram showing the structure of a table T4 for storing therein unit information.

FIG. 53 shows the structure of the unit table T4 for storing therein unit information items attained in the unit generation step 2237. The table T4 comprises for each unit a pointer to a field table TBL8 denoting fixed fields associated with the unit, an input/output field count PN belonging to the unit, and pointers PF1 to PFp to the field tables TBL8 designating the respective input/output fields associated with the unit, where a letter p indicates the maximum value of the input/output field count PN of the unit. The table T4 is loaded in the work data area 985.

Figure 54:
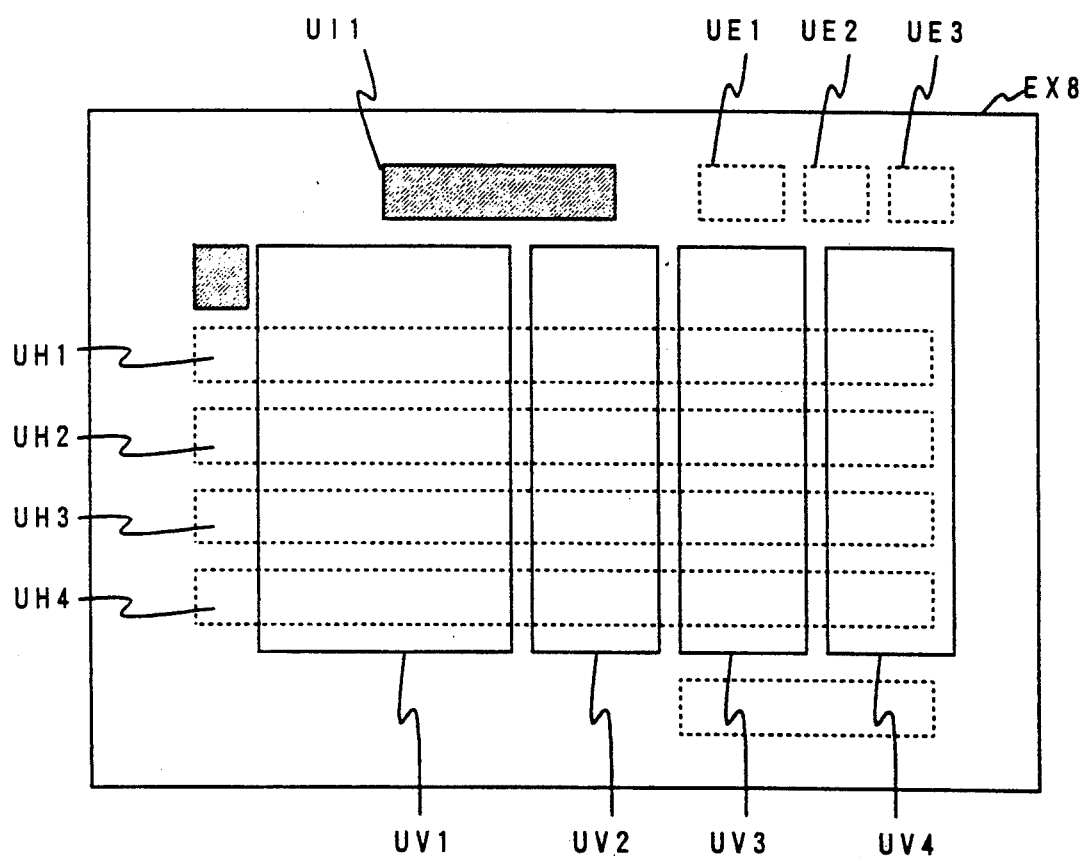
FIG. 54 is a diagram illustratively showing an example of field relation recognition results.

FIG. 54 is an example of a state of a unit resulted by executing the field relation recognition step 223 on the field position recognition results EX6 and EX7. In this configuration, units UV1 to UV4 comprising input/output fields selected in the step 2233 are vertical units, units UH1 to UH4 including input/output fields attained in the step 2235 are horizontal units, a unit UI1 for which the fixed field is recognized to be isolated in the step 2236 is an isolated unit, and units UE1 to UE3 which are recognized to comprise fields not enclosed with ruled lines in the step 2236 are exceptional units. In this example, although three units UE1 to UE3 are created for three characters (character strings) of "YY" (year), "NN" (month), and "DD" (day), depending on a method of defining the processing of the step 2225, a unit may be produced for a character string "YY~DD" (year month day).

FIG. 55 is a detailed flowchart of the field attribution recognition step 224. A step 2251 selects a unit from the unit table T4. A step 2252 collates the name of the fixed field of the selected unit with contents of a unit knowledge table registered in advance to a part of the document format recognition program 972 so as to obtain a function of the unit. When the field name does not suffice for the decision of the function, a step 2243 collates, with predetermined rules, information items such as a relation of meaning with respect to other units and a location of the unit in the document, thereby determining the function of the unit. If the unit has a function to call a function to compute a value so as to assign the value to an input/output field, namely, if the unit is a function input unit, a function input attribution is set to tables TBL9 and TBL20 (steps 2244a to 2245a), which will be described later. If the unit has a function to retrieve a file to determine a value so as to assign the value to an input/output field, namely, if the unit is a file input unit, a file input attribution is set to the tables TBL9 and TBL10 (steps 2244b to 2245b). When the unit has a function to compute a value based on a value assigned to other input/output field so as to assign the attained value to an input/output field, namely, if the unit is a computation of calculation input unit, a calculation input attribution is set to the tables TBL9 and TBL10 in (steps 2244c to 2245c). When the unit possesses a function to repeatedly process a set of items, namely, when the unit is a unit repreating unit, a repetition attribution is registered in table TBL9 and TBL10 in (steps 2244d to 2245d). If the unit function is other than those above, the unit is judged to be a key input unit for setting an input value from the keyboard and hence a key input attribution is registered to the tables TBL9 and TBL10 (step 2245e).

FIGS. 56 to 59 show configurations of respective knowledge tables to be referenced in the name matching step 2242 to determine the function of the unit.

A knowledge table KNW1 of FIG. 56 comprises, for each entry column, a name UN of a fixed field of a unit having a function input attribution and a name FUN of a function to be invoked.

A knowledge table KNW2 of FIG. 57 is associated with an example of a file to be retrieved by a unit having a file input attribution. In this example, the table KNW2 includes, for each entry row, entry items "article name" and "unit price", so that the unit price can be uniquely retrieved by use of an article name.

A knowledge table KNW3 of FIG. 58 includes, for each entry column, a unit name UN of a fixed field associated with a unit having the calculation input attribution, a calculation type OP, and fixed field names OP1 to OPN of other units as parameters of the calculation. The type of parameters necessary for the calculation is assumed to be uniquely determined based on the calculation type OP.

A knowledge table KNW4 of FIG. 59 is disposed to control attributions to be set to units having the key input attribution. Each entry includes a fixed field name UN and a symbol AN as an attribution thereof, for example, to indicate that the pertinent item is a numeric or character information item.

FIGS. 60 to 65 are structures of tables employed to set therein attributes or attributions in the steps 2245a to 2245e of the field attribution recognition processing 224.

A table TBL9 of FIG. 60 is disposed to control overall units produced by use of the unit work table T4. The table TBL9 includes, for each column, a pointer FF to a field table TBL8 denoting fixed fields associated with the unit, an input/output field count PN belonging to the unit, pointers PF1 to PFN to field tables TBL8 designating input/output fields associated with the unit, a function type UA of the unit, and a pointer UAP to tables TBL10 to TBL14 storing therein detailed function information. In this connection, a letter N for PFN indicates the maximum value of the input/output field count PN per unit. The table TBL9 is loaded in the document format data area 982 together with the tables TBL10 to TBL14, which will be described later.

The table TBL10 of FIG. 61 is used to store therein detailed information items of a function input attribution unit. Each column thereof includes, for example, a name FUNN of a function to be invoked, a number RN of parameters necessary to call the function, and parameters PAR1 to PARN, where a letter N for PARN denotes the maximum value of the parameter count RN.

The table TBL11 of FIG. 62 is used to store detailed information of the function of a file input attribution unit. Each column thereof comprises, for example, a name DBN of a file to be retrieved, a number DN of items related to processing of the pertinent document, and items TM1 to TMN, where a letter N for TMN denotes the maximum value of the parameter count DN.

The table TBL12 of FIG. 63 stores therein detailed information of the function of a calculation input attribution unit. Each column thereof includes, for example, a calculation type CALN, a number CLN of parameters necessary for the calculation, and parameters OP1 to OPC, where a letter C for OPC stands for the maximum value of the parameter count CLN.

The table TBL13 of FIG. 64 is disposed to store therein detailed functional information of a repetition attribution unit. Each column thereof comprises such items as a number N of fixed fields to be repeatedly used, pointers RFF 1 to RFFN to the tables TBL8 related to the fixed fields, a number M of units to be repetitiously employed, and pointers RU1 to RUM to the tables TBL9 associated with the units.

The table TBL14 of FIG. 65 is loaded with detailed functional information of a key input attribution unit. Each column includes, for example, a symbol DA designating an input attribution, a character width DW of data to be inputted, a character height DH thereof, an interval DD between adjacent characters, and a format information item denoting such discrimination as the left justification, the centering, or the right justification.

FIG. 66 is an example of the processing results of the logical structure recognition of a document generated from the original image EX1 in which TBL9-EX to TBL14-EX are specific examples of the tables TBL9 to TBL14.

FIG. 67 is a flowchart showing a third embodiment of the subroutine program for the document format recognition conducted in the step 2. This embodiment includes the physical document structure step 21, the logical document structure recognition step 22, and a step 23 for automatically generating a document construction program, which will be described later. Incidentally, the document constructing program denotes a program to be executed, after the generation thereof, in the document generation or construction processing 3.

Figure 68:
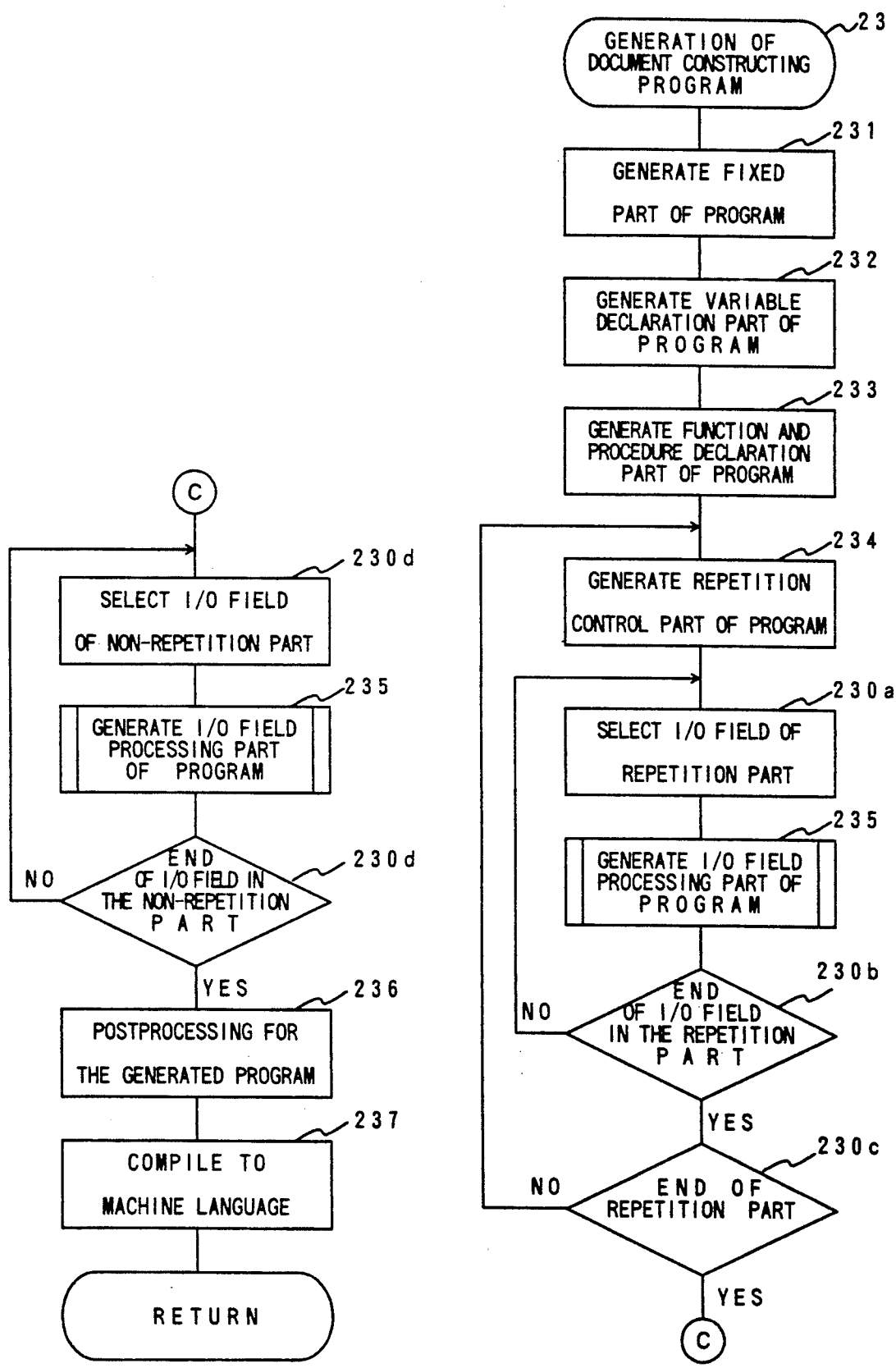
FIG. 68 is a flowchart showing in detail a document construction program generation step 23 of FIG. 67.

FIG. 68 is a flowchart showing an example of the subroutine for the document construction program generation to be invoked in the step 23. This subroutine program is loaded in an area different from an area of the program above in the document format recognition program 972. Processing contents of the subroutine will next be described in detail with reference to an actual processing result EX9 of FIG. 69.

The contents of EX9 show processing results of the original image EX1 of the document of FIG. 3, which are actually created by use of the table TBL8-EX to TBL14-EX of FIG. 66. In this embodiment, the generated program conforms to the syntactical rules of the programming language PASCAL.

First, step 231 produces a fixed part of the program not depending on the results of the logical structure recognition of the document. In the actual example EX9, the obtained fixed part comprises statements 11, 12, 116, and 132. The program is actually created by defining each character string as shown in this example EX9 in a predetermined memory area specified in the subroutine program 23. A step 232 produces a part in which variables used in the program are declared. In the example EX9, statements 13 to 15 are created in this variable declaration part. The variables adopted in the program are determined from such items as the unit count and the repetition unit count resultant from the logical structure recognition. Subsequently, step 233 generates a part declaring functions and/or procedures employed in the program as statements 16 to (15 of the actual example 9. These functions and/or procedures are decided by use of such items as function names related to function input attributions obtained as a result of the logical structure recognition. This program part is actually created by extracting, from several character strings of function declarations beforehand defined in the program 23, character strings decided in the step above so as to transfer the character strings into respective storage areas of the program in the memory. By the way, during the function definition, if the statements 16 and 17 are particularly provided with a function to display a cursor on a screen where an input character string is to be inserted, the user can easily conduct the subsequent document issuance processing. A step 234 refers to the table TBL3 to produce a repetition control part of the program. The repetition control parts are created in conjunction with the repetition units until a judge step 230c detects an end condition. In the example EX9, statements 117, 118, and 124 are obtained. A step 230a sequentially selects one of the input/output fields associated with the repetition part and then step 235 generates an input/output field processing part. In the example EX9, statements 119 to 123 are produced as a result.

When all repetition parts are completely created (step 230c), a non-repetition part is generated. First, a step 230d selects one of the input fields of a non-repetition part, and then the step 235 produces an input/output field processing part thereof. This processing is repeatedly accomplished to obtain statements 125 to 131 of the example EX9. When the input/output field processing parts are entirely created for all non-repetition parts (step 230d), a postprocessing step 236 arranges the program in an appropriate form and then a step 237 compiles the character strings thus attained as a source program into a machine-language program, which can be directly executed by the CPU 92. The compilation of the source program into an object program is achieved by initiating a known language compiler (program) beforehand loaded in a portion of the memory 97.

Figure 70:
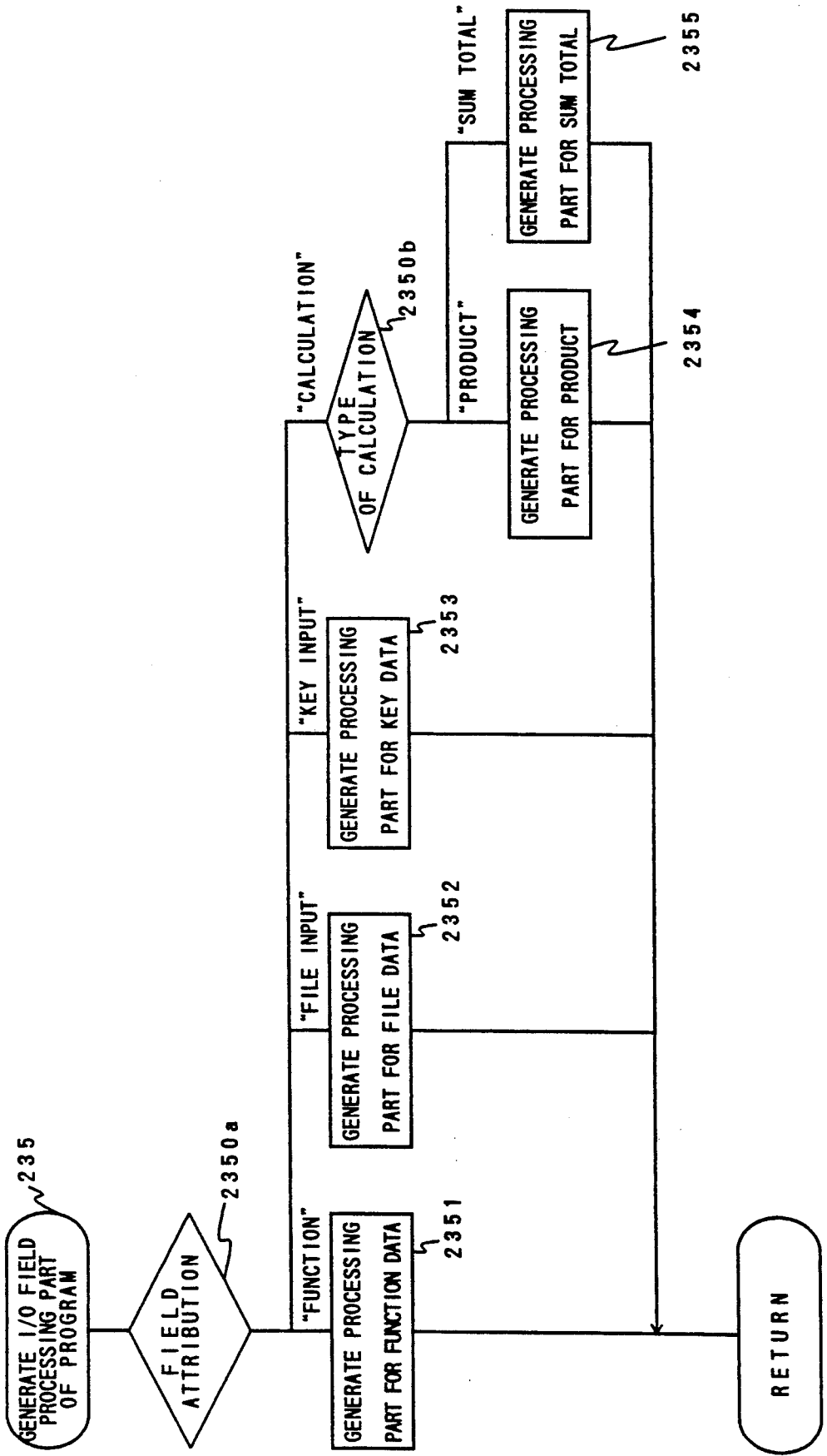
FIG. 70 is a detailed flowchart of an input/output field processing generation step 235 of FIG. 68.

FIG. 70 is a flowchart showing a detailed processing content of a subroutine for an input/output field processing part generation executed in the step 235. A step 2350a first references the content of the table TBL9 to decide an attribution of the specified input/output field. If the result shows a function attribution, a step 2351 refers to the table TBL10 to create a function attribute processing part. In the example EX9, three lines 129, 130, and 131 are obtained through this step. For a result of a file input attribution, a step 2352 references the table TBL11 to generate a file input attribution processing part. In the example EX9, a statement 121 is produced by this step. When the judgement result indicates a key input attribution, a step 2353 refers to the table TBL14 to form a key input attribution processing part, which is associated with two lines 119 and 120 in the example EX9. For a result of a calculation input attribution, a step 2350b references the table TBL12 to determine a calculation type. If the type is a product, a step 2354 refers again to the table TBL12 to generate a product processing part, which is indicated as a line 122 in the example 9. For a sum total of the calculation type, step 2355 references again the table TBL12 to configure a sum total processing part. In the example EX9, statements 125 to 128 are produced as a result.

Incidentally, in the description of the document format recognition step, the processing is carried out in substantially an automatic fashion for simplification of the explanation. However, in actual applications, an erroneous recognition may possibly take place, for example, depending on a state of an image input, etc. in some cases. In order to cope with such cases, each stage of the recognition is desirably provided with a processing step to manually correct the automatic recognition results when necessary. Particularly, the processing step for the confirmation and correction of the processing results may be advantageously arranged immediately after each of the row and column normalization step 221, the field position recognition step 222, the field relation recognition step 223, the field attribute recognition step 224 of the physical structure recognition step 21 and the logical structure recognition step 22 and after the document generation program construction step 23.

Following the description of the document format recognition step 2, a description will be given of an embodiment of the document construction step 3.

Figure 71:
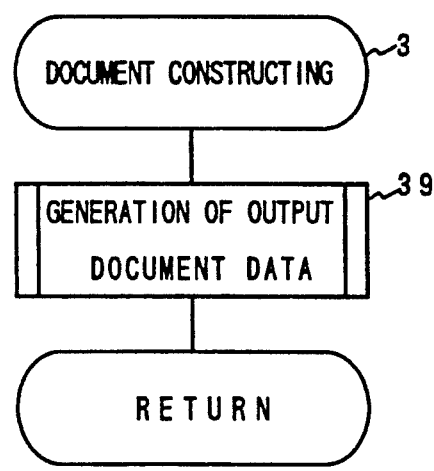
FIG. 71 is a flowchart showing a first embodiment of the document construction or generation step 3 of FIG. 2.

FIG. 71 is a flowchart showing the operation of the first embodiment of the document construction step 3. This embodiment includes only a step 39 which creates format data for an output operation (for example, a print operation) based on the physical structure (namely, information items loaded in the tables TBL1 to TBL5) obtained with respect to the document formats in the step 21 of the document format recognition step 2 of FIG. 8. The resultant document format data is stored in the output document data area 984.

Figure 72:
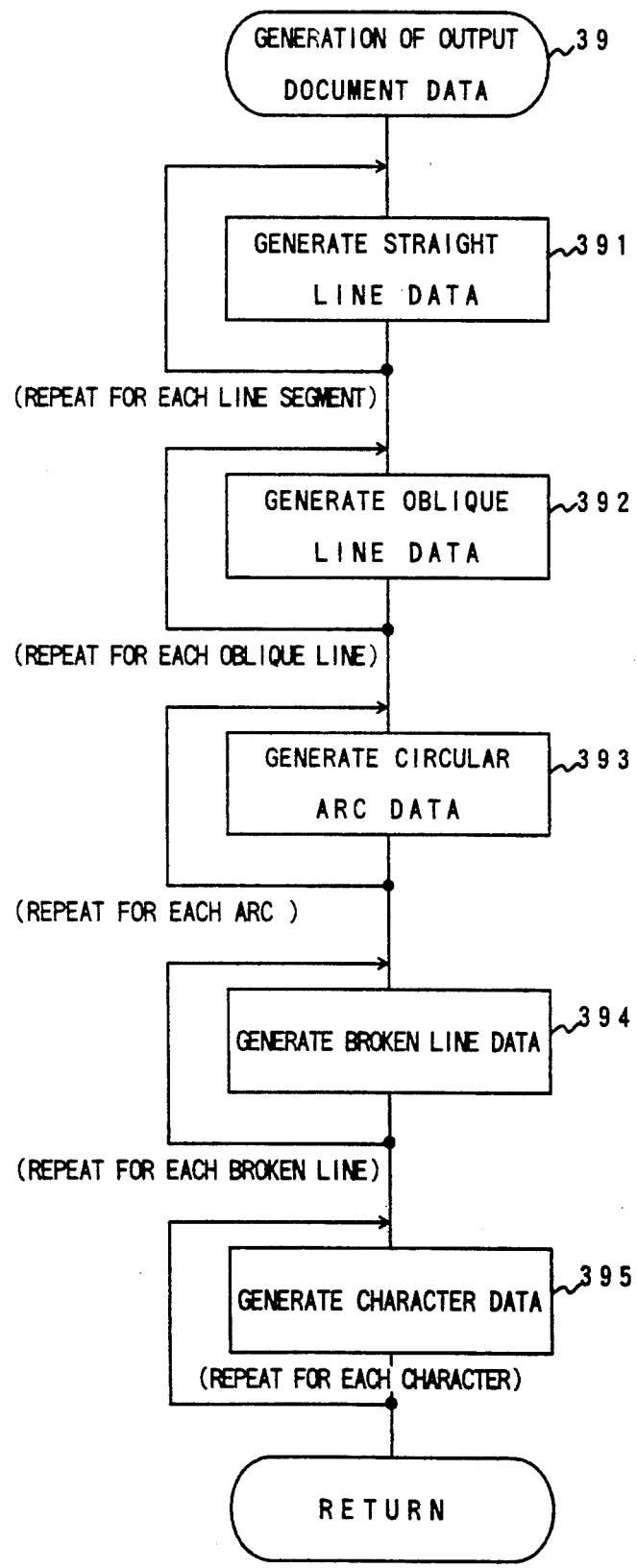
FIG. 72 is a detailed flowchart of a print or output form data generation step 39 of FIG. 71.

FIG. 72 is a flowchart of a subroutine program to be called in the output format data generation step 39. This subroutine program is stored in an area of the document construction program 973 different from the area assigned to the document construction step 3. First, a step 391 references in a sequential manner the table TBL1 loaded with recognition results of line segments (straight lines) to create format data items to be used, for example, to print these line segments by means of the printer 95. A step 392 sequentially refers to the table TBL2 storing therein recognition results of oblique or inclined lines to produce format data items to be used, for example, to print these oblique lines by use of the printer 95. A step 393 sequentially refers to the table TBL3 storing therein recognition results of circular arcs to generate format data items to be used, for example, to print these arcs through the printer 95. A step 394 sequentially refers to the table TBL4 storing therein recognition results of broken lines to attain format data items to be used, for example, to print these broken lines by use of the printer 95. A step 395 sequentially references the table TBL5 storing therein recognition results of characters to obtain format data items to be used, for example, to print these characters through the printer 95.

In the step 39, the print format data finally attained in the print format data area 984 is produced in a data format conforming to the specifications of the printer 95 connected to this apparatus. The data format may be, for example, a bit map format which is supported for an ordinary printer as an external interface or a command sequence format.

FIGS. 73A and 73B are diagrams useful to explain a case where the step 391 generates the print format data in the bit map format. FIGS. 73A and 73B respectively show data of a line segment stored in the table TBL1 and print format data of a bit map associated with the data. The data of FIG. 7B is easily obtained as follows. First, an arrangement of white pixels having a one-to-one correspondence with respect to dots to be printed out are prepared in a memory. Subsequently, black pixels are allocated to a portion associated with line segments defined by the table TBL1, namely, to a rectangular region S indicated as a shadow portion in FIG. 7B. Also for the oblique lines, circular arcs, and broken lines, the respective print format data can be produced in a similar fashion as in the case of the line segments. In this connection, the character data may be created by transcribing desired character font patterns beforehand prepared directly onto predetermined locations of the arrangement of the white pixels. If necessary, the character font patterns may be magnified and/or reduced in size.

FIGS. 74A and 74B are explanatory diagrams for explaining a case where the step 391 produces the print format data in the command sequence format. FIGS. 74A and 74B respectively show data of a line segment stored in the table TBL1 and the print format data in the command sequence format to draw a line segment associated with the data. The data items of FIG. 74B can be easily attained by defining in the step 391 rules to generate a predetermined command sequence depending on values of the respective items of the table TBL1. The data of the oblique lines, circular arcs, broken lines, and characters may also be generated in a similar manner as in the case of the line segment above. In order to cope with a case where the printer 95 cannot produce a print-out result with graphic kinds and precisions specified for the content of the tables TBL1 to TBL5, a procedure to obtain approximated data items from the print format data in association with the specifications of the printer 95 would be defined in the print format data generation step 39.

Figure 75:
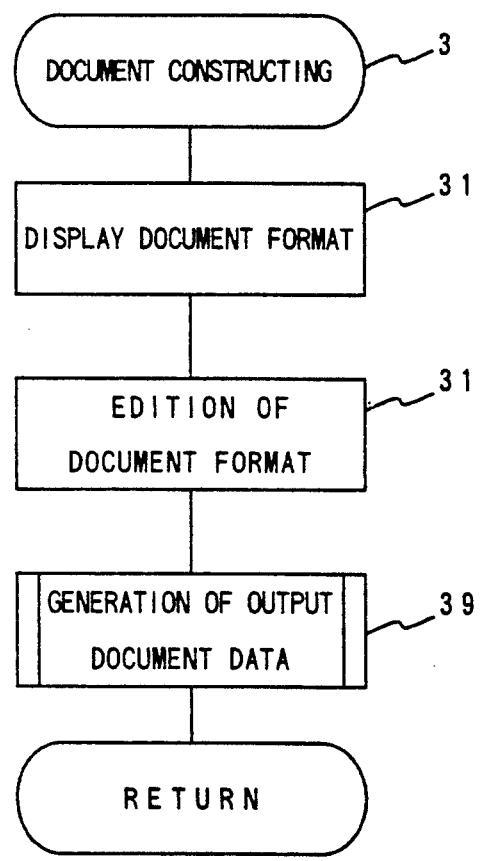
FIG. 75 is a flowchart showing another embodiment of the document construction step 3.

FIG. 75 is a flowchart of the second embodiment of the document construction routine executed in the step 3. In this embodiment, prior to the execution of the print format data generation step 39, the document format data items loaded in the table TBL1 to TBL5 are presented on the console 91 (step 31). Subsequently, in response to indications supplied from the operator, the format data items thus displayed are edited, namely, operations such as an addition, an update, and a deletion of data items are carried out (step 32). For the display of the document format data on the console 91, a method similar to the method, for example, used in the print format data generation step 39 may be employed to develop the print format data onto a bit map memory of the console 91. For the editing of the step 32, the editing technology commonly known in the word processor and the CAD system can be utilized like in the cases of the line correction step 291 and the character correction step 292 of the postprocessing step 29. Consequently, a redundant description thereof will be here avoided.

In accordance with the embodiment, the displayed document EX1 may be edited so as to generate such data as the print format data of a document EX10 in which the layout is modified as shown in FIG. 76. Furthermore, according to the second embodiment, for a document such as the document EX11 shown in FIG. 77, print format data may also be generated. In this case, the content data items of the document are beforehand printed as format constituent items on a print form. When only the printing is desired, the format data need not be discriminated from the content data and hence the usage above is possible. The print format data finally obtained as a result of the processing above is registered, like in the case of the first embodiment, to the output or print document data area 984.

In the description of the two embodiments, the physical structure recognition result from the document format recognition step 2 is employed as a premice of the processing. However, a portion of the logical structure recognition result such as information of the table TBL7, namely, information resultant from the row and column normalization step 221 may be adopted to carry out the similar processing. In this situation, the processing can possibly be achieved in a method similar to that used in a case where character codes are processed in these embodiments. Geometrically, the format data printed out in this case does not necessarily match with the format of an input document. However, since all constituent elements of characters and ruled lines are arranged in a form of a matrix or lattice, the document format edit processing 22 for the recognition of the logical structure becomes to be quite easy for the operator.

Figure 78:
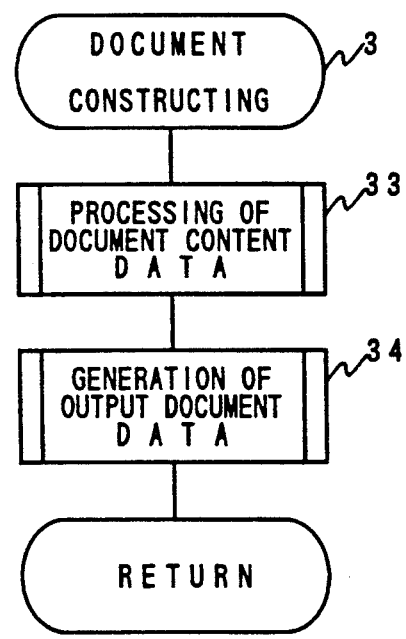
FIG. 78 is a flowchart showing still another embodiment of the document construction step 3.

FIG. 78 is a flowchart of the third embodiment of the document construction routine called in the step 3. In this embodiment, step 33 first creates, based on the document format recognition result, document content data adaptive to the result so as to store the obtained data in the document content data area 983. The document content data may be stored in a format similar to that used for the table TBL5. Subsequently, step 34 transforms the resultant data into output data like in the case of the document format data processed in the preceding embodiment. The attained data is loaded in the output document data area 984.

Figure 79:
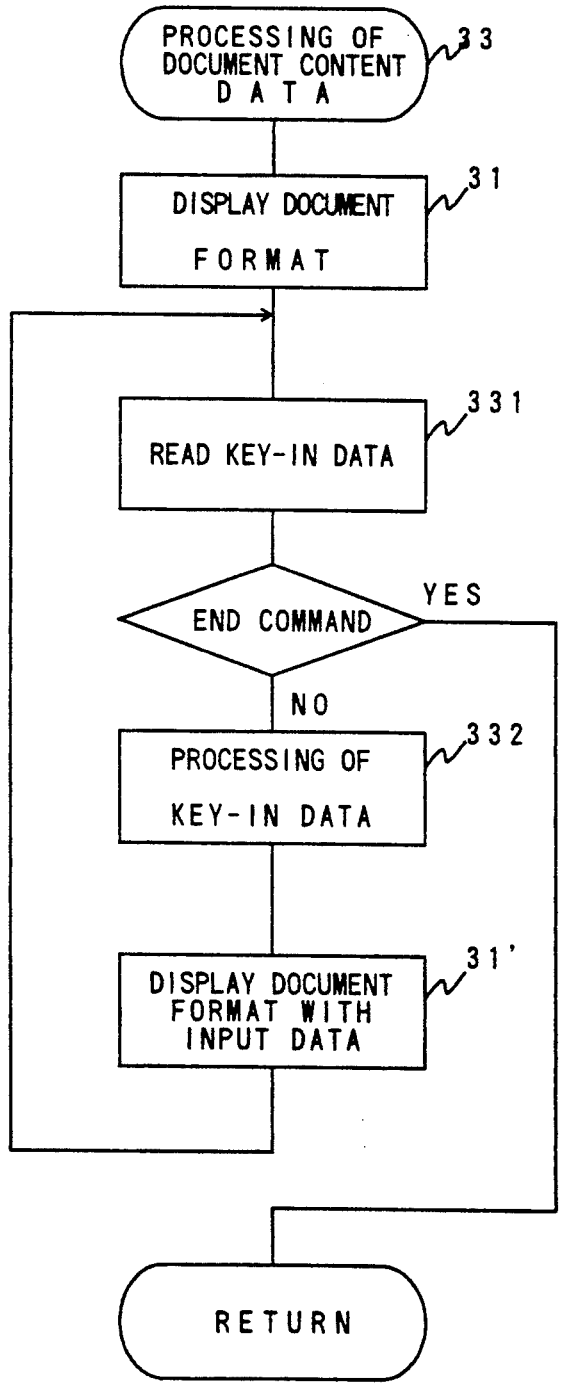
FIG. 79 is a flowchart showing a document content data generation step 33 of FIG. 78.

FIG. 79 is a flowchart of the first embodiment of the document content data generation step 33. In step 31, document format data items are presented on the screen of the console 91 in a similar manner as in the case of the second embodiment above. A step 331 obtains key-in information supplied from the operator by use of the console 91. The key-in information items comprise, for example, information items of cursor movements, content data to be filled in the document, and commands associated with various functions. If the information obtained is other than an end command, step 332 conducts input processing of the document content data according to the supplied key-in information. In the input processing, for example, new characters or character strings specified at a cursor position may be defined and the input data items would be thereafter altered and/or deleted depending on the case. As a result of the input processing, the document content data area 983 is loaded with a new difinition of the content data in the format similar to that of the character table TBL5.

Figure 80:
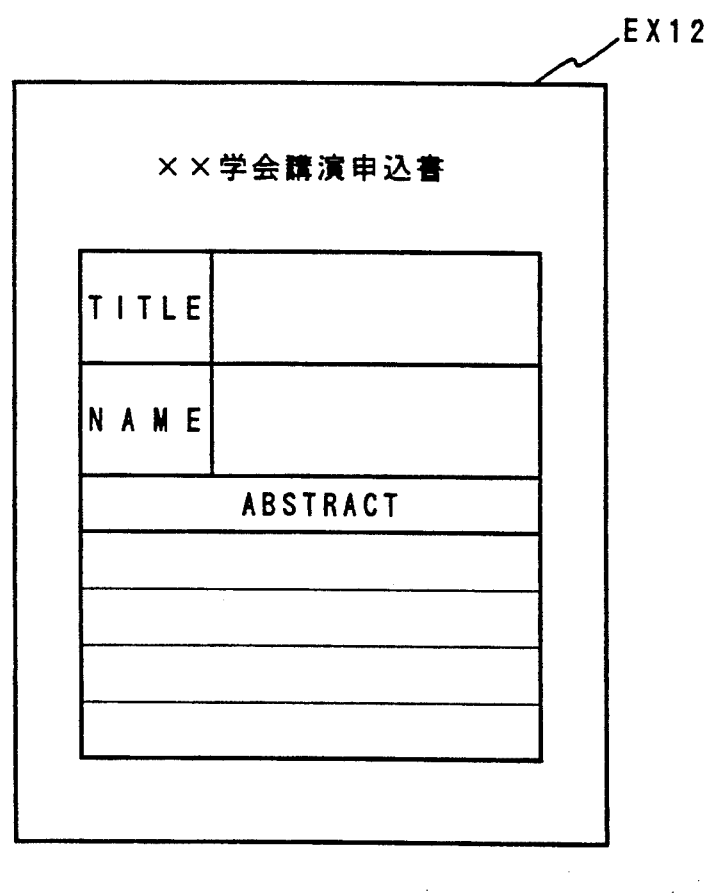

When the document content data generation step 33 is accomplished, the system can produce, for example, based on the document formats EX1 and EX10 and the format EX12 of FIG. 80, the content data as shown in the documents EX2 and EX11 and the document EX13 of FIG. 81, respectively.

Figure 82:
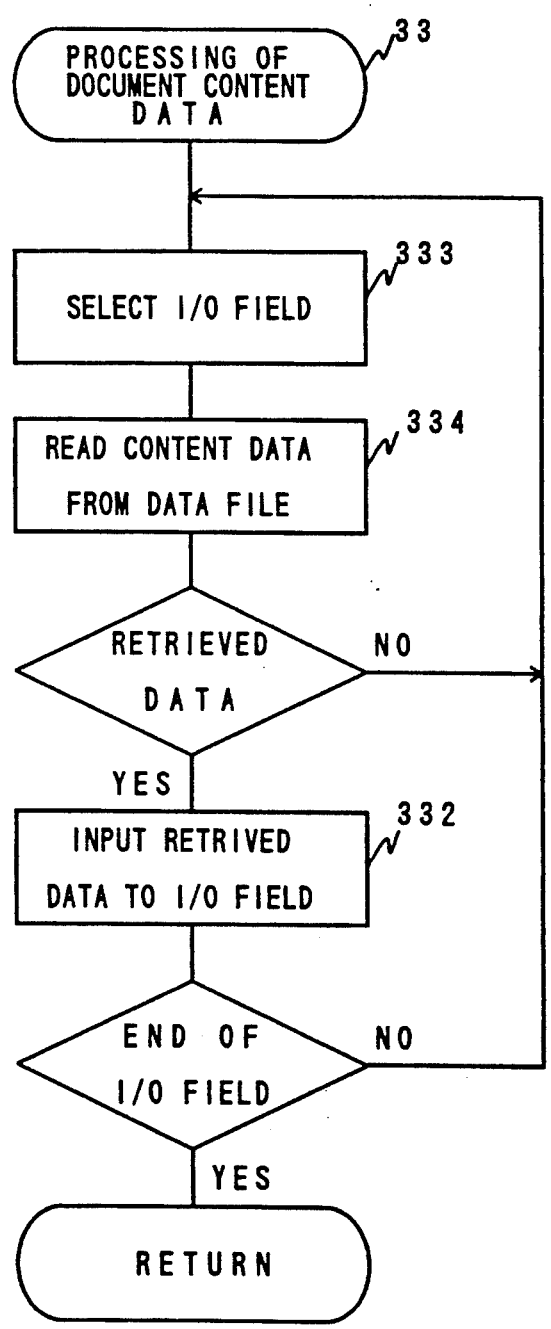
FIG. 82 is a flowchart showing a second embodiment of the document content data generation step 33.

FIG. 82 is a flowchart of the second embodiment of the document content data generation routine invoked in the step 33. A step 333 selects an arbitrary one of the input/output fields of the pertinent document format. The field selection may be automatically accomplished or may be conducted in response to an instruction supplied from the operator. A step 334 retrieves from a file, a data item, or the like, the content data associated with the selected input/output field. Namely, based on a name or the like of a unit to which the selected input/output field is allocated, the associated file may be retrieved in an automatic manner or in response to an operator's instruction. In a case where data corresponding to the input/output field is found as a result of the retrieval, step 332 loads the data in the input/output field. That is, like in the case of the input/output processing 332 of FIG. 79, the document content data area 983 is loaded with a new definition of the content data, for example, in a format similar to the format of the character table TBL5.

Figure 83:
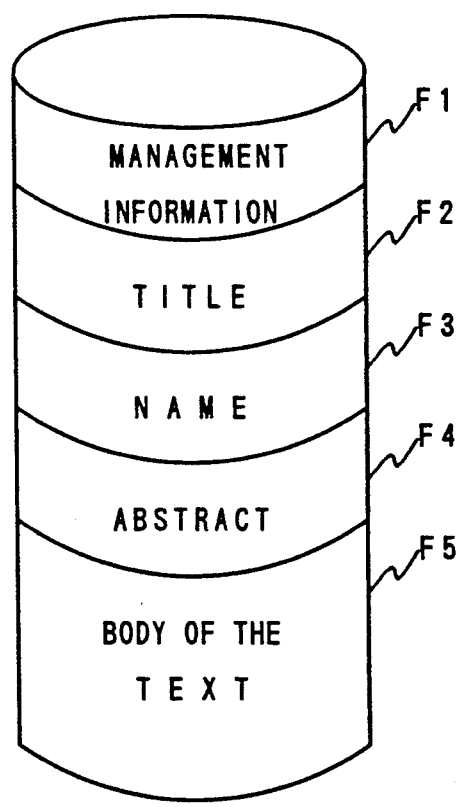
FIG. 83 is a diagram showing an example of a file as a retrieval object in a content data retrieval step 334.

An actual processing example conducted in the second embodiment will be described by use of the document format EX12 of FIG. 80 as an example. In this connection, a file to be retrieved in the step 334 is assumed to be configured, for example, as shown in FIG. 83. The file includes control information F1 controlling the entire file, a title file F2, a name file f3, an abstract file F4, and a file of a body of the text F5.

First, when an input/output field related to the name of the format EX12 is automatically selected, data associated with the field is obtained from the name file F2. The data is defined as content data at a position corresponding to the input/output field as shown in the document EX13. Subsequently, the similar operations are conducted to define the contents of the input/output fields related to the name and abstract, respectively. In this embodiment, only by achieving an image input of the format data like EX12, the content data items can be automatically created by use of the fundamental files so as to easily generate, for example, the document EX13.

FIG. 84 is a flowchart of the third embodiment of the document content data generation routine executed in the step 33. This embodiment produces a document based on the results of the field attribute recognition executed in the step 224 described in conjunction with FIGS. 51 and 55. A first step 31 presents a document format on the console 91. Subsequently, a step 333 selects from the input/output fields of the document a field to which a flag indicating the completion of processing is not indicated. The processing completion flag includes an array having items respectively assigned to the fields. When the selected input/output field has a function input attribute or attribution, a step 335 then computes functions to attain a result. The obtained data is defined as a new content data item; moreover, the processing completion flag is added to the field. When the selected input/output field is assigned with a file input attribution, the system first checks parameters necessary for the retrieval of a file associated with the field. Namely, the system determines whether or not all tables TM1 to TM(DN−1) have already been loaded with input data items. If this is the case, step 334 retrieves content data from the file to define the data as a new content data item and then adds the processing completion flag to the field. When the selected input/output field is of a calculation input attribution, parameters necessary for an execution of a calculation formula of the field are checked. That is, the system determines whether or not all parameters OP1 to OP(N−1) of the table TBL2 have already been loaded. If all of the parameters are present, step 336 executes the calculation formula to define a calculation result as a new content data item and then adds the processing completion flag to the field. When the selected input/output field has a key input attribution, step 331 achieves a data input processing by use of the keyboard to define an input data item as a new content data and then adds the processing completion flag to the field. When the input/output field is completely processed, a step 31' displays the format and the updated content data items on the console 91. The processing above is repeatedly accomplished until the processing completion flag is added to all of the input/output fields.

Figure 85:
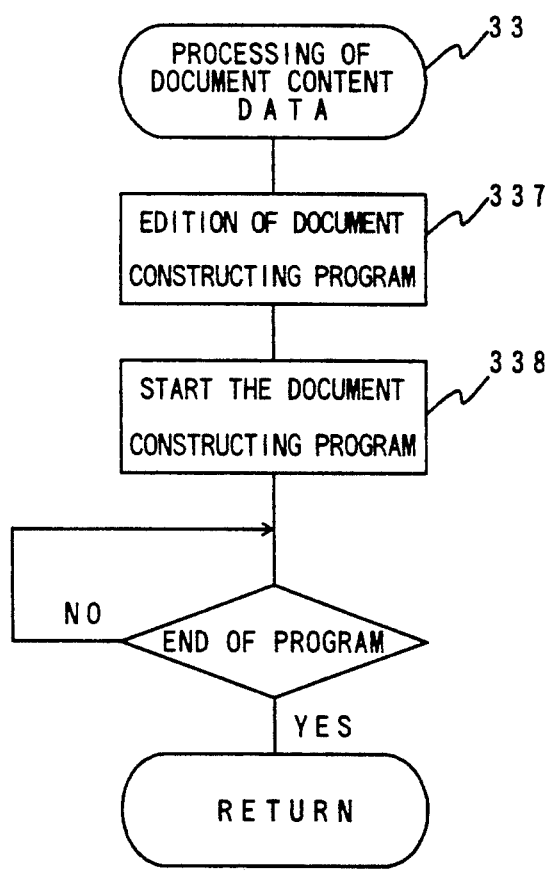
FIG. 85 is a flowchart showing a fourth embodiment of the document content data generation step 33.

FIG. 85 is a flowchart of the fourth embodiment of the document content data generation routine invoked in the step 33. This embodiment utilizes the results of the document construction program generation of the step 23 to construct a document. A step 337 edits a document construction program attained as a result of the step 23. In the step 337, the operator can correct recognition errors and/or can expand the recognized program if necessary. A step 338 then initiates the document processing program. The construction of the document is thereafter achieved under control of this program, which need only monitor the end of the processing.

Figure 86:
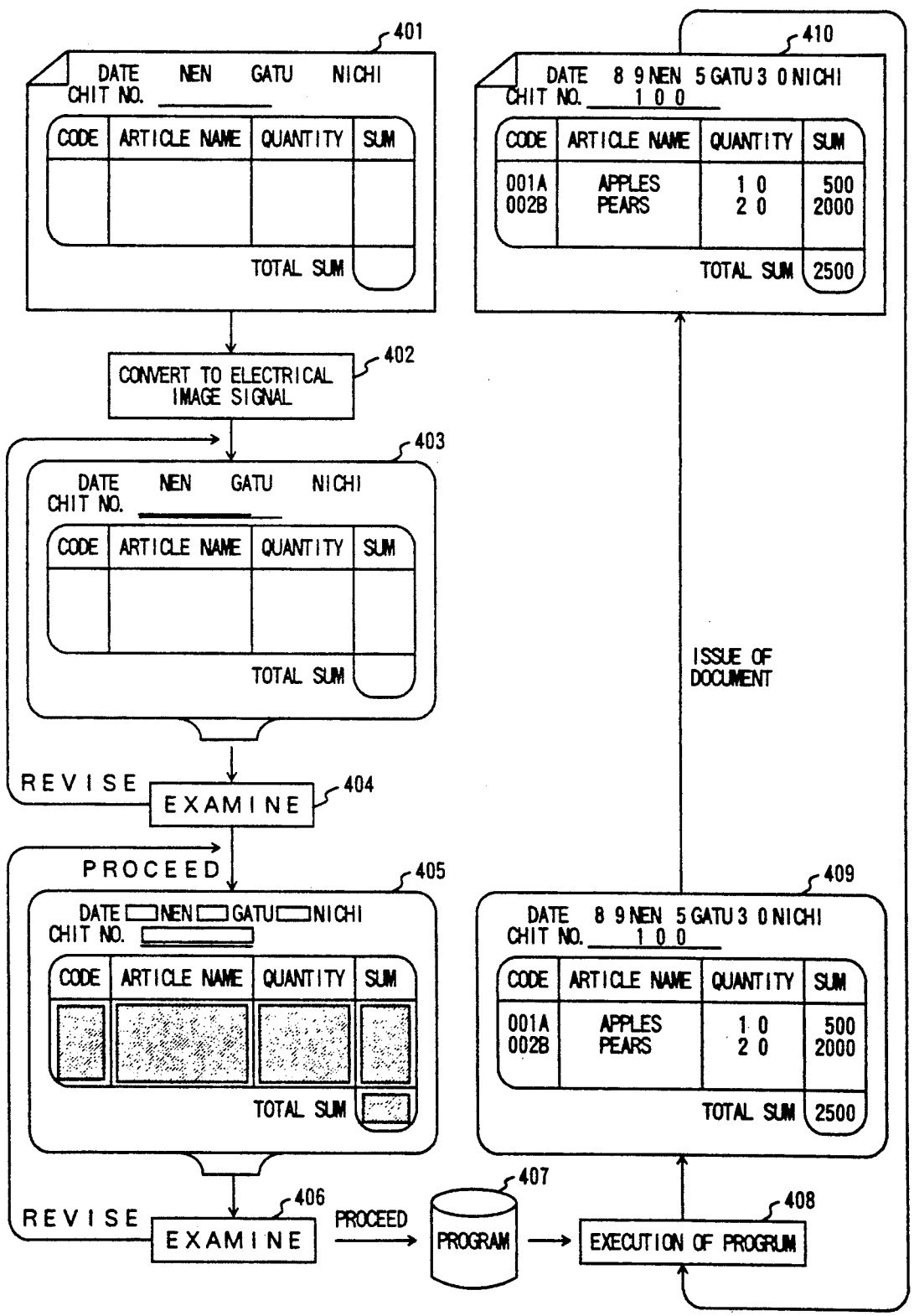
FIG. 86 is a diagram showing an example of an operation procedure conducted by the operator and a state transition associated therewith on a screen of the system in accordance with the present invention.

FIG. 86 shows a typical operation procedure conducted by an operator in a document processing system and a content transition of the display screen in accordance with the present invention.

When the operator inputs from an image input device 93 an original form or manuscript 401 of a document on which a table including blanks are printed for a data entry (step 402), the system recognizes a physical structure of the document image and then presents a screen image 403 representing a recognition result on a display screen of a console 91.

If the displayed contents are required to be corrected and/or additional data items are to be supplied, the operator achieves interactive operations to add and/or to correct characters and ruled lines while conducting a cursor operation on the display screen. If the displayed screen image is completed, the operator depresses a key to proceed the processing to the subsequent step (step 404). When a proceed key is depressed to execute the next step, the system conducts a logical structure recognition processing step to reference a knowledge base so as to determine positions, sizes, attributions of input/output fields, thereby displaying the recognition results on the screen. The screen image is presented, for example, as shown in a portion 405 of FIG. 86, in a reverse display mode in which portions of the recognized input/output field are reversed on the display screen. The operator examines the constituent items of a display screen image 405 to determine whether or not any items of the positions, sizes, attributions of the input/output fields are required to be corrected (step 406). If this is the case, the operator interactively corrects such items; otherwise, the operator presses the proceed key to execute a document construction program automatic generation step 407. In this connection, in the step 406, a trial print operation of the items may be achieved for a fine adjustment of input/output field positions if necessary.

In the automatic program generation step 407, based on properties and positions of the input/output fields and the knowledge base, a processing logic is created for each input/output field. When an execution of the produced program is instructed (step 408), the cursor is moved, for example, to the first input/output field to request the operator to inputs data therein. In response to a data input from the operator, the system accomplishes such operations as an automatic cursor shift to the next input/output field and automatic data input operation based on a function computation and a file search. As a result, the input/output fields are sequentially filled with data in the slip format on the display screen (step 409). When the operator completely inputs data items for a document (a slip) and subsequently instructs a print and an issuance of the document, the system prints out on a print form a document 410 in which the blank portions are loaded with the input data items. Incidentally, in the diagram of FIG. 86, although the screens 410 and 409 are of the same document form, it may also be possible in an actual application that the data input screen 409 has a format suitable for the data input through a row and column normalization, and that fine adjustment of positions and sizes of input data items are carried out depending on the input/output fields previously recognized and stored as recognition results in order to obtain the printout 410 in the format of the original image 401.

Figure 87:
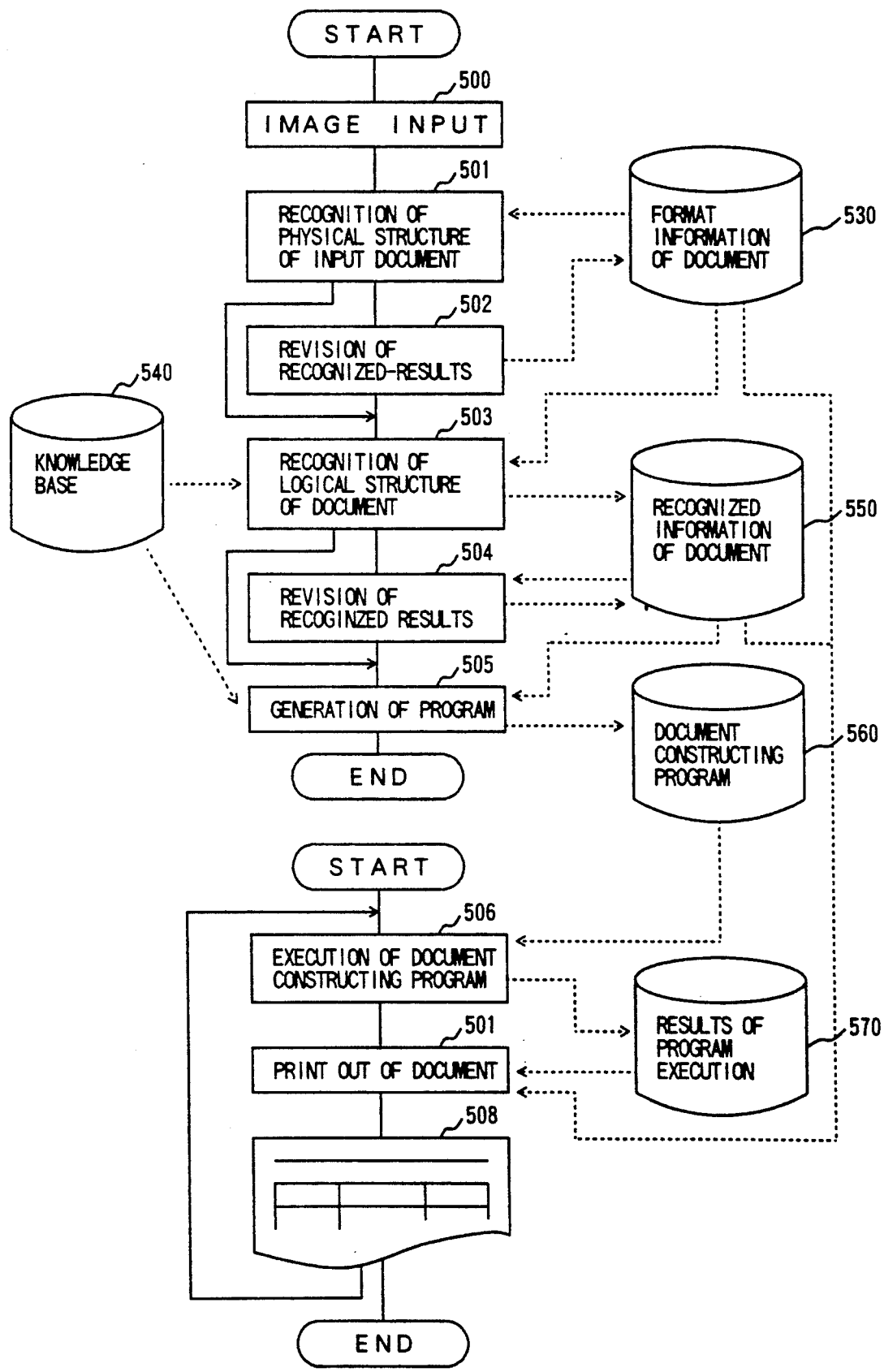
FIG. 87 is a diagram for explaining an operation procedure of a data processing system in association with the example of FIG. 86.

FIG. 87 shows an execution sequence of main program modules associated with the operation sequence of FIG. 86. In association with FIG. 1, data files 530 and 550, a program file 560, a data file 570, and a knowledge base 540 of FIG. 87 are equivalent to the document format data area 982, the work data area 985, document content data area 983, and the document format recognition program 972, respectively. Moreover, a step 500 corresponds to the image input routine 1 of FIG. 6, whereas steps 501, 503, and 505 are associated with the routines 21 to 23 of FIG. 67.

A description will now be given of another embodiment and a variation of the main steps of the flowchart of FIG. 87 in accordance with the present invention.

FIG. 88 is a flowchart showing in detail another embodiment of a logical structure recognition step 503 of FIG. 87.

In order to recognize a logical structure of a document, a rectangular area or region enclosed with four straight lines and a pseudo rectangular region having three straight lines as shown in the left or right portion of the table of FIG. 48A are extracted as cells (step 5031). Before the cell extraction, a step 5030 is executed to normalize the table contour, namely, to correct straight or direct lines. The table form normalization includes, an addition of a straight line (FIG. 48) and a correction of circular corners of a rectangle included in an input image to corners having a right angle (FIGS. 89A and 89B); moreover, for example, restoration of a corner of which the right angle portion is replaced with a line to obtain a corner having the right angle (FIG. 89C), a correction of incomplete connections of two straight lines in which one of the lines is extended to intersect with the other line (FIGS. 89D and 89E), and a correction of two parallel lines in which one of the lines is displaced to form a consecutive straight line (FIG. 89F).

Subsequent to the cell region extraction, in order to obtain input/output fields (step 5033), the system recognizes character strings in the inside and outside areas of the cell to separate a character string having a certain meaning (step 5032).

For the character string separation, characters existing in a predetermined positional relation along a row or column direction within a preset error allowance range are assumed to exist in an identical row or column such that from the group of characters, a character string is extracted as a key item, for example, as follows.

The character string is extracted depending on a relation with respect to a character interval and through a collation with terms and words beforehand loaded in a knowledge base.

Figure 90A:
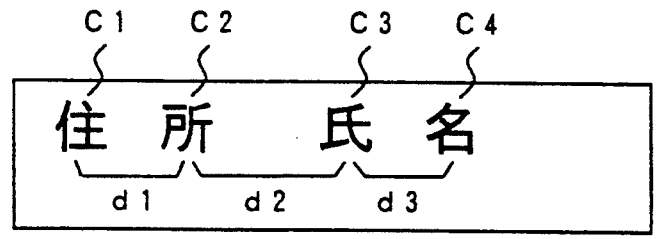
FIGS. 90A to 90C are diagrams useful to explain a method of extracting a character string.
Figure 90B:
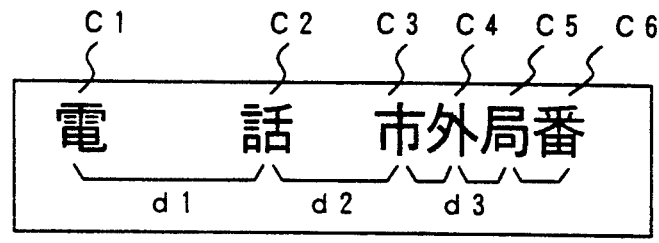

For example, as shown in FIG. 90A, when a row includes a plurality of characters C1 to C4 having unequal intervals d1 to d3 therebetween, a location d2 where the character interval varies is set as a boundary to extract a word comprising characters C1 and C2 and having a meaning of "address" and a word including characters C3 and C4 and possessing a meaning of "name". Similarly, in an example of FIG. 90B, with a location denoted by d2 set as a boundary, a word including characters C1 and C2 and having a meaning of "telephone" and a word comprising characters C3 to C6 and possessing a meaning of "area code" are determined.

Figure 90C:
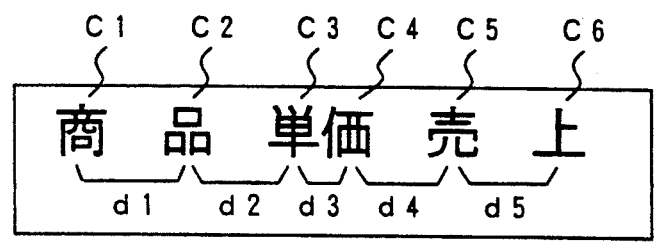

In accordance with the rules above, in an example of FIG. 90C, the system sets a location of d3 as a boundary to extract a first character string including C1 to C3 and a second character string comprising C4 to C6. In this example, however, C1 and C2, C3 and C4, and C5 and C6 respectively form words having a meaning of "goods" or "merchandise", a word designating "price", and a word denoting "sale", respectively. When these words are subdivided into the first and second character strings, the meanings of the respective character strings cannot be appropriately determined.

In this situation, when character strings are extracted depending on character intervals, the system collates the obtained character strings with the terms or words stored in the knowledge base A340. If a term or word matching the pertinent character string is missing, two characters C3 and C4 having a smaller character interval therebetween are combined as a word and then C1 and C2 preceding the word and C5 and C6 succeeding the word are respectively extracted as objective character stings, in order to collate these character strings with the terms or words in the knowledge base.

When the character string extraction is completed along a row or column direction, the system attempts to detect a set of character strings having a certain meaning if unified.

Figure 91:
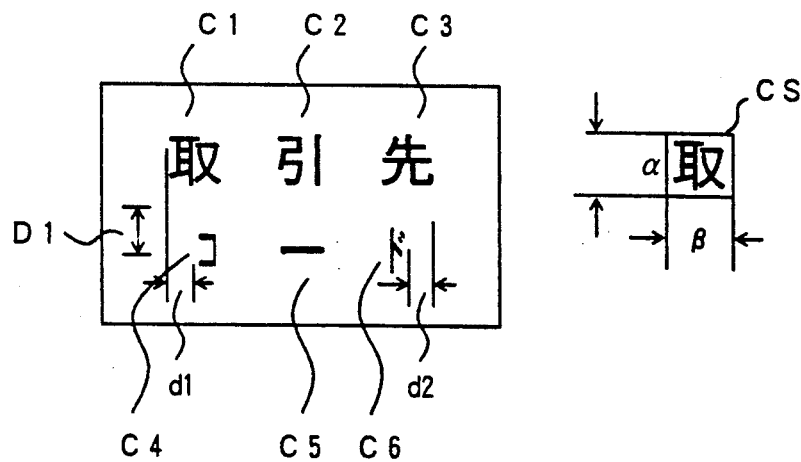
FIG. 91 is a diagram for explaining a unification of character strings.

For example, in the diagram of FIG. 91, a word including characters C1 to C3 and designating "customer" and a word comprising characters C4 to C6 and denoting "code" are to be described as a unified character string in an identical row. In accordance with the present invention, for example, when a row interval D1 between two character strings is within a vertical size of a standard character CS and row-directional position differences d1 and d2 of the first and last positions of each character string are within a horizontal size of the standard character, these two character strings are integrated into a character string.

Also in a case including a plurality of character strings vertically written, based on relationships of character intervals respectively of the vertical and horizontal directions, it is possible to determine whether or not the character strings are to be unified in a character string in the same manner as for the operation above. The decision for the character string unification may also be accomplished by judging to to extract a word comprising characters C1 and C2 and position of the first character string or the first position of the subsequent character string, a Japanese postpositional word or a preposition indicating a possessive case or a conjunction connecting the two character strings. If such a particular postpositional word, preposition, or conjunction is found, these character strings may be unified into a character string regardless of the character string interval.

Figure 92A:
FIGS. 92A to 92C are diagrams showing typical cell kinds.
Figure 92B:
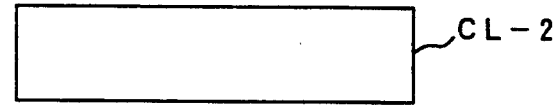
Figure 92C:
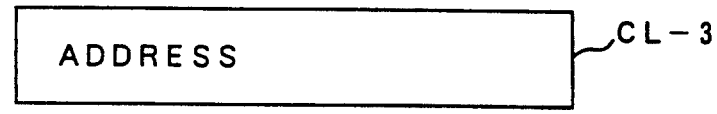

After the character strings are extracted, the system sets input/output fields (step 5033). The cells constituting a document includes, for example, as shown in FIGS. 92A to 92C, an item cell CL-1 which contains a character string of an item name (key item) and in which any data field cannot be established, an input-/output field cell CL-2 which is entirely empty (including a case where a unit symbol such as ¥ or kg is contained), and a field cell with item CL-3 which includes a character string as a key or header item and an input-/output field.

Figure 93:
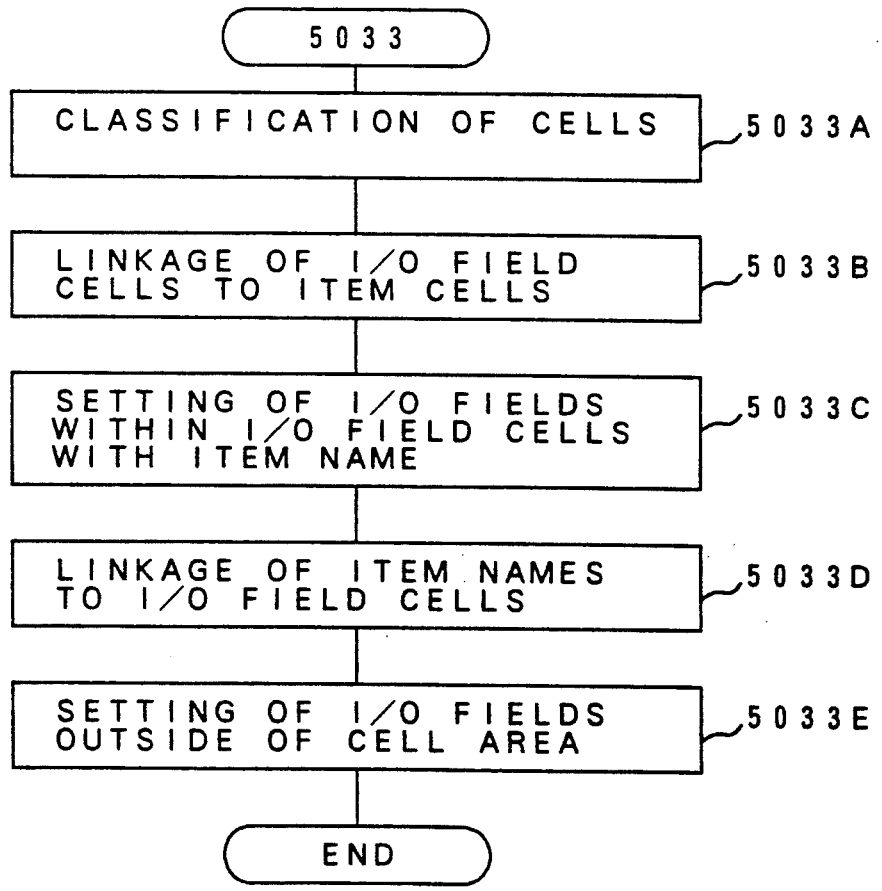
FIG. 93 is a detailed flowchart of a routine executed in a table form normalization step 5033 of FIG. 88.

In a step 5033, as shown in FIG. 93, the cells are first classified (step 5033A) and then linkages are established between input/output field cells and item cells (step 5033B); thereafter, input/output fields are set in the cells with item (step 5033C). If there exists an input/output field cell which has not been linked with any item cell, the system detects a character string to be a key item for the input/output field cell so as to relate the cell with the character string (step 5033D). Finally, an input/output field is established before or after each particular character or word (such as the date 102 of FIG. 3) in an area other than the cells (step 5033E).

Figure 94A:
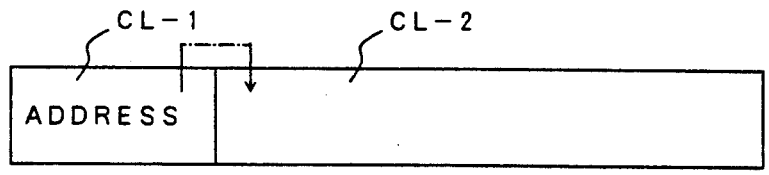
FIGS. 94A to 94E are diagrams for explaining associated relations between item cells and input/output cells.
Figure 94B:
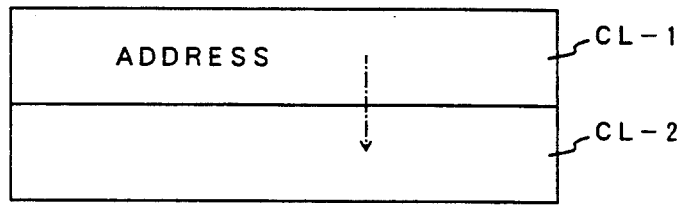
Figure 94C:
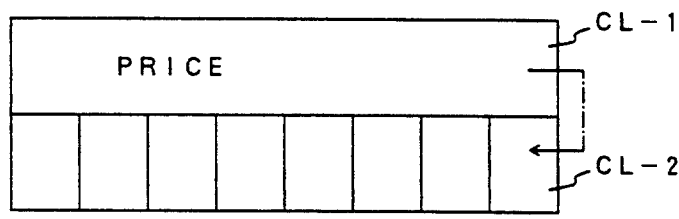
Figure 94D:
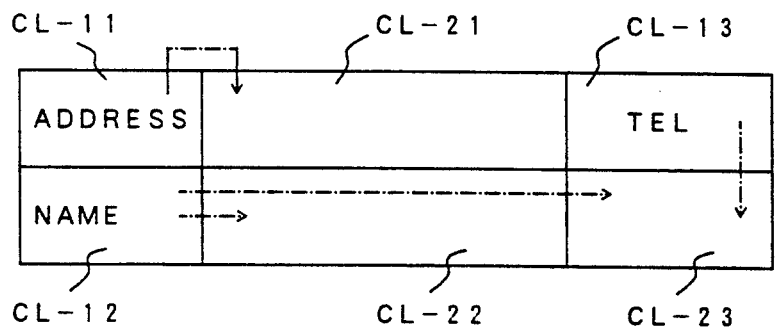

The linkages between the item cell CL-1 and the input/output field cell CL-2 are established in the horizontal or vertical direction between adjacent cells as shown in FIG. 94A or FIG. 94B. When the input/output field cell CL-2 comprises a plurality of subregions in a character unit for a code data or numeric character entry as shown in FIG. 94C, these subregions are linked as a whole to an item cell CL-1. In a case where a plurality of input/output cells are found beneath or on the right side of an item cell, the item cell is linked with the plural input/output field cells. However, as shown in FIG. 94D, when an input/output field cell CL-23 located on the right side of an item cell CL-12 has another item cell CL-13 in the vertical direction, the item cell CL-13 having a smaller number of input/output field cells to be linked therewith takes precedence and hence CL-23 and CL-12 are linked to CL-13 and CL-22, respectively.

Figure 94E:
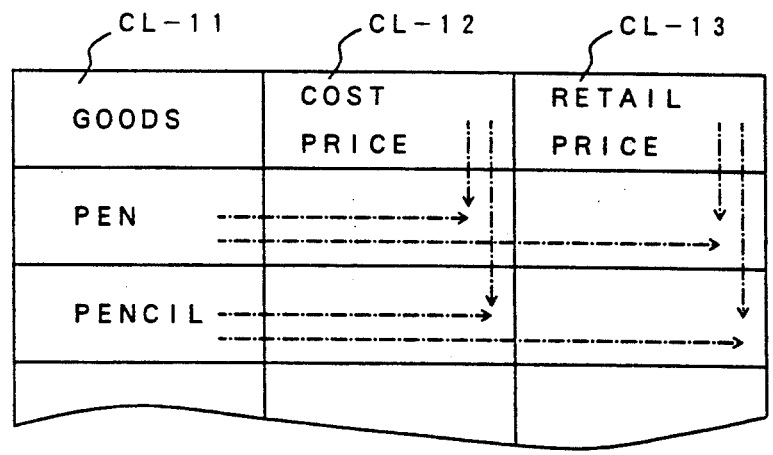

The above rules do not apply to a case of a table in which, for example, as shown in FIG. 94E, a plurality of input/output field cells are arranged in a matrix shape.

Figure 95A:
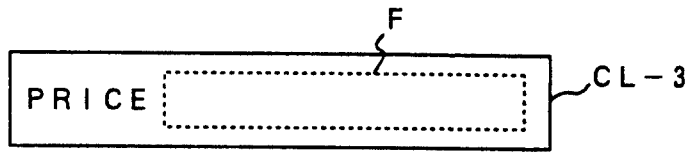
FIGS. 95A to 95C are diagrams useful to explain a setting of an input/output field in a cell with items and an identification of a cell with items.
Figure 95B:
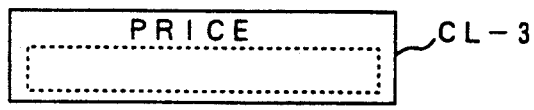
Figure 95C:
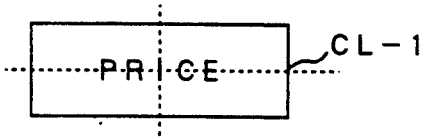

Discrimination for an input/output field cell with item CL-3 or an item cell CL-1 is carried out depending on a position of a blank area remaining in each cell and/or a content of a character string therein. For example, in a case where a blank area remains on the right (or left) side of the character string as shown in FIG. 95A or under the character string as shown in FIG. 95B, each of these cells is judged to be an input/output field cell with item CL-3. Consequently, an input/output field is set to each blank area F. In a case of a cell subdivided into four subregions (two rows by two columns), as shown in FIG. 95C, if a character string relates to three or more subregions, the cell is assumed to be an item cell CL-1.

Figure 96A:
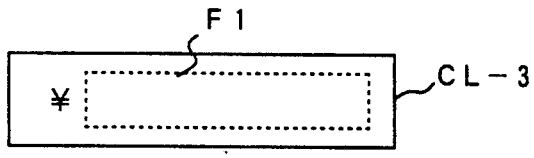
FIGS. 96A and 96B are diagrams illustratively showing special examples of input/output fields.
Figure 96B:
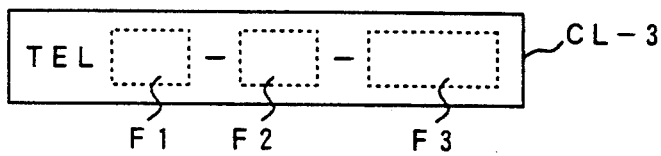

When a character string loaded in the input/output field cell with item CL-3 matches with a term or a common word (including a symbol) beforehand registered to a knowledge base, an input/output field is established in conformity with field format specification information stored in the knowledge base 540. As a result, for example, in cases of the yen symbol "¥" and a character string "TEL" as respectively shown in FIGS. 96A and 96B, the system respectively sets an input/output field F1 and input/output fields F1 to F3. Similarly, in a case of a character string comprising "Nen (year)", "Gatu (month)", and "Nitch (day)" with a space remaining therebetween, a field is established for a numeric character entry on the left side of each of these characters. The knowledge base is also referenced when an input/output field is established in other than the cell regions as is the case of the step 5033E.

Figure 97:
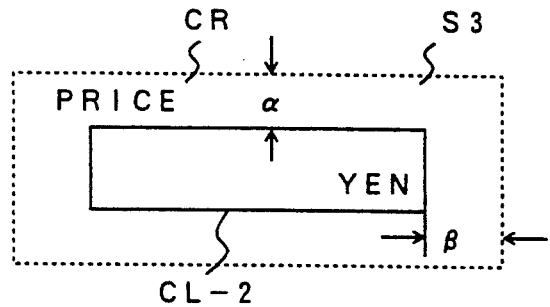
FIG. 97 is a schematic diagram showing a particular correspondence between an input/output field and a field name.

For an input/output field cell for which any associated item cell is not found, the system sets, for example, as shown in FIG. 97, a search range having a margin width $\alpha$ in the upper and lower sides and $\beta$ in the right and left sides of the input/output cell CL-2 so as to detect a character string CR as an item name in this region.

Information items of the recognition results related to the respective input/output fields are stored in a file 550 (step 5034). The file 550 contains, in a form of a table TBL20, records each comprising position coordinates 551 of a base point (for example, the upper-left corner) of each input/output field, a length 552 and a width 553 of the input/output field, a character count 554 for the input/output field, a name 555 assigned to the field, and an attribution 556 thereof. The character count 554 denotes a value attained when standard-sized characters are arranged with the standard character interval. As shown in FIG. 94C, when an input/output field is subdivided into subregions, the value is equal to the number of the subregions. In this regard, the character count 554 may be later modified by the operator. If the value is thus increased, the print character size becomes to be smaller than the standard size. The field name 555 is a character string contained in an item cell linked with the input/output field, an item name loaded in an input-/output field with item, or an item name detected in a region outside the cell. The field attribution 556 is attained from the knowledge base 540 by use of the field name as a key and designates a character type such as an alphanumeric character type or a kanji (Japanese ideograph) type.

The knowledge base 540 includes, as shown in FIG. 99, a term area 540A and a common word area 540B. The term area 540 stores records each associated with a keyword 541, as shown in FIG. 100, which is an idiom or a term generally used in a business document. On the other hand, the common word area 540B is disposed to store therein records like the term records, as shown in FIG. 100. Each record of the common word area has a keyword indicated by one or more basic words which are selected from the words available as constituent elements of terms and which represent properties of the terms.

In FIG. 100, the record includes a term or a common word representing an item name to be employed as a retrieval key of the knowledge base 540, a synonym 542 of the term or the common word, an attribution information item 543, and a property 544 of the term or word. For example, the field 544 is loaded with a word or code denoting "amount of money" for the term or word such as "cost price", "sales amount", "gross sales", or "balance". The configuration further includes a flag 545 indicating whether or not the term or word 541 is available as a retrieval key of a data file, a key input flag 546 designating whether or not the term or word 541 is to be supplied from the console, a data check rule 547 such as an allowable numeric range for judgement of a numeric data input error, and a data processing rule 548 for the item. When the attribution information 556 related to a field name is desired to be obtained from the knowledge base 540, a retrieval is carried out first in the term area 540A with the field name set as a retrieval key. If the associated record is missing, the retrieval is conducted in the common word area 540B. If a key term or a keyword matching with the field name is missing in these areas, the system sequentially checks the basic words registered to the common word area 540B to determine whether or not any basic word is contained in the field name, thereby obtaining as a retrieval result (representative word) one of the words employed in the field name. For example, in a case of a Japanese language document, a word at the end of the field name most suitably represents the property of the field name. Consequently, if a plurality of words registered to the common word area match with a portion of the field name, a word existing near the end of the field name and having the largest number of characters is assumed to be the representative word. In a case of a document other than a Japanese language document, it is necessary to adopt a selection rule in conformity with the system of the language used. If a term or word matching with the field name is missing as a result of the retrieval processing above, a default value is set as the attribution information 556.

Next, a description will be given of an automatic generation routine producing a document construction program to be executed in the step 505 of FIG. 87. In the above embodiment of FIG. 68, input/output fields are sequentially selected such that depending on the attribution of the selected input/output field, the input/output field processing program generation routine 235 creates a program part. However, the automatic program generation may be carried out such that, for example, as shown in FIG. 101, an input/output fields associated with the same field attribution may be processed at a time to create an I/O field processing program.

Figure 101:
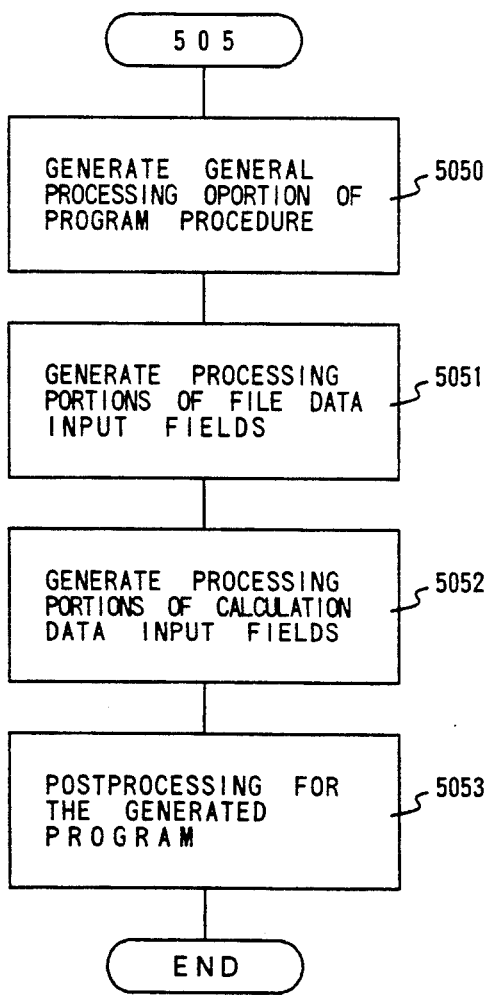
FIG. 101 is a flowchart showing details of a routine executed in a program generation step 505 of FIG. 87.

In FIG. 101, a step 5050 is a routine to produce a geneal portion of a program procedure and a program portion to set data in key input fields. For a key input field selection, a field name 555 registered to the table TBL20 is used as a retrieval key to access the knowledge base 540, thereby referencing a key input flag. A name of a data file to be referenced at a document construction is specified by the operator in the step 5050. However, when the knowledge base 540 is beforehand loaded with data file names to be used in association with respective terms or words 541 designating respective item names, the data file name specification by the operator may be omitted such that the necessary data file name is obtained from the knowledge base 540.

In the example of FIG. 101, step 5051 generates a processing logic to access a data file in association with a key input field in which data as file retrieval key is inputted. Subsequently, a step 5052 establishes a processing logic associated with an input/output field (calculation data input field) in which a calculation result is inputted. A step 5053 achieves postprocessing to optimize the generated program, for example, to reduce the numbers of file open and close operations redundantly conducted on an identical file.

Figure 102:
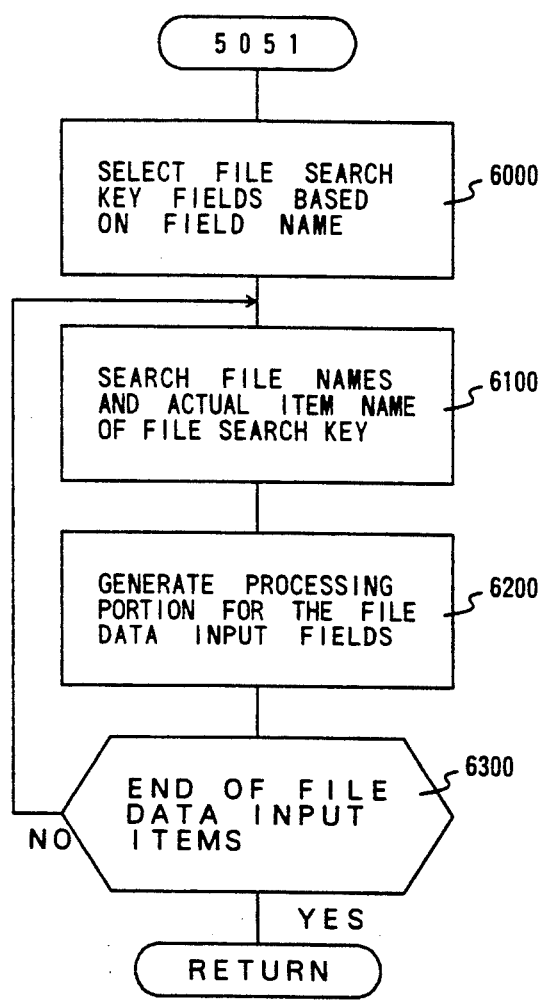
FIG. 102 is a flowchart showing in detail a routine executed in a step 5051 of FIG. 101.

FIG. 102 is a detailed flowchart of a routine 5051 for generating a file data access field processing program. In the routine 5051, a step 6000 first selects as follows each key input field in which data as a file search or retrieval key is to be inputted. Using as a key a field name 555 registered to the table TBL20 of FIG. 98, the knowledge base 540 is accessed to detect a record having a term or word 541 matching with the field name so as to reference a search key flag 545 of the record and the key input flag 546. The knowledge base access is conducted in the same manner as for the operation achieved in the step 503 to attain the field attribution 556. In the step 503, if the search key flag 545 and the key input flag 546 are beforehand read from the knowledge base 540 together with the field attribution 556 so as to be registered to the table TBL20, the system need only reference the table TBL20 in the step 6000 to determine whether or not the pertinent field includes data as a file search key.

Figure 103:
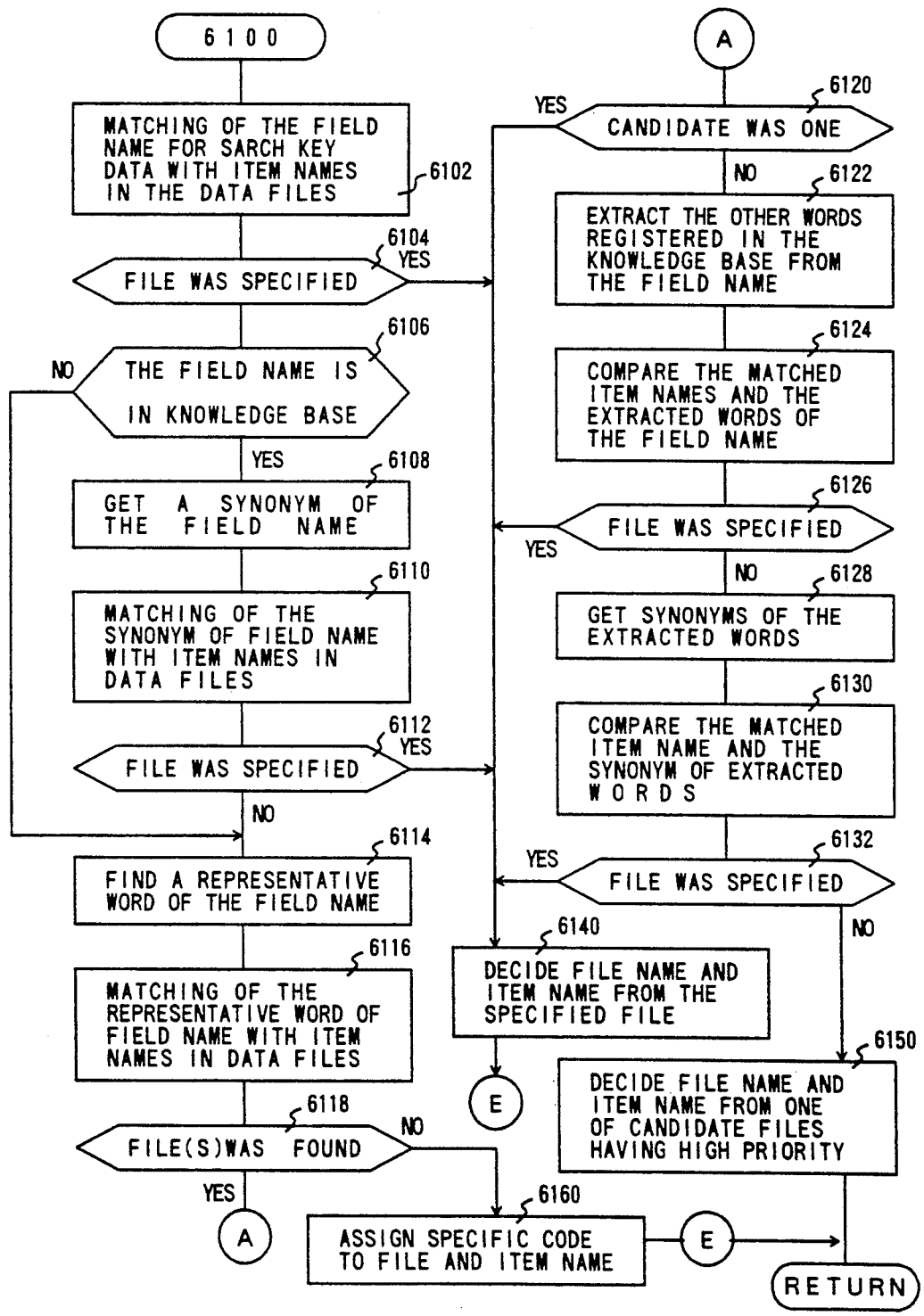
FIG. 103 is a flowchart showing in detail a routine executed in a step 6100 of FIG. 102.

In step 6100, based on a field name of the determined field to be loaded with a key input data item as a file search key, a name of a file in which a record containing the key input data is found and an actual item name of the search key used in the file are retrieved, for example, according to the flowchart of FIG. 103.

In the flowchart of FIG. 103, a matching operation is first carried out between the name of the search key input field and each item name in a data file specified by the operator to detect a data file including a data item having the pertinent field name. If such a data file is identified, control proceeds from a decision step 6104 to step 6140 in which based on the identified file, a file name and an item name associated with the search key are determined.

When the file cannot be identified, that is, when an item matching with the search key input field name is missing in the data files, the field name is set as a search key to access the knowledge base 540 to attain a synonym 542 of the field name. Subsequently, a search is conducted through the respective data files to detect an item name identical to the synonym (steps 106 to 6110). If this results in an identification of a file (step 6112), control is passed to a step 140; otherwise, step 6114 is executed to detect a representative word included in the field name. The representative word is obtained through a matching operation between the common word 541 in the knowledge base 540 and the field name and most appropriately represents the property of the field name. With the representative word set as a key, data files are accessed so as to find out a data file including an item which has a name matching with the representative word (step 6116). If such a data file cannot be detected through the file search (step 6118), a step 6160 is conducted to set a particular code (for example, a question mark) as a data file name and an item name to be associated with the search key.

In a case where only one of the files possesses an item matching with the representative word (step 120), control proceeds to step 6140; whereas, when a plurality of files are found as candidates, step 6122 is executed to extract other words from the file name by use of the common words in the knowledge base 540. Subsequently, in step 6124, the obtained words are compared with the respective item names matching with the representative word, thereby detecting an item name most similar to the field name. If the file can be identified through the comparison (step 6126), step 6140 is conducted; otherwise, a sequence of steps 6128 to 6130 are achieved in which the knowledge base 540 is accessed to attain a synonym of the extracted words to detect an item name most analogous to the field name. When the processing above fails in identifying a data file (step 6132), step 6150 is executed to select a candidate file having the highest priority level (for example, the file first specified by the operator) so as to establish a correspondence between the search key and the file name and the item name included therein.

When the data file name and the item name associated with a search key input field are thus determined, step 6200 of FIG. 102 is executed to produce a program part or portion which loads file data input fields with data of particular item of a data record read from a data file by use of the search key.

Figures 104, 105:
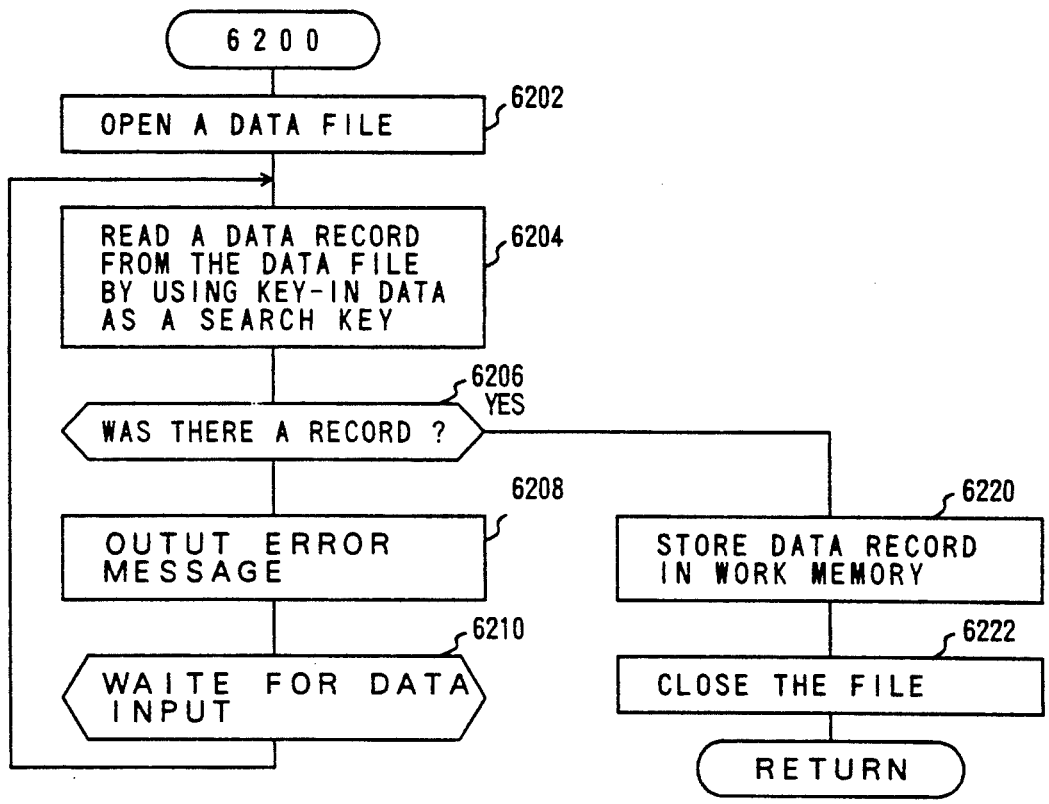
FIG. 104 is a flowchart showing details of a routine executed in a step 6200 of FIG. 102.
FIG. 105 is a diagram showing an example of contents of a memory for storing therein data obtained as a result of an execution of a document construction program.

FIG. 104 shows a fundamental configuration of the program part or portion created in the step 6200. This program part includes a step 6202 to open a data file, step 6204 to read a data record from the data file by use of the key input data set in the search key input field as a search key, step 6206 to decide whether or not a data record associated with search key is found in the data file, step 6206 to output an error message when an objective data record is missing, step 6210 to wait for a reinput of data so as to advance control again to the step 6204 in response to the data reinput, step 6220 operative when a data record is read from the data file for temporarily storing the record in a work memory area, and step 6222 to close the data file.

In the routine 5052 of FIG. 101 producing program parts to process calculation data input fields, a processing program is generated for each input/output field, excepting a field to be loaded with total data, in conformity with the data check rule 547 or the data processing rule 548 defined in the knowledge base 540. For an input/output field for which neither the rule 547 nor the rule 548 is defined, associated item is selected from a data record obtained from a data file due to a program part or portion created in the step 5051 so as to automatically set the item to the input/output field.

The data processing rule 548 defined in the knowledge base 540 includes rules to display a data and a point of time, a calculation or computation rule associated with an item name, and a calculation rule related to a property. The rule of date and time above is used to define systematic procedures to automatically attain a data item of a calender date and a data item of time. In the calculation rule using an item name, a data item to be set in an input/output field is defined by use of a calculation expression between data items each having a concrete item name. The calculation rule employing a property is a definition of a data item to be set in an input/output field, the data item being defined with a calculation expression between items respectively having particular properties. A routine 5052 produces a program procedure wherein for an input/output field having an item name for which either one of the rules is defined in the knowledge base 540, a calculation is conducted in accordance with a content of the rule to automatically load a calculation result in the input/output field. For an input/output field having a field name "Total Sum", a program procedure is created in which a total is computed for items existing on the upper side or left side of the input/output field and having an identical property so as to set the total in the total field.

The program thus created is executed as follows. Based on key-in data supplied from the operator, file data input/output fields and calculation data input/output fields are loaded with data items. These data items are stored in association with the names of the input/output fields in the memory area 570, for example, as shown in FIG. 105 (which is associated with the input screen 409 of FIG. 86). When the operator inputs a document issuance command following the input data, the system edits and produces a printout result of a document 410 based on the contents of the data file 570 and the table TBL20 loaded with the recognition results of FIG. 98. In this connection, the contents of the memory area 570 may easily be reflected onto other data files such as a customer control file and a stock management file.

Figure 106:
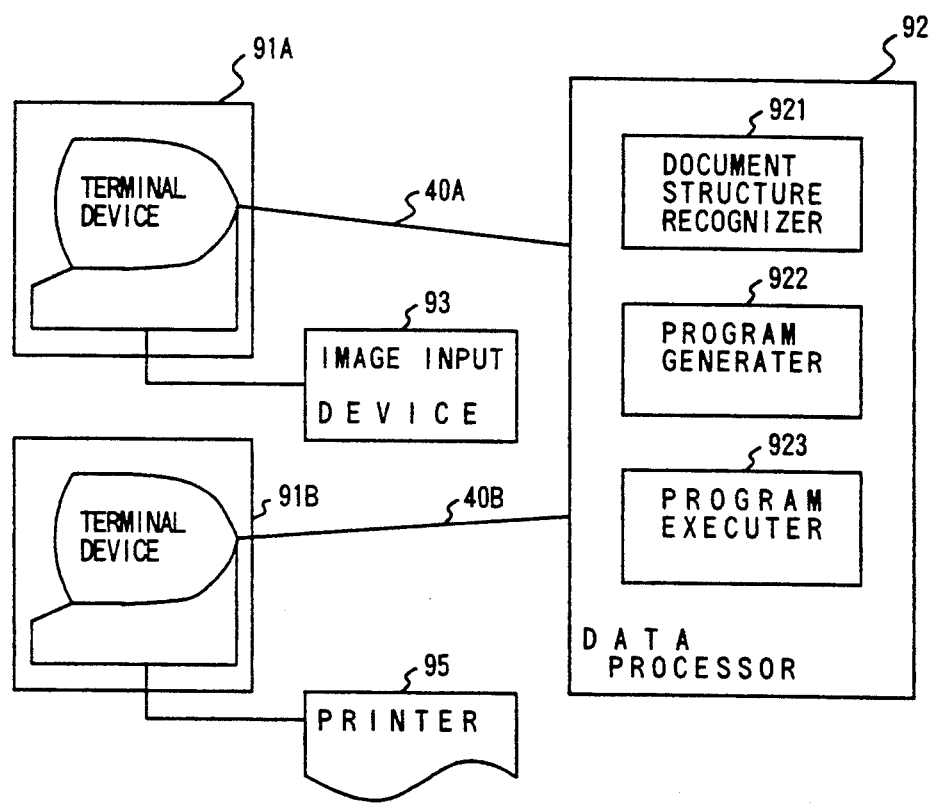
FIG. 106 is a diagram showing another embodiment of a system configuration to achieve the document processing in accordance with the present invention.

FIG. 106 shows a configuration example of a data processing system comprising a data processor 92 and plural display terminals 91A and 91B in accordance with the present invention.

The data processor 92 is provided with a document structure recognizer function 921, a program generator function 922, and a program executer function 923. The terminals 91A and 91B are connected to the data processor 92 via data transmission paths 40A and 40B, respectively. Each of these terminals possesses a display and a keyboard to input and/or to correct data. The terminal 91A is further connected to an image input device 93 such that image data supplied therefrom is transferred via the terminal device 91A and the data transmission route 40A to the data processor 92. Moreover, the terminal 91B is linked with an output device 95 for a print operation so that output data from the data processor 92 is delivered via the data transmission path 40B and the terminal 91B to the output device 95.

With the provision of this construction, the user may utilize the constituent components in a flexible manner. For example, in the system configuration, a terminal is employed for a development job and the other terminal is used to execute processing and/or to achieve a modification job. Furthermore, by elongating the length of the data transmission paths 40A and 40B, the development and execution of programs may possibly be accomplished from the terminals at a location apart from the data processor 92.

Although the embodiment above includes one data processor 92, there may be disposed a plurality of processors so as to distribute the functions associated with routines ranging from the image input routine 1 to the document print routine 4 to the plural processors, thereby implementing a distributed data processing system.

As above, in accordance with the present invention, only by supplying the system with an image of a sheet of paper on which a document form or format is drawn, format or format information items for the document issuance (such as ruled lines, circular arcs, oblique lines, broken lines, characters, field positions, and field attributions), a document construction program and the like can be automatically defined. This consequently leads to an advantage that a new document issuance is facilitated. Moreover, since the form information items supplied in a form of an image can be automatically converted into graphic code and character code information items, the high-quality form can be displayed on a screen or can be printed out on a print form.

While particular embodiments of the invention have been shown and described, it will be obvious to those skilled in the art that various changes and modifications may be made without departing from the present invention in its broader aspects.

We claim:

1. A method of producing on a screen a form display including at least one blank field in which characters are to be written, the method comprising the steps of:
   recognizing from an original form image a physical layout of a plurality of character patterns and a plurality of line patterns constituting a form;
   converting the layout of the form recognized in said recognizing step into a second layout of the form including a blank field modified to correspond to an integral multiple of a basic pitch of a cursor movement responsive to input operations of characters on a display screen; and
   presenting on the display screen a form display having the second layout obtained in said converting step;
   wherein a character string is displayed in said blank field of the form display, said character string inputted from an input device, with a predetermined character size at a position associated with the cursor pitch.

2. A method according to claim 1, further including the steps of:
   presenting on the display screen a form display comprising the character and line patterns in the physical layout recognized in said recognizing step; and
   correcting in response to a user's input operation a portion of the character or line pattern included in the form display presented on the display screen;
   said converting step conducting the layout conversion on the character and line patterns corrected in said correcting step.

3. A method according to claim 1, further comprising a step of converting a form document into image data by use of an image input means,
   said recognizing step being executed on the image data as said original form image.

4. A method according to claim 3, further including the steps of:
   detecting an inclination of the form document based on the image data supplied from the image input means; and
   correcting the inclination, said recognizing step being executed on the image data undergone the inclination correction as said original form image.

5. A method according to claim 1, wherein said recognizing step comprises:
   extracting, from a plurality of character patterns included in said original form image, at least one character string constituted by a plurality of adjacent characters; and
   comparing a group of standard words or terms stored beforehand in a memory with the extracted character string to automatically correct a part of the extracted character string so as to match the character string with one of said standard words or terms,
   said converting step executing the layout conversion on the character and line patterns thus corrected.

6. A method or producing a form document, the method comprising the steps of:
   recognizing from an original document image, a layout of character and line patterns constituting a document, and storing a recognition result as physical structure data of the document;
   converting the layout of the character and line patterns recognized in said recognizing step into a second layout of a form including at least one blank field modified to correspond to an integral multiple of a basic pitch of a cursor movement responsive to an input operation of character or numeric data on a display screen and storing a conversion result as normalized document data;
   presenting on the display screen a form display having the second layout created from the normalized document data;
   displaying characters or numerals inputted by the user in said modified blank field in the form display; and
   combining the data of characters or numerals inputted by the user in said displaying step with the physical structure data of the document and outputting a combined result to a printer, to thereby produce a form document filled with data.

7. A method according to claim 6, further including the steps of:
   presenting on the display screen a form display comprising the character and line patterns corresponding to said physical structure data obtained in said recognizing step;
   correcting in response to a user's key operation a portion of the physical structure data and the character or line pattern included in the form display presented on the display screen; and
   said converting step conducting the layout conversion on the character and line patterns represented by said physical structure data thus corrected.

8. A method according to claim 6, further comprising a step of converting a form document into image data by use of an image input means,
   said recognizing step being executed on the image data as the original document image.

9. A method according to claim 8, further including a step of detecting an inclination of the form document based on the image data supplied from the image input means and correcting the inclination,
   said recognizing step being executed on the image data which was subject to the inclination correction as the original document data.

10. A method according to claim 6, further including the steps of:
    extracting, from a plurality of character patterns included in said original document image, at least one character string comprising a plurality of adjacent characters;
    comparing a group of standard words or terms stored beforehand in a memory with the extracted character string to automatically correct a character pattern constituting part of the character string so as to match the character string with one of said standard words or terms;

said converting step executing the layout conversion on the layout of character and line patterns thus corrected.

11. A method of inputting data by use of a form display having a plurality of blank input/output fields in which data items are to be set, the method comprising the steps of:

recognizing a layout of character and line patterns constituting a form from an original form image to store in a memory a recognition result as physical structure data of the form;

analyzing the physical structure data to detect data input/output fields included in the form and item names associated with the respective data input/output fields;

referencing, based on the detected item names, a knowledge base to determine for each said input/output field a field attribution indicating an output source or a generation rule of data to be set thereto;

presenting on a display screen a form display created based on the physical structure data; and achieving, for each said data input/output field included in the form display presented on the display screen, data processing associated with the field attribution thereof to set in the data input/output field a data manually supplied from the user or a data automatically generated.

12. A method according to claim 11, wherein said referencing sep determines whether the field attribution of an input/output field indicates that input data from a keyboard is set to the field, that data read from a data file is set to the field, or that data obtained through a calculation using data set at least to one of said input/output fields is set to the field.

13. A method of automatically generating a program for setting data in a form display having a plurality of blank input/output fields to be loaded with data, the method comprising the steps of:

recognizing from an image of a form document having a plurality of input/output fields, physical structure data denoting a layout of character and line patterns constituting a form document;

analyzing the physical structure data to detect a plurality of input/output fields for use in data input/output operations and at least one fixed field including therein a character string indicating an item name;

examining a positional relation between the fixed field and the input/output fields to determine for each said input/output field an item name of data to be set thereto;

determining for each input/output field, based on the item name of data and a knowledge base, a field attribution indicating an input source or a generation rule of data to be set in the input/output field; and automatically generating a program for the user to input data to blank input/output fields of the form display presented on the display screen based on the field attributions and the physical structure data.

14. A method according to claim 13, further including the steps of:

producing from the physical structure data normalized form data having a layout of the character and line patterns converted to be adaptive to an integral multiple of a basic pitch of a cursor movement responsive to an input operation of characters on the display screen, said analyzing step being conducted such that, in place of the physical structure data, the normalized form data is analyzed for the field recognition.

15. A method according to claim 13, wherein said analyzing step further includes the steps of:

extracting a plurality of cell regions each including a rectangular area defined by at least three side liens formed with line patterns;

determining a rectangular area in each of said cell regions as an input/output field or as a fixed field by detecting the presence or absence of any character string in each said cell region and/or by analyzing a content of the detected character string; and detecting a particular word outside the cell region to identify a blank area adjacent to the word as an input/output field.

16. A method according to claim 14, wherein said analyzing step further includes the steps of:

extracting a plurality of cell regions each including a rectangular area defined by at least three side lines formed with line patterns;

determining a rectangular area in each of said cell regions as an input/output field or as a fixed field by detecting the presence or absence of any character string in each of said cell regions and/or by analyzing a content of the detected character string; and detecting a particular word outside the cell regions to identify a blank area adjacent to the word as an input/output field.

17. A data processing system for inputting data to a form display presented in a display screen comprising:

first memory means for storing therein image data of a form having a plurality of blank fields in which character or numeric data are to be placed;

display means provided with a display screen for presenting the form display;

input means for inputting character and/or numeric data; and control means for achieving a control operation such that data supplied from said input means is inputted to a blank field indicated by a cursor in the form display presented in the display screen;

said control means including:

means for recognizing based on the form image stored in said first memory means a layout of a plurality of character and line patterns constituting a form and for producing physical structure data of the form; and means for producing normalized form data from the physical structure data of the form by modifying the layout of the character and line patterns to correspond to an integral multiple of the basic pitch of the cursor movement responsive to an input operation of character or numeric data on the display screen, the normalized form data defining a form display to be presented on the display screen for a data input operation.

18. A system according to claim 17, further including a printer apparatus wherein:

said control means combines data inputted to the blank fields of the form display with a format defined by the physical structure data to supply the combined data to the printer apparatus.

19. A system according to claim 17, further including image input means for converting an image of a form to image data, wherein the image data supplied from said image input means is stored in said first memory means.

20. A data processing system for inputting data to a form display presented in a display screen comprising:

first memory means for storing therein image data of a form document having a plurality of blank fields for setting therein character or numeric data;

display means provided with a display screen for presenting a form display;

input means for inputting character and/or numeric data;

second memory means for storing therein a plurality of data records;

knowledge base means loaded, for each word or term, with knowledge information of a plurality of items;

control means for achieving a control operation of data inputs to blank fields in the form display presented in the display screen;

said control means including:

first means for recognizing based on the form document image stored in said first memory means a layout of a plurality of the character and line patterns constituting a form document and for producing physical structure data of the form document;

second means for analyzing the physical structure data to detect data input fields included in the form document and item names associated with said data input fields;

third means for referencing based on the item names the knowledge base and for respectively detecting for said input field attributions indicating input sources or generation rules of data to be set to the input fields; and fourth means for automatically producing based on the field attributions a program for inputting data to blank data input fields of the form display defined by the physical structure data and presented on the display screen, wherein when the program is executed, data inputted from said input means by the operator, data of either one of the items included in a data record read out from said second memory means, and data obtained through a calculation are selectively set to the blank input fields of the form display.

21. A system according to claim 20, wherein:

said control means further includes fifth means for generating normalized data from the physical structure data of the form document by automatically correcting the layout of the character and line patterns so as to be adaptive to an integral multiple of the basic pitch of the cursor movement responsive to an input operation of character or numeric data on the display screen;

said second means analyzes the normalized data in place of the physical structure data; and said fourth means automatically generates a program for inputting data to blank data input fields of the form display defined by the physical structure data and presented on the display screen.

22. A system according to claim 21, further including image input means for receiving as an input thereto an image of a form document, wherein the form document image supplied from said image input means is stored in said first memory means.

23. A system according to claim 21, further including a printer means for producing a form document, wherein:

said control means for editing data inputted to the blank fields of the form display with a document format defined by the physical structure data, thereby supplying the edited data to the printer means.

24. A method of automatically generating a program for setting data in a form display having a plurality of blank fields to be filled with data, the method comprising the steps of:

recognizing from an image of a form document having a plurality of fields, physical structure data denoting a layout of the form document;

analyzing the physical structure data by referring to a knowledge base to obtain logical structure data denoting attributions of respective fields in said document and relations between said fields; and automatically generating based on said logical structure data and said physical structure data a program for presenting a form display on a display screen and for setting data in blank fields of said form display in response to an user's data input operations.

25. A method according to claim 24, the method further comprising the steps of:

presenting on the display screen the recognized data input fields with a style visually distinctive from the other portions of the form display, thereby to amend the form display by user operations if an error exists in a result of automatic recognition for the logical structure data.

26. A method according to claim 24, the method further comprising the steps of:

normalizing the layout of the form document such that each of blank fields has a size adaptive to an integral multiple of a basic pitch of a cursor movement responsive to input operations of characters or numerals on the display screen, wherein said program is generated so that data input operations by the user are carried out on the display screen presenting a form display having the normalized layout.

27. A method according to claim 24, the method further comprising the steps of:

producing a hard copy of a document including a layout of document generated from the physical structure data and having a plurality of fields filled with data inputted by the user operation on the display screen.

28. A method according to claim 24, the method further comprising the steps of:

presenting on the display screen a layout of the form display generated from said physical structure data obtained in said recognizing step; and correcting the physical structure data in response to user operations to change a part of the form display presented in the display screen, wherein said analyzing step and generating step are executed on the physical structure data thus corrected.

29. A method according to claim 24, the method further comprising the steps of:

normalizing the layout of the form document such that each of blank fields has a size adaptive to an integral multiple of a basic pitch of a cursor movement responsive to input operations of characters on the display screen, wherein said program is generated such that data input operations by the user are carried out on the display screen presenting a form display having the normalized layout.

30. A method according to claim 24, the method further comprising the steps of:

producing a hard copy of a document including a layout of document generated from the physical structure data and having a plurality of fields filled with data inputted by the user operation on the display screen.

* * * * *